United States Patent
Kageyama et al.

(10) Patent No.: US 6,924,872 B2
(45) Date of Patent: Aug. 2, 2005

(54) FLEXIBLE LCD PANEL FABRICATION METHOD AND FLEXIBLE LCD PANEL FABRICATION SYSTEM USED FOR THE SAME

(75) Inventors: Tetsuya Kageyama, Nara (JP); Hiroaki Kojima, Kashiba (JP); Taro Miyazaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 339 days.

(21) Appl. No.: 09/725,414

(22) Filed: Nov. 29, 2000

(65) Prior Publication Data

US 2001/0002858 A1 Jun. 7, 2001

(30) Foreign Application Priority Data

Dec. 2, 1999 (JP) ............................. 11-343611
Nov. 29, 2000 (JP) ........................ 2000-363237

(51) Int. Cl.[7] ........................................... G02F 1/1333
(52) U.S. Cl. ...................... 349/158; 349/187
(58) Field of Search ................. 349/158, 187

(56) References Cited

U.S. PATENT DOCUMENTS

| | | | | |
|---|---|---|---|---|
| 4,718,751 A | * | 1/1988 | Kamijo et al. | 349/122 |
| 4,727,117 A | * | 2/1988 | Hallden-Abberton et al. | 525/343 |
| 4,802,742 A | * | 2/1989 | Ichikawa et al. | 349/122 |
| 5,587,264 A | * | 12/1996 | Iijima et al. | 430/57.1 |
| 5,767,931 A | * | 6/1998 | Paczkowski | 349/158 |
| 5,867,238 A | | 2/1999 | Miller et al. | |
| 6,322,860 B1 | * | 11/2001 | Stein et al. | 428/1.26 |
| 6,342,321 B1 | * | 1/2002 | Sakamoto et al. | 430/7 |

FOREIGN PATENT DOCUMENTS

| | | | | |
|---|---|---|---|---|
| EP | 0770899 | * | 5/1997 | ......... G02F/1/1333 |
| JP | 58-038920 | | 3/1983 | |
| JP | 59-116617 | | 7/1984 | |
| JP | 59-119317 | | 7/1984 | |
| JP | 60-170830 | | 9/1985 | |
| JP | 62-278706 | | 12/1987 | |
| JP | 04-296724 | | 10/1992 | |
| JP | 7-64037 | | 8/1993 | |
| JP | 06-208096 | | 7/1994 | |
| JP | 07-064038 | | 10/1995 | |
| JP | 08-190078 | | 7/1996 | |
| JP | 2000-284249 | | 10/2000 | |
| WO | WO 85/02915 | | 7/1985 | |

* cited by examiner

*Primary Examiner*—Tarifur R. Chowdhury
*Assistant Examiner*—Prasad R. Akkapeddi
(74) *Attorney, Agent, or Firm*—Edwards & Angell, LLP; David G. Conlin; Lisa Swiszcz Hazzard

(57) ABSTRACT

To form predetermined patterns on flexible substrates made of an inorganic material, in the case where one of substrates in pair is subjected to a processing operation that causes swelling or shrinkage of the substrate, the other substrate is also subjected to the processing operation irrespective of whether or not the other substrate requires the processing operation.

48 Claims, 22 Drawing Sheets

MOISTURE ABSORPTION 1: LEFT AT ENVIRONMENT OF 25°C, 65%
MOISTURE ABSORPTION 2: SOAKED IN WATER AT 45°C
DRYING BY HEATING: DRYING AT 50°C, 100°C, AND 150°C

FLEXIBLE LCD PANEL FABRICATION METHOD AND FLEXIBLE LCD PANEL FABRICATION SYSTEM USED FOR THE SAME

FIELD OF THE INVENTION

The present invention relates to a method for fabricating a flexible liquid crystal display panel whose substrates are formed with an organic material, and a system for fabricating the flexible liquid crystal display panel that is used in the foregoing fabrication method.

BACKGROUND OF THE INVENTION

FIG. 18 is a cross-sectional view of a simple-matrix-type liquid crystal display (LCD) panel in which glass is used as a material for substrates. This simple-matrix-type LCD panel includes a SEG substrate 101 on a segment electrode arrangement side, a COM substrate 102 on a common electrode arrangement side, a liquid crystal layer 103 provided between the SEG substrate 101 and the COM substrate 102, a sealing member 104 for adhesion between the substrates 101 and 102, and spacers 105 dispersed in the liquid crystal layer 103.

The foregoing SEG substrate 101 is normally formed by providing on one surface of a glass substrate 106a transparent electrodes 107a (segment electrodes), an insulating film 108, and an alignment film 109a in this order, as well as providing a phase difference polarizing plate 110a on the other surface of the substrate 106a.

On the other hand, the foregoing COM substrate 102 is formed by providing on one surface of a glass substrate 106b color filters 111, a transparent electrode (common electrode) 107b, and an alignment film 109b in this order, as well as providing a phase difference polarizing plate 110b on the other surface of the glass substrate 106b.

Upon fabrication of a COM substrate 102 and a SEG substrate 101 that are in pair, a process relating to components provided only on one substrate is unnecessary for the other substrate. In such a case, while a certain operation is carried out for formation of such a component on one substrate, usually nothing is done with respect to the other substrate on which the component is not provided.

FIGS. 19 and 20 show an example of a process flow for the foregoing LCD panel fabrication.

FIG. 19 is a process flow about operations around the formation of the insulating film 108, which is provided only on the SEG substrate 101. The SEG substrate 101 is subjected to cleaning, insulating film printing, and baking as processing operations for formation of the insulating film 108, but these processing operations are not applied to the COM substrate 102. Thereafter, processing operations (cleaning, alignment film printing, baking) for alignment film formation are applied to both the SEG substrate 101 and the COM substrate 102. Specifically, processing operations (cleaning, alignment film printing, baking) shown in FIG. 19 for forming an alignment film 109a are applied to the SEG substrate 101 after formation the insulating film 108. On the other hand, since an insulating film is not provided on the COM substrate 102, processing operations (cleaning, alignment film printing, baking) shown in FIG. 19 for formation of an alignment film 109b are applied to the COM substrate 102 after formation of color filters 111 and transparent electrodes 107b.

FIG. 20 is a process flow about before and after panel alignment of the SEG and COM substrates 101 and 102. Spacers are distributed on the SEG substrate 101. On the other hand, the COM substrate 102 is subjected to sealing material printing and leveling (heat treatment).

As described above, in the process before panel alignment, the SEG and COM substrates 101 and 102 are subjected to different processing operations from each other, respectively. However, even if the SEG and COM substrates 101 and 102 are thus subjected to different processing operations, respectively, there arises no problem since they are formed with glass as a substrate material that is hardly warped and that ensures accuracy.

In the case where flexible substrates made of an organic material such as plastic are used in the place of the glass substrates 106a and 106b, irreversible shrinkage of substrates occurs in a heating process and thereafter in a cooling process to room temperature again, thereby causing changes of the size to be induced. This could result in that the SEG and COM substrates 101 and 102 that have been completed through all the processing operations have different pattern sizes.

A graph of FIG. 16 shows how the size of a plastic substrate made of PES (polyether sulfone) changes in the case where a series of treatments including heat treatment at 150° C. for 60 minutes and a cooling treatment to room temperature while maintaining a dry state is repeatedly applied to the plastic substrate. Viewing changes in the size of the plastic substrate when cooled to room temperature, it can be seen that shrinkage of the plastic substrate is promoted as the number of times of repetition of the foregoing treatments in series increases.

Furthermore, an inorganic material such as plastic has a drawback of swelling by absorbing moisture, unlike glass. Therefore, during the cleaning treatment using water as a cleaner, a change in the size of the plastic substrate (swelling due to absorption of moisture) is induced, thereby causing a phenomenon similar to that caused by the heat treatment, that is, the problem that substrates in pair (the SEG and COM substrates 101 and 102) have different pattern sizes.

A graph of FIG. 17 shows expansion (swelling) of a plastic substrate made of PES due to moisture absorption and shrinkage of the same due to drying that was measured for reference by the inventors of the present application. In the case where the plastic substrate is left in an environment at a temperature of 25° C. and a humidity of 65%, and in the case where it is soaked in warm water at a temperature of 40° C., quantities of moisture that the plastic substrate absorbs are different, and hence, dimensional changes they exhibit are also different. The dimensional changes herein are substantially equal to those in the case where a heat treatment is applied as shown in FIG. 16.

As described above, in the case where plastic substrates are used as the SEG and COM substrates 101 and 102, dimensional changes occur to them due to shrinkage caused by heat treatments, or due to moisture absorption upon leaving or cleaning. For example, in the case of a 300 mm-long substrate, a dimensional change of 0.1% is a dimensional change of 0.3 mm. In the case where a dimensional change at such a level is caused to one of substrates in pair, it is difficult to align the substrates so as to achieve accurate pattern alignment, and to produce a plurality of LCD panels with satisfactory accuracy from the combined substrates.

FIG. 21 shows a process flow for panel cutting, which is a process for cutting out a plurality of LCD panels after the panel alignment of the SEG and COM substrates 101 and 102. This panel cutting process does not cause a defect due to a size difference between the SEG and COM substrates 101 and 102.

However, in the case where plastic substrates are used as the foregoing SEG and COM substrates 1 and 2, swelling due to moisture absorption occurs to the plastic substrates in a stand-by state for the cutting, being left under room environmental conditions. Therefore occurs a problem that cutting dimensions cannot be determined. Generally, the LCD panel fabrication process is executed under intentionally moistured conditions (relative humidity: 60% to 70%), so as to suppress generation of static electricity. Therefore, in the case where plastic substrates are used as the foregoing SEG and COM substrates 1 and 2, the plastic substrates when being left in a room environment during a stand-by time, absorb moisture and swell. Accordingly, in the case where plastic substrates are used as the foregoing SEG and COM substrates 1 and 2, influences of the dimensional change due to moisture absorption as shown in FIG. 17 are not ignorable.

As means to solve the foregoing problems, the following techniques are proposed.

The Japanese Publication for Laid-Open Patent Application No. 64038/1995 (Tokukaihei 7-64038 [Date of Publication: Mar. 10, 1995]) discloses a method for producing with satisfactory accuracy a plurality of LCD panels from a large-size substrates including plastic films. In this method, as shown in FIG. 22, a base 121 with rigidity on which a plastic film 123 is provided is used as one substrate 122, among two substrates. The other substrate 124 formed in a panel size is aligned with the substrate 122, at a pattern position thereof. Incidentally, in FIG. 22, 125 is a transparent electrode, 126 is a liquid crystal injection port, and 127 is a line (cut-out line) along which a panel is cut out through a subsequent process.

In such a method, the panel alignment accuracy for the two substrates is not necessarily achieved throughout an entirety of one large-size substrate (one substrate), but may be achieved within a tolerable range throughout one panel-size small substrate (the other substrate) Therefore, since a position correction can be executed at a stage of panel alignment for combining each panel-size small substrate to the large-size substrate, flexible LCD panels can be produced with satisfactory accuracy.

However, in the arrangement of the foregoing Tokukaihei 7-64038, in the case where many panels are to be produced from one large-size substrate, panel alignment of a small-size substrate has to be carried out many times, thereby increasing a processing period for the panel alignment. Furthermore, an increase in the costs due to an increase in the number of manufacturing apparatuses is also expected. Furthermore, a capacity of one aligning device varies depending on the panel size. For these reasons, there arises a problem that the efficiency of the manufacture line lowers.

On the other hand, in the case where only a few panels are taken out of one large-size substrate, that is, in the case where large-size panels are obtained, a problem that occurs in the case where the process for the glass substrate is applied to small-size substrates (that is, a dimensional difference between two substrates that stems from a difference between processes of fabrication of the two substrates) arises, and dimensional errors on the small-size substrate side exceed a tolerable range. Consequently, a problem that a flexible LCD panel cannot be produced with a desired pattern accuracy.

In other words, the foregoing methods are aimed for fabricating a plurality of flexible LCD panels from a large-size substrates, and do not fundamentally solve dimensional errors due to dimensional changes (swelling/shrinkage) of two substrates to be aligned with each other. Therefore, they are not to achieve improvement of size accuracy throughout the whole substrate. Therefore, the foregoing methods are inappropriate in the case where only a few panels are taken out of large-size substrates, particularly in the case where a single large-size LCD panel is produced from large-size substrates.

SUMMARY OF THE INVENTION

An object of the present invention is to provide a flexible LCD panel including flexible substrates made of an organic material such as plastic, with satisfactory pattern accuracy, at lower costs.

To achieve the foregoing object, a method for fabricating a flexible LCD panel of the present invention is a method for fabricating a flexible liquid crystal display panel by aligning a pair of flexible substrates made of an organic material on which predetermined patterns are formed, and the method is characterized by comprising the step of, in forming the patterns, in the case where a processing operation that causes swelling or shrinkage of the substrate is applied to one of the substrates in pair, applying the processing operation to the other substrate, irrespective of whether or not the other substrate requires the processing operation.

Generally, in a process before panel alignment, the one substrate and the other substrate composing the pair are separately processed. In fabrication of the pair of substrates, that is, in forming respective predetermined patterns on the one substrate and the other substrate, processes concerning component elements provided only on either one of the substrates are unnecessary for the other substrate. In such a case, while certain processing operations are applied to one substrate for forming the component elements, no operation is applied to the other substrate, usually. Since predetermined patterns formed on the substrates in pair are provided on flexible substrates made of an organic material, in the case where only one substrate is subjected to an operation that causes swelling or shrinkage of the substrate, only the substrate is caused to swell or shrink by the foregoing operation, thereby causing size accuracy to be different between the substrates. Consequently, it is impossible to align both the substrates with sufficient pattern alignment accuracy.

According to the foregoing method, however, in the case where one substrate is subjected to an operation that causes swelling or shrinkage of the substrate, the other substrate is also subjected to the foregoing operation for the purpose of size control. This prevents the substrates in pair from undergoing a problem that only one of them swells or shrinks, thereby enabling to suppress variation of size accuracy due to swelling/shrinkage of substrates.

Furthermore, by the foregoing method, it is possible to conform the swelling/shrinkage behavior of the substrates to each other. As a result, the substrates are caused to have equal dimensional change ratios of the whole substrate to each other, and the dimensional alignment accuracy of the substrates can be enhanced, irrespective of whether it is a case where a plurality of flexible LCD panels are produced from a large-size substrates, or a case in which a few or one large-size LCD panel is produced from large-size substrates.

Furthermore, according to the foregoing method, since it is unnecessary to change arrangement of the foregoing substrates and the method is based on transport and processing of only a flexible substrate made of an organic material, the settings and devices prepared for glass substrate fabrication are applicable for the basic processing flow and individual processing operations.

Therefore, it is possible to fabricate flexible LCD panels with satisfactory pattern accuracy, as well as it is possible to fabricate flexible LCD panels using flexible substrates made of organic materials at lower costs.

Incidentally, an operation that causes swelling or shrinkage of a substrate is defined as an operation that itself causes swelling or shrinkage of the substrate, that is, an operation that itself causes moisture absorption or discharge of the substrate, or property modification of the substrate. More specifically, it is, for example, a heating, drying, or cleaning operation, or more particularly, a heating or drying operation that causes flexible substrates to shrink. The foregoing method is preferably applicable to a case of, among heat treatments, a heat treatment for pattern formation that causes irreversible shrinkage to a flexible substrate.

Then, according to a flexible LCD panel fabrication method of the present invention is a method for fabricating a flexible liquid crystal display panel by aligning a pair of flexible substrates made of an organic material on which predetermined patterns are formed, and the method is characterized in that, in forming the patterns, in the case where a heat treatment is applied to one of the substrates in pair, a heat treatment is applied to the other substrate, irrespective of whether or not the other substrate requires the heat treatment.

According to the foregoing method, however, in the case where one substrate is subjected to a heat treatment, the other substrate is also subjected to the foregoing operation for the purpose of size control. This prevent the substrates in pair from undergoing a problem that only one of them swells or shrinks due to the heat treatment, thereby enabling to suppress variation of size accuracy due to shrinkage of substrates.

Furthermore, by the foregoing method, it is possible to conform the heat histories of the substrates to each other. As a result, the substrates are caused to have equal dimensional change ratios of the whole substrate to each other, and the dimensional alignment accuracy of the substrates can be enhanced, irrespective of whether it is a case where a plurality of flexible LCD panels are produced from a large-size substrates, or a case where a few or one large-size LCD panel is produced from large-size substrates.

Furthermore, according to the foregoing method, it is unnecessary to change arrangement of the foregoing substrates, and since the method is based on transport and processing of only a flexible substrate made of an organic material, the settings and devices prepared for glass substrate fabrication are applicable for the basic processing flow and individual processing operations.

Therefore, it is possible to fabricate flexible LCD panels with satisfactory pattern accuracy, as well as it is possible to fabricate flexible LCD panels using flexible substrates made of organic materials at lower costs.

Furthermore, to achieve the aforementioned object, a flexible LCD panel fabrication method of the present invention is a method for fabricating a flexible liquid crystal display panel by aligning a pair of flexible substrates made of an organic material on which predetermined patterns are formed, and the method includes the step of applying drying operations to the one substrate and the other substrate, respectively, before panel alignment of the pair of substrates.

By the foregoing method in which a drying operation is applied to each of the one substrate and the other substrate in pair before aligning the substrates, reversible swelling of the substrates due to an effect of moisture absorption is solved, by drying the one substrate and the other substrate concurrently so as to cause the substrates to shrink. Thus, the influence of the swelling of the substrates due to moisture absorption can be reduced, or preferably eliminated. Consequently, the substrates can be aligned in a state in which a difference between size accuracies of the substrates is suppressed. This leads to improvement of dimensional alignment accuracy of the substrates.

Furthermore, by the foregoing method, it is possible to conform the dimensional change ratios of the substrates to each other by drying. As a result, the dimensional alignment accuracy of the substrates can be enhanced, irrespective of whether it is a case where a plurality of flexible LCD panels are produced from a large-size substrates, or a case where a few or one large-size LCD panel is produced from large-size substrates.

Furthermore, according to the foregoing method, it is unnecessary to change arrangement of the foregoing substrates, and since the method is based on transport and processing of a single flexible substrate made of an organic material, the settings and devices prepared for glass substrate fabrication are applicable for the basic processing flow and individual processing operations.

Therefore, it is possible to fabricate flexible LCD panels with satisfactory pattern accuracy, as well as it is possible to fabricate flexible LCD panels using flexible substrates made of organic materials at lower costs. Incidentally, the foregoing drying operation may be a drying operation by heating, or may be a drying operation by pressure reduction, such as vacuum drying.

Further, in order to achieve the objects, a fabrication system of a flexible liquid crystal display panel of the present invention is a fabrication system of a flexible liquid crystal display panel to fabricate a flexible liquid crystal display panel by aligning two substrates in each of which a predetermined pattern is formed on a flexible substrate made of organic material, and is characterized in that the fabrication system includes:

a substrate transport device for transporting the two substrates thereon;

a heat processing device for carrying out heat processes on the two substrates; and a device for carrying out other processes that are required to form the predetermined patterns on the two substrates, wherein:

the processing devices are arranged in a direction in which the two substrates are transported in accordance with fabrication processes of the flexible liquid crystal display panel.

With the arrangement, the processing devices are arranged in a direction in which the two substrates are transported in accordance with fabrication processes of the flexible liquid crystal display panel; therefore, various processes are sequentially carried out in accordance with the fabrication processes of the flexible liquid crystal display panel. This facilitates the process control, as well as the checking and controlling of temporal changes which occur in the expansion of the two substrates between different processing devices, restrains the substrates varying in their dimensions due to temporal factors, and thus enables mechanical processing to be carried out on the two substrates without compromising on desired dimensional precision.

Besides, the fabrication system of the flexible liquid crystal display panel includes a heat processing device for carrying out heat processes on the two substrates; therefore, the two substrates can be subjected to a heat process. This restrains only one of the substrates shrinking and thus rendering the dimensional precision irregular. Besides, with the arrangement, the substrates come to have matched heat histories per se, and hence matched dimensional change ratios in view of entire substrates. This improves the precision in aligning the substrates regardless of the number of flexible liquid crystal panels that are made from a single large substrate. The number can be, for example, one, and the precision still improves. Thus, the flexible liquid crystal display panel can be fabricated easily with a high acceptable product ratio.

Further, by fabricating the flexible liquid crystal display panel using the fabrication system arranged as in the foregoing, the arrangement of the two substrates does not need to be changed, and the flexible substrate made of organic material can be transported and processed alone. Therefore, those well tried and trusted settings and devices that are originally intended for use with the glass substrate can be applied for use with the organic substrate in its basic process flow and individual processes.

Thus, the flexible liquid crystal display panel can be fabricated with a good pattern precision. Also, the flexible liquid crystal display panel can be fabricated from a flexible substrate made of organic material at lower costs than conventional techniques.

In order to achieve the objects, a fabrication system of a flexible liquid crystal display panel of the present invention is a fabrication system of a flexible liquid crystal display panel to fabricate a flexible liquid crystal display panel by aligning two substrates in each of which a predetermined pattern is formed on a flexible substrate made of organic material, and is characterized in that the fabrication system includes:

a substrate transport device for transporting the two substrates thereon;

a drying device for carrying out drying processes on the two substrates; and a device for carrying out other processes that are required to form the predetermined patterns on the two substrates, wherein:

the processing devices are arranged in a direction in which the two substrates are transported in accordance with fabrication processes of the flexible liquid crystal display panel.

With the arrangement, the processing devices are arranged in a direction in which the two substrates are transported in accordance with fabrication processes of the flexible liquid crystal display panel; therefore, various processes are sequentially carried out in accordance with the fabrication processes of the flexible liquid crystal display panel. This facilitates the process control, as well as the checking and controlling of temporal changes which occur in the expansion of the two substrates between different processing devices, restrains the substrates varying in their dimensions due to temporal factors, and thus enables mechanical processing to be carried out on the two substrates without compromising on desired dimensional precision.

Besides, the fabrication system of the flexible liquid crystal display panel includes a drying device for carrying out drying processes on the two substrates; therefore, the two substrates can be subjected to a drying process. This restrains the substrates expanding due to absorption of moisture and thus rendering the dimensional precision irregular. Besides, with the arrangement, the substrates are subjected to drying, and hence come to have matched dimensional change ratios in view of entire substrates. This improves the precision in aligning the substrates regardless of the number of flexible liquid crystal panels that are made from a single large substrate. The number can be, for example, one, and the precision still improves. Thus, the flexible liquid crystal display panel can be fabricated easily with a high acceptable product ratio.

Further, by fabricating the flexible liquid crystal display panel using the fabrication system arranged as in the foregoing, the arrangement of the two substrates does not need to be changed, and the flexible substrate made of organic material can be transported and processed alone. Therefore, those well tried and trusted settings and devices that are originally intended for use with the glass substrate can be applied for use with the organic substrate in its basic process flow and individual processes.

Thus, the flexible liquid crystal display panel can be fabricated with a good pattern precision. Also, the flexible liquid crystal display panel can be fabricated from a flexible substrate made of organic material at lower costs than conventional techniques.

For a fuller understanding of the nature and advantages of the invention, reference should be made to the ensuing detailed description taken in conjunction with the accompanying drawings.

BRIEF DESCRIPTION OF THE DRAWINGS

FIG. 4(a) is a graph showing a profile when the substrate is heated by a heated air circulating oven; and FIG. 4(b) is a graph showing a temperature profile when the substrate is heated by a single substrate transfer oven.

FIG. 5(a) is an explanatory view illustrating dimensional changes when the substrate is heated by a heated air circulating oven; and FIG. 5(b) is an explanatory view illustrating dimensional changes when the substrate is heated by a single substrate transfer oven.

FIG. 7(a) is a graph illustrating a swelling/shrinkage behavior in the case where the drying operation is carried out by heating means; and FIG. 7(b) is a graph illustrating a swelling/shrinkage behavior in the case where the drying operation is carried out by vacuum means.

DESCRIPTION OF THE PREFERRED EMBODIMENTS

The following description will explain an embodiment of the present invention while referring to FIGS. 1 through 17.

Figure 1:
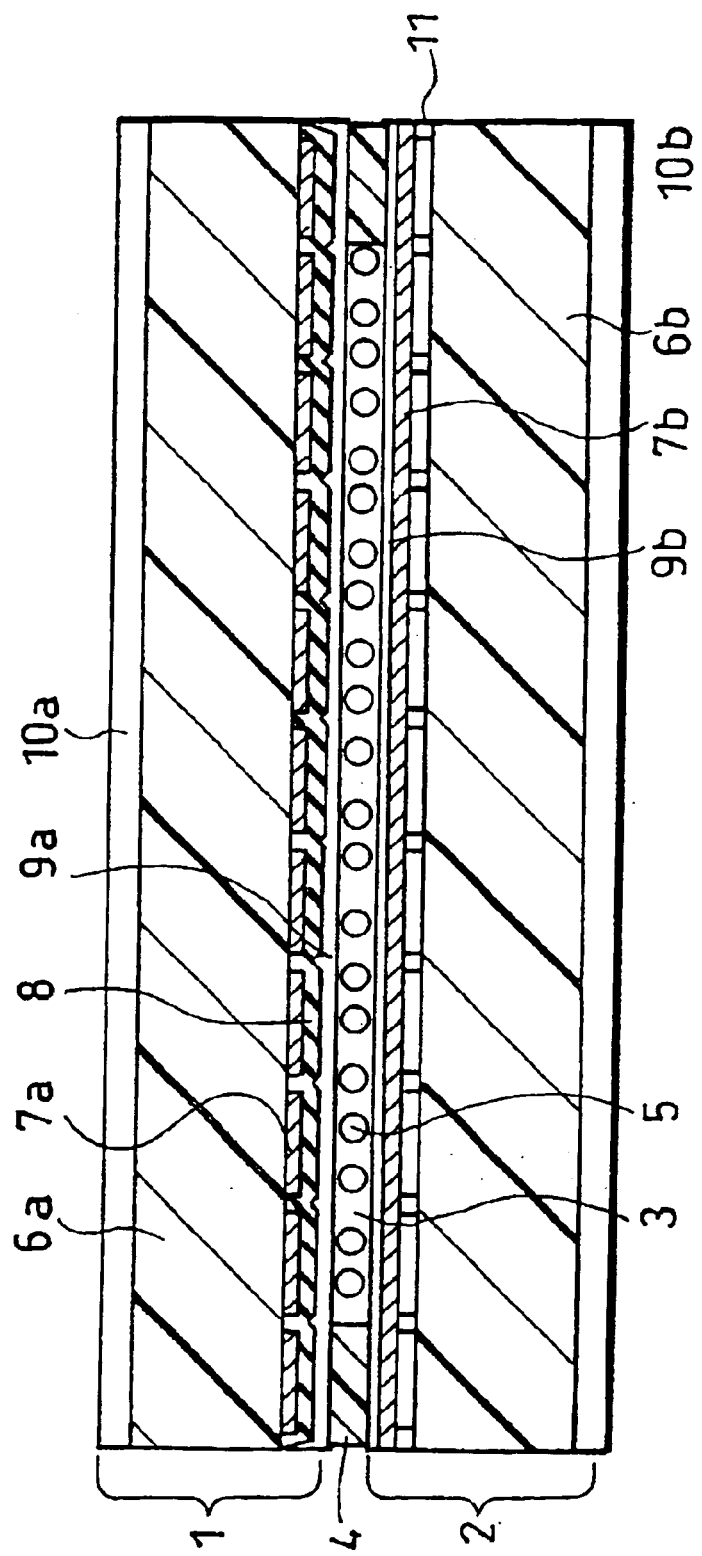
FIG. 1 is a cross-sectional view illustrating an arrangement of a liquid crystal display panel fabricated by a flexible LCD panel fabrication method in accordance with one embodiment of the present invention.

FIG. 1 is a cross-sectional view of a simple-matrix-type LCD panel, fabricated by a fabrication method of a flexible LCD panel in accordance with the present embodiment. The simple-matrix-type LCD panel in accordance with the present embodiment is composed of an SEG substrate 1 provided with segment electrodes, a COM substrate 2 provided with a common electrode, a liquid crystal layer 3 provided between the SEG substrate 1 and the COM substrate 2, a sealing member 4 providing adhesion between the SEG and COM substrates 1 and 2, and spacers 5 dispersed in the liquid crystal layer 3.

The foregoing SEG substrate 1 is arranged so that a transparent substrate 7a (segment electrodes), an insulating film 8, and an alignment film 9a are provided in the stated order on one surface of a plastic substrate (flexible substrate) 6a made of plastic (organic material) such as PES (polyether sulfone), while a phase difference polarizing plate 10a is provided on the other surface of the plastic substrate 6a.

On the other hand, the foregoing COM substrate 2 is arranged so that color filters 11, a transparent electrode (common electrode) 7b, and an alignment film 9b, as predetermined patterns, are provided in the stated order on one surface of a plastic substrate (flexible substrate) 6b made of plastic such as PES, while a phase difference polarizing plate 10b is provided on the other surface of the plastic substrate 6b.

ITO (indium tin oxide) films is adapted as the foregoing transparent electrodes 7a and 7b, and transparent conductive films are formed by vapor-deposition sputtering with ITO ingot as a material, or by reactive vapor-deposition sputtering (causing reaction with oxygen during vapor deposition) with IT (indium tim) ingot as a material. The thickness of the film is determined depending on conductivity required, which is selected from a range of 500 Å to 5000 Å. After film formation, patterning is carried out by photolithography (application of a sensitive material, exposure, development, etching, stripping), and transparent electrodes 7a and 7b are formed.

The foregoing insulating film 8 is formed for the purpose of preventing short-circuit between the transparent electrodes 7a of the SEG substrate 1 and the transparent electrodes 7b of the COM substrate 2 that could take place when a conductive foreign substance is mixed therein. Provision of the insulating film 8 on both the SEG and COM substrates 1 and 2 ensures more effective electric insulation, but considering the lowering of performance such as the lowering of contrast as well as the cost, the insulating film 8 is normally provided on only one substrate. From the viewpoint of insulation resistance, the film hardness, and the cost for formation, the requirement of the insulating film 8 is that it can be formed by printing (printing, baking). A material used is, for instance, an organic silicon (Si) compound containing a metal such as titanium (Ti). Organic components are removed by baking, and a SiTi oxide film, for example, is formed. It has a thickness of about 500 Å to 1000 Å, and is transparent. Needless to say, it may be formed by vacuum deposition.

The foregoing alignment films 9a and 9b are formed with a polyimide material, by printing as the insulating film 8 is. A thickness thereof is usually about 500 Å.

The sealing member 4 is made of an acrylic resin-epoxy resin-based heat-hardening resin in many cases, which is baked and hardened at a temperature of about 150° C. to 200° C. (baking).

Examples of materials used for the spacers 5 include plastic beads, glass beads, glass fibers, etc., but for making the cell gap uniform, plastic beads are usually employed. The spacers 5 are about 2 μm to 10 μm in size, determined depending on the cell gap.

As a method for fabricating a flexible LCD panel in accordance with the present embodiment, explained is a method in which two large substrates in the same size are combined and made to adhere to each other, and from this large substrate obtained, a plurality of flexible LCD panels as described above are produced. Here, a process flow from formation of the insulating film 8 to formation of alignment films 9a and 9b, out of the process of fabrication of the foregoing flexible LCD panel, is explained with reference to FIG. 2.

The insulating film 8 provided only on the SEG substrate 1 is formed through the following process: after the plastic substrate 6a provided with the transparent electrodes 7a is cleaned (CLEANING), ink of an insulating film material is transferred onto the transparent electrodes 7a by printing (INSULATING FILM PRINTING), and is heated and baked at a temperature over 150° C. (BAKING).

On the other hand, though an insulating film 8 is not formed on the COM substrate 2, the plastic substrate 6b of the COM substrate 2 is subjected to heat treatment (HEAT TREATMENT: indicated by a double-line frame in the figure) under the same baking conditions for the SEG substrate 1, during the process of forming the insulating film 8 on the SEG substrate 1.

Thereafter, through the cleaning, alignment film printing, and baking steps, the alignment films 9a and 9b are formed on the SEG substrate 1 and the COM substrate 2.

Unless heat treatment is not applied to the COM substrate 2 during the process of forming the insulating film 8, only the plastic substrate 6a of the SEG substrate 1 shrinks. Consequently, the SEG substrate 1 and the COM substrate 2 come to have different sizes.

Figure 3:
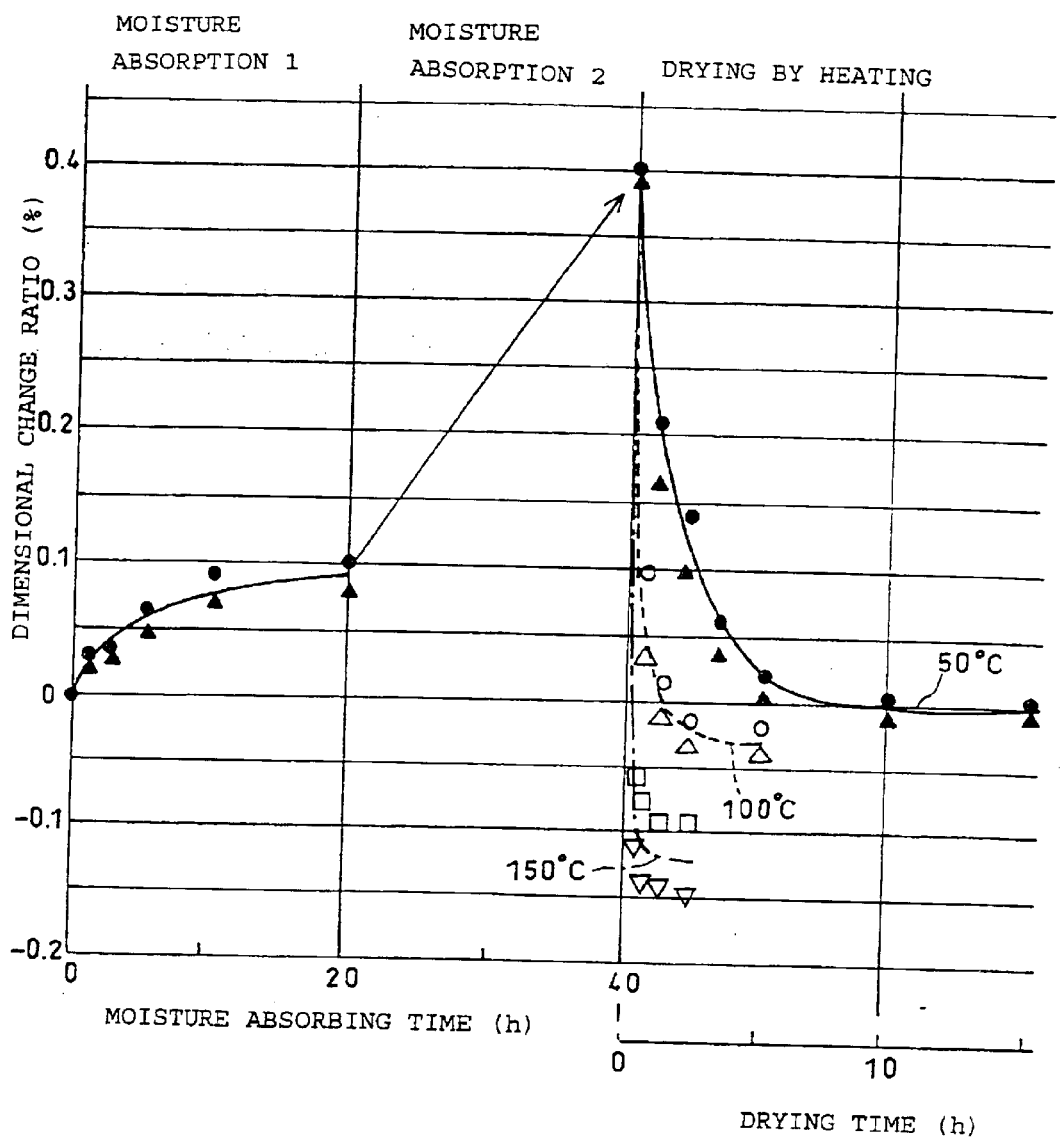
FIG. 3 is a graph illustrating a swelling/shrinkage behavior of a PES substrate used in the foregoing flexible LCD panel when heated after moisture absorption.

A case where substrates made of PES (polyether sulfone) are used as the plastic substrates 6a and 6b (the substrates are hereinafter referred to as PES substrates) will be explained by way of example with reference to a graph of FIG. 3, so as to explain dimensional changes occurring to the PES substrates due to moisture absorption and drying by heating. "MOISTURE ABSORPTION 1" indicates a case where the PES substrate was left to stand under an environment with a temperature of 25° C. and a humidity of 65%. "MOISTURE ABSORPTION 2" indicates a case where the PES substrate was soaked in warm water at 40° C. "DRYING BY HEATING" indicates cases where the PES substrate was dried by heating at 50° C. (indicated by a solid line), at 100° C. (indicated by a broken line), and at 150° C. (indicated by a dashed line).

From the foregoing graph, it can be seen that: the PES substrate that has swollen by moisture absorption is returned to an original size by drying by heating at 50° C., but it shrinks to a size smaller than the original size, in the case where it is subjected to a heat treatment (BAKING) at 100° C. or 150° C.

According to the foregoing result, the plastic substrate 6a of the SEG substrate 1 swells by absorbing moisture when it is cleaned with water-based cleaning liquid before an insulating film material is printed thereon, but in the heating-baking process ensuing to the printing process, heat not lower than 150° C. is applied to the SEG substrate 1, the substrate irreversibly shrinks later during a process of cooling the same to room temperature, thereby becoming smaller than the original size. Thus, if the baking treatment is applied only to the SEG substrate 1 while no corresponding treatment is not applied to the COM substrate 2, only the SEG substrate 1 shrinks due to heat. This causes a difference in size between the SEG substrate 1 and the COM substrate 2.

To solve the foregoing problem, in the present embodiment, in the case where a treatment that causes a substrate to swell or shrink is applied to one of the pair of substrates, the other substrate is subjected to the same treatment, irrespective of whether or not the substrate requires the treatment, so that a difference in size between the substrates due to swelling or shrinkage of the substrates should be eliminated. In the case of the present embodiment, by applying to the COM substrate 2 the same heat treatment (BAKING) as that for the SEG substrate 1, the same irreversible shrinkage occurs to the COM substrate 2. As a result, shrinkage occurs to both the SEG and COM substrates 1 and 2, and a difference in size between the SEG substrate 1 and the COM substrate 2 caused by formation of the insulating film 8 by baking can be avoided.

Thus, in the case where one of the pair of substrates is subjected to a heat treatment in formation of the foregoing patterns, the other substrate is also subjected to the heat treatment even if it does not require it, for the purpose of dimension control of the substrates. By so doing, only one of the substrates in pair shrinking by a heat treatment does not take place, and variation of size accuracy due to shrinkage caused by a heat treatment can be suppressed.

In the present embodiment, the foregoing one substrate, that is, the SEG substrate 1 in this case, is subjected to a baking operation, the COM substrate 2 as the other substrate is subjected to a baking operation so that a difference in size between the SEG substrate 1 and the COM substrate 2 that results from the baking operations applied to the SEG and COM substrates 1 and 2 should fall in a desired range.

More specifically, conditions of the heat treatments applied to the SEG and COM substrates 1 and 2 are set so that a difference in size between the SEG and COM substrates 1 and 2 resulting from the foregoing heat treatments, that is, the baking operations, should fall in a desired range. For instance, the SEG and COM substrates 1 and 2 are subjected to substantially identical heat treatments that will cause a difference in size between the substrates falls in a desired range: more specifically, in the case where a raised substrate-holding temperature (steady temperature) at which one substrate is held is 100° C. to 150° C., for instance, the other substrate is subjected to a heat treatment with a substrate-holding temperature that is ±5° C. to the foregoing temperature, during a processing time that is not more than 10% longer or shorter as compared with the foregoing processing time; or more preferably, both the substrates are subjected to the same heat treatment. For this purpose, the foregoing heat treatment is carried out under substantially the same temperature profile. This is easily realized by carrying out the heat treatment under substantially identical set conditions, or preferably the same set conditions, or particularly, by carrying out the heat treatment by using a device of the same type and under the same set conditions.

Incidentally, in the present embodiment, substantially identical temperature profiles are defined as: a rising temperature, a substrate-holding temperature (steady temperature (for instance, 100° C. to 150° C.)) while rising, and a dropping temperature of one of the substrates in pair are in respective ranges of ±10° C. of those of the other substrate, or more preferably in respective ranges of ±5° C. of those of the other substrate, and that a processing time for one substrate differs from that of the other by not greater than 10%, or more preferably by not greater than 5%.

Incidentally, a plastic substrate absorbs moisture by cleaning before baking, thereby swelling. Therefore, in the case where conditions of substrates before baking are different, sometimes the SEG and COM substrates 1 and 2 come to differ in size depending on conditions of the baking temperatures, etc.

Therefore, to surely prevent the SEG and COM substrates 1 and 2 from having different sizes, the COM substrate 2 is preferably, like the SEG substrate 1, subjected to a baking operation after being subjected to a cleaning operation.

Figure 2:
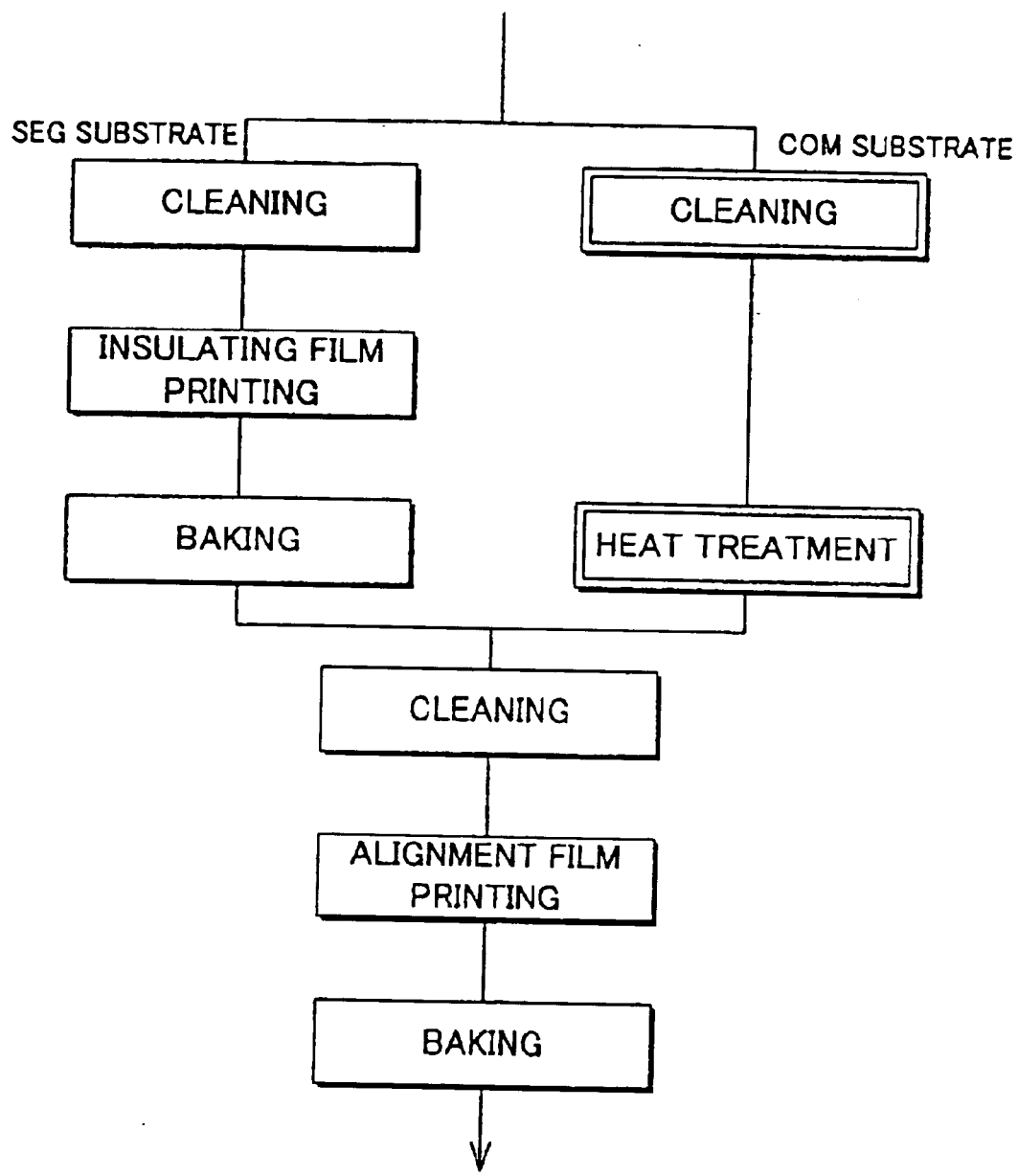
FIG. 2 is a flowchart illustrating a process from formation of an insulating film to formation of an alignment film according to the foregoing flexible LCD panel fabrication method.

In the method for fabrication of an LCD panel in accordance with the present embodiment, particularly, the COM substrate 2 is cleaned and heated under the same conditions as those for the SEG substrate 1, as shown in FIG. 2. Therefore, respective dimensional changes of the SEG and COM substrates 1 and 2 after formation of the insulating film 8 are substantially equal. Thus, the SEG and COM substrates 1 and 2 have substantially no difference in size, and this allows the SEG and COM substrates 1 and 2 to be aligned with good accuracy in pattern alignment in a subsequent process.

Here, in the case where heating devices with different structures are used as two heating means using different heating techniques for performing heating operations (HEAT TREATMENT), differences between temperature profiles that occur due to differences in structures of the heating devices will be explained below, with reference to FIGS. 4(a) and 4(b).

Figure 4A:
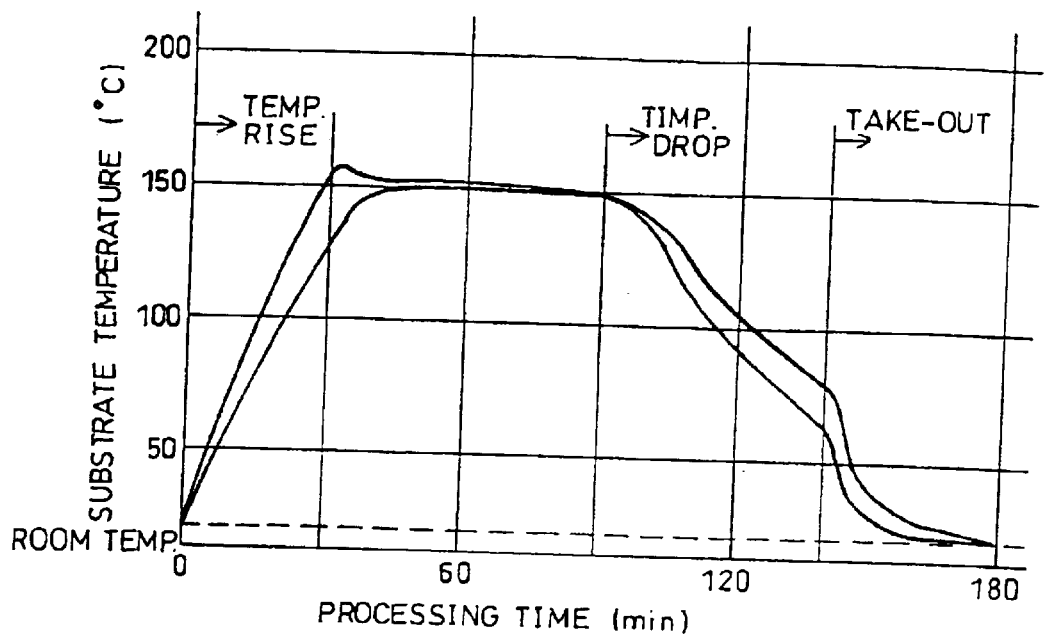
FIGS. 4(a) and 4(b) are graphs illustrating a difference between temperature profiles of substrates that occurs due to a difference between structures of heating devices.

FIG. 4(a) illustrates a temperature profile in the case where flexible substrates housed in a cassette were heated by a heated air circulating oven. The flexible substrates were housed in the cassette in a state in which each was horizontally held so as to be completely superimposed on the others if viewed from above. The flexible substrates were heated by applying hot air from a side direction to each substrate so that the hot air should go through spaces between the substrates. The number of flexible substrates housed in the cassette was 20, and the flexible substrates were arranged so that a distance from one flexible substrate to the next was kept to 20 mm. The heat treatment was carried out aiming at a baking temperature of 150° C.

Figure 4B:
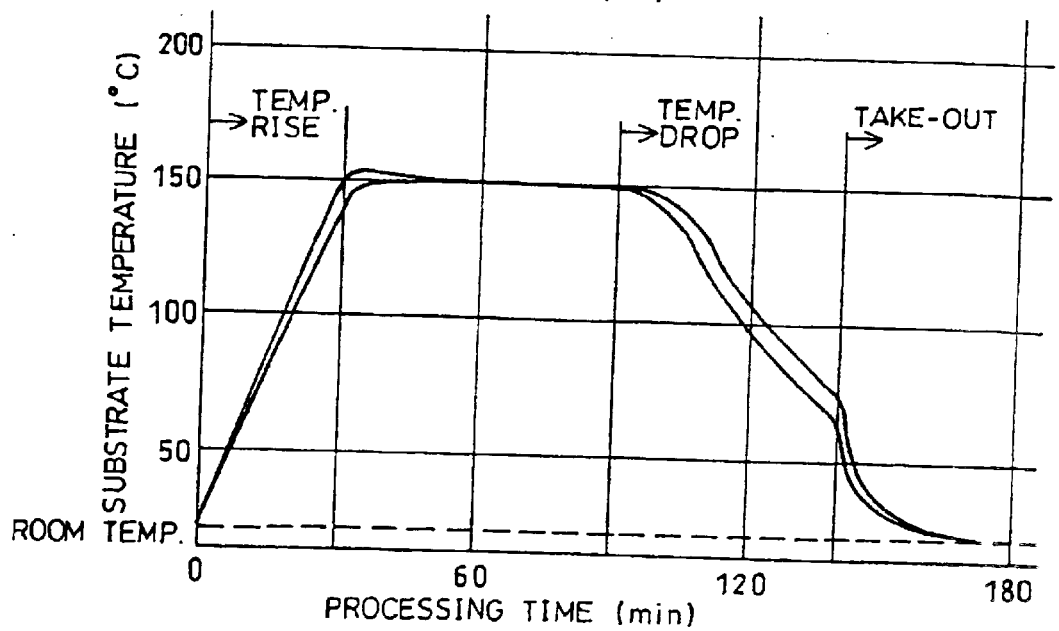

On the other hand, FIG. 4(b) illustrates a temperature profile in the case where the flexible substrates were heated by a single substrate transfer oven that transported flexible substrates one by one continually while heating the same. The single substrate transfer oven heated each flexible substrate by radiation of infrared from both sides, and in the present case, the heat treatment was carried out aiming at a baking temperature of 150° C.

In each temperature profile, the flexible substrates were heated from room temperature to 150° C. during about 30 minutes, kept at 150° C. for 60 minutes, and cooled to 75° C. during 50 minutes. Then, the flexible substrates were taken out of the heated air circulating oven and the single substrate transfer oven, and were cooled in room temperature ambient. Note that PES substrates were used as flexible substrates in the foregoing measurement.

As obvious from the temperature profiles shown in FIGS. 4(a) and 4(b), temperature variation upon temperature rise and temperature drop between flexible substrates is smaller in the case where the heated air circulating oven is used, as compared with the case where the single substrate transfer over. This is because the single substrate transfer over is superior in uniformity of heat energy supply.

Figure 5A:
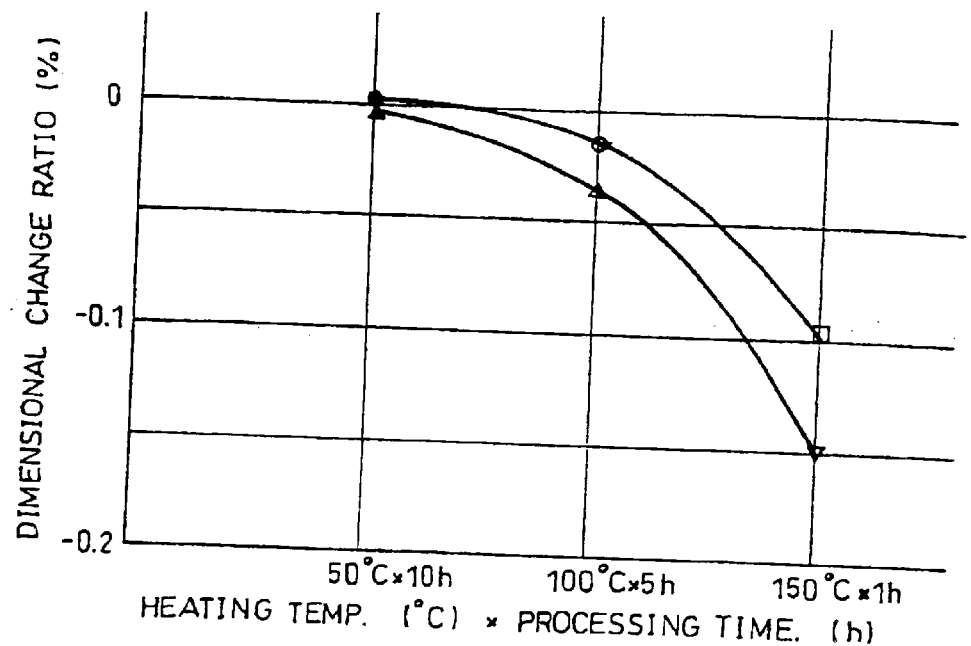
FIGS. 5(a) and 5(b) are explanatory views illustrating dimensional changes of a PES substrate used in the foregoing flexible LCD panel in the case where different temperature profiles are applied thereto.
Figure 5B:
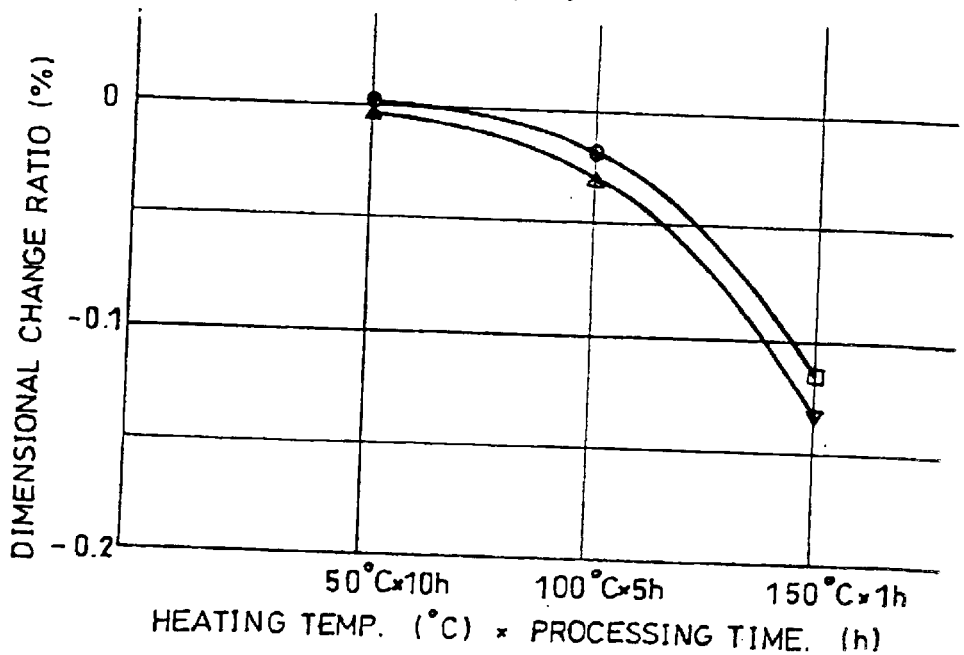

Next, dimensional changes that occurred to flexible substrates for use in flexible LCD panels in the case where they were subjected to different temperature profiles by carrying out heat treatments by means of the aforementioned heating devices of two different types were compared, with reference to FIGS. 5(a) and 5(b). Note that PES substrates were used as flexible substrates in the foregoing measurement also.

Figure 17:
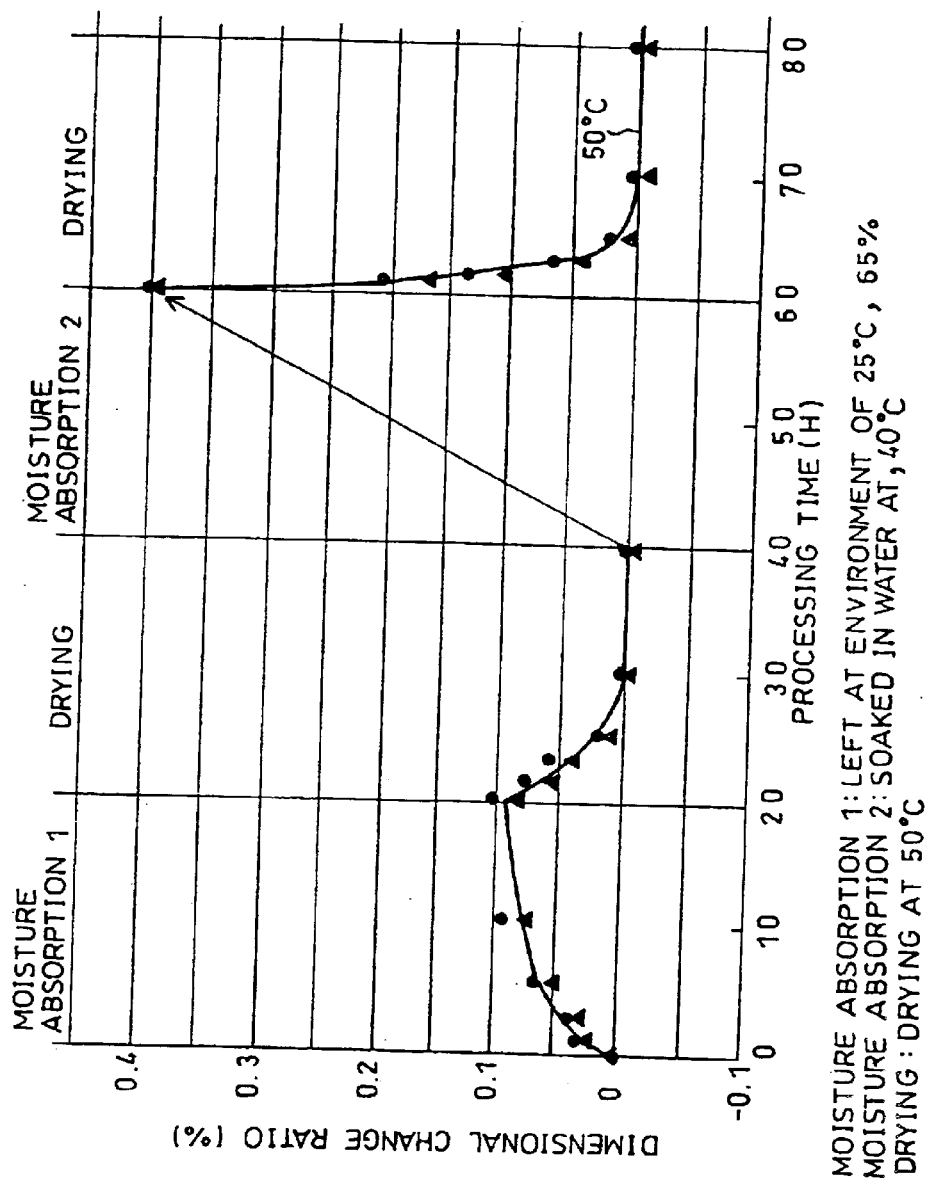
FIG. 17 is a graph illustrating a swelling/shrinkage behavior of a PES substrate due to moisture absorption and drying.
Figure 18:
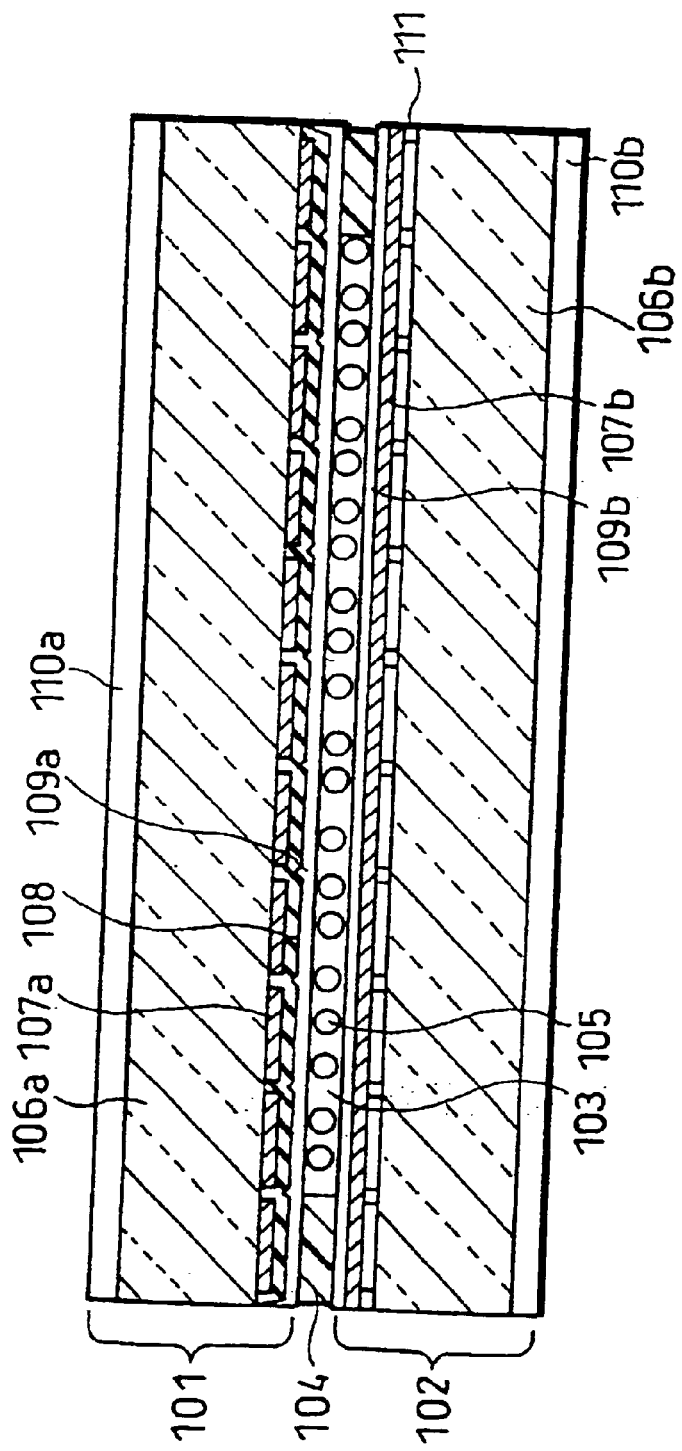
FIG. 18 is a cross-sectional view illustrating an arrangement of a conventional LCD panel employing glass substrates.
Figure 19:
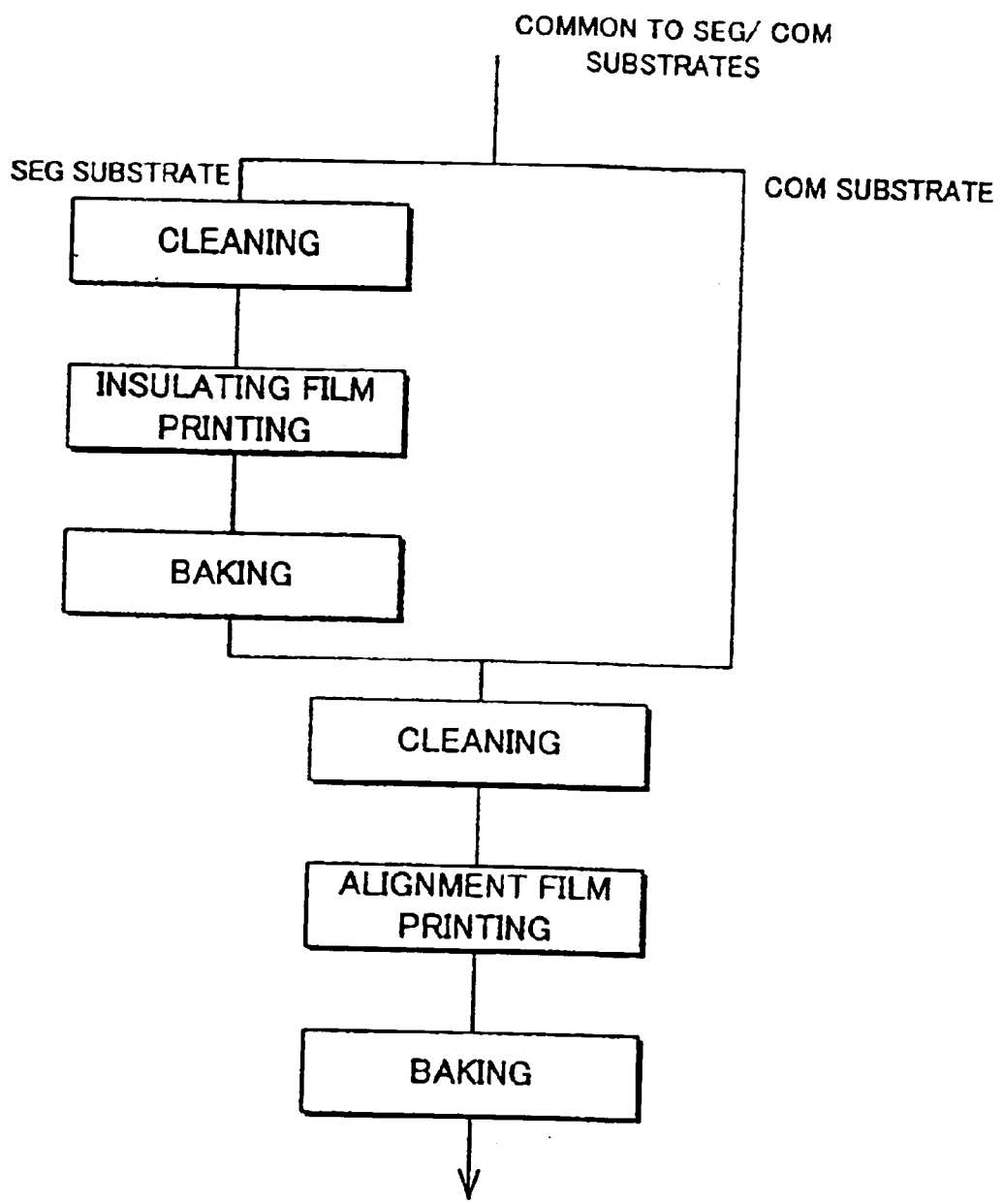
FIG. 19 is a flowchart illustrating a process from insulating film formation to alignment film formation according to the foregoing conventional LCD panel fabrication method.
Figure 20:
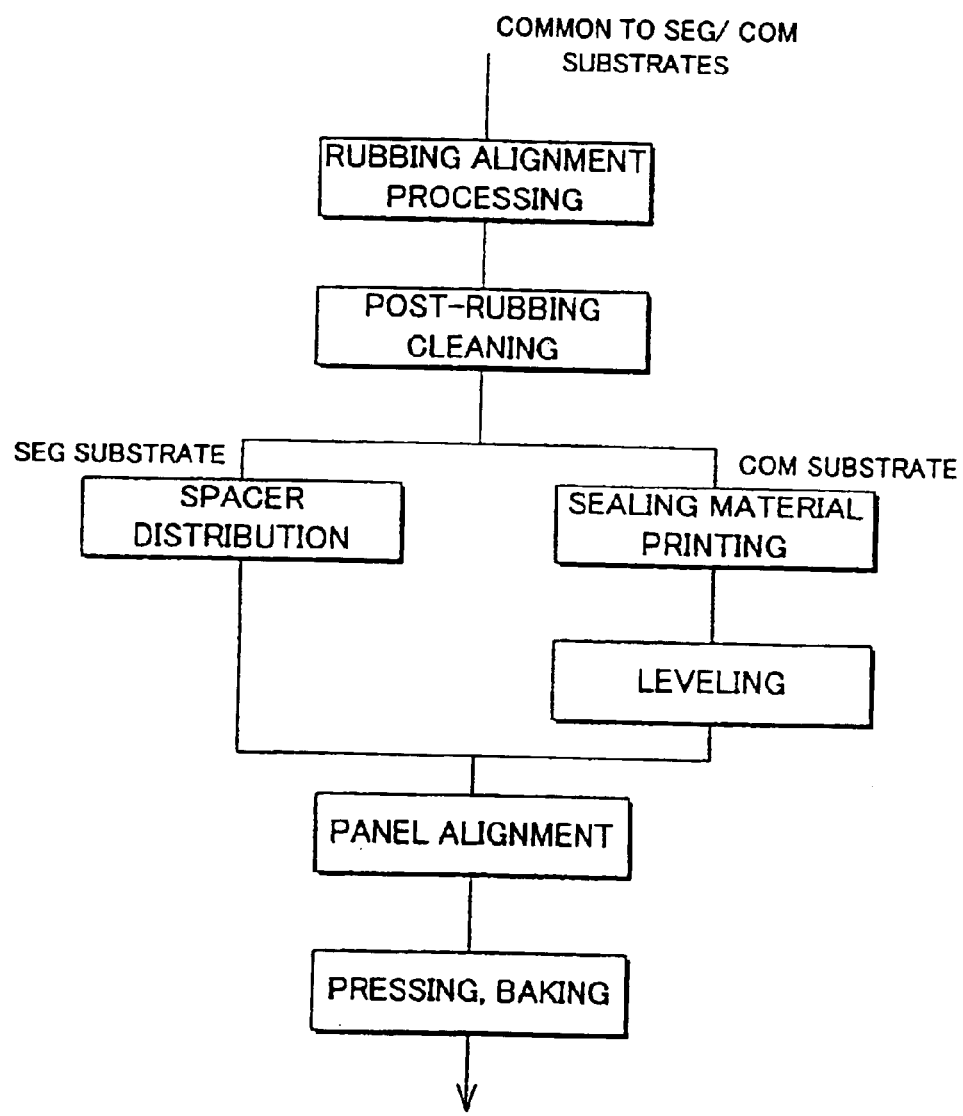
FIG. 20 is a flowchart illustrating a process from an alignment operation to panel alignment according to the foregoing conventional LCD panel fabrication method.
Figure 21:
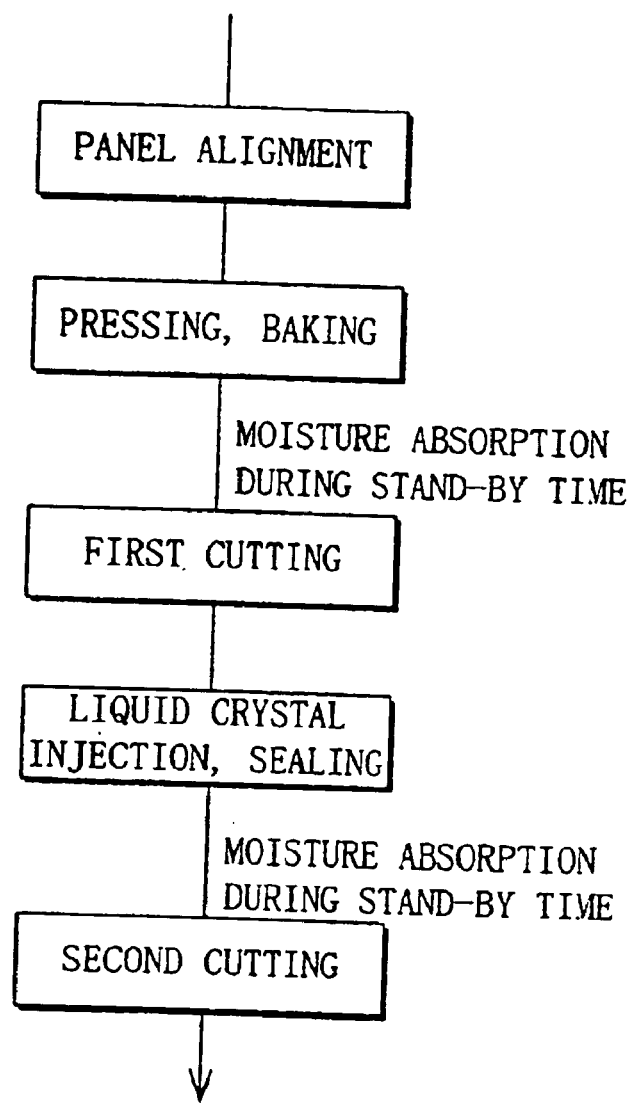
FIG. 21 is a flowchart illustrating a panel cutting process according to the foregoing conventional LCD panel fabrication method.
Figure 22:
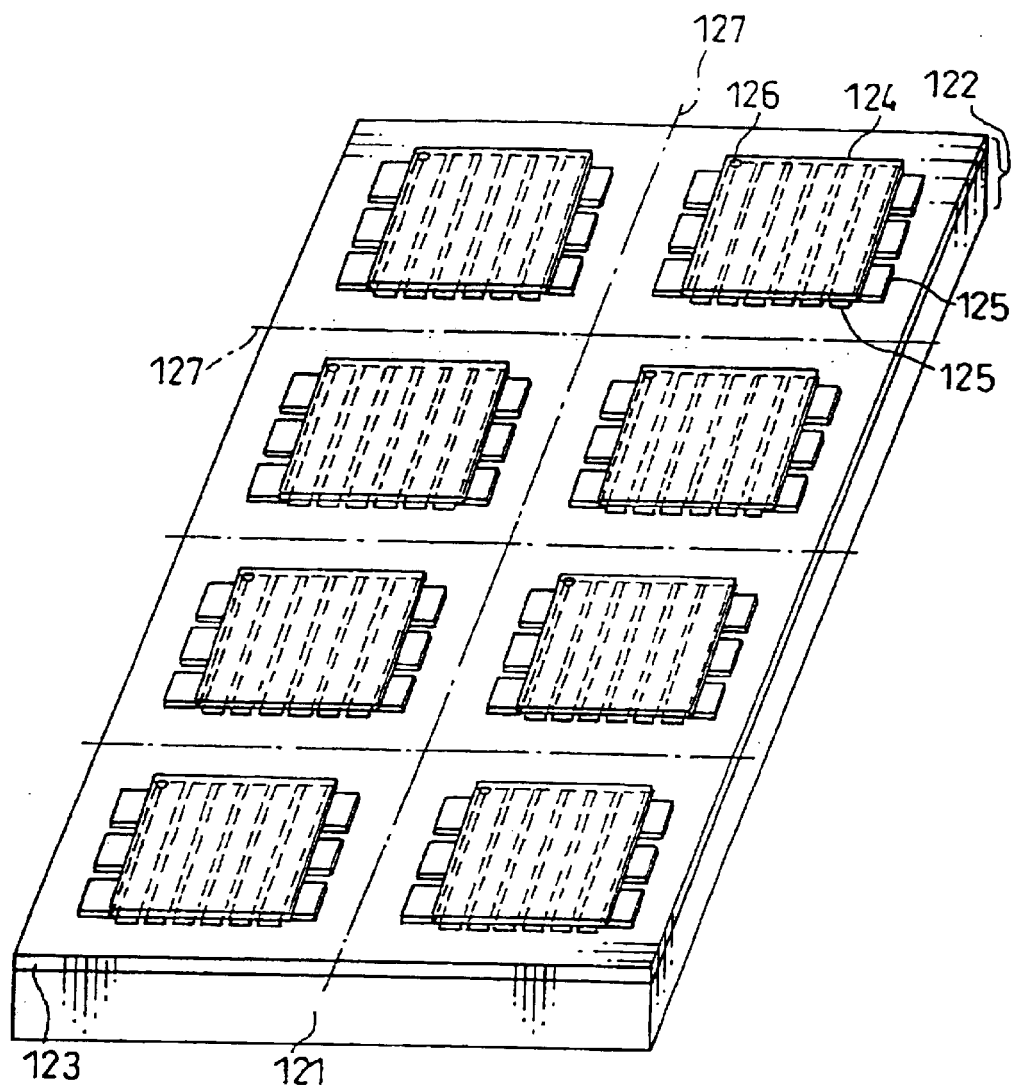
FIG. 22 is a concept view of a plastic film substrate fabricated by a conventional LCD panel fabrication method.

In the case where a plastic substrate made from PES is used as the foregoing flexible substrate, an original size of the flexible substrate having undergone a dimensional change due to absorption of moisture can be recovered by drying at 50° C., irrespective of moisture absorbing conditions, as shown in FIG. 17. Further, the PES substrate becomes completely dried by a heating operation at 50° C. for 10 hours as shown in FIGS. 20 and 3, thereby coming to have a substrate size exhibiting no influence of moisture absorption. The substrate size in this state is hereinafter referred to as original size of a substrate.

FIGS. 5(a) and 5(b) are explanatory views illustrating a ratio of a dimensional change of a flexible substrate in the case of a heat treatment at 100° C. for 5 hours, and that in the case of a heat treatment at 150° C. for 1 hour, with respect to the dimensional change in the case of a heat treatment at 50° C. for 10 hours that provides the original size: FIG. 5(a) illustrates a dimensional change ratio in the case where the heat treatment was carried out by means of the heated air circulating oven and FIG. 5(b) illustrates a dimensional change ratio in the case where the heat treatment was carried out by means of the single substrate transfer oven.

As shown by FIGS. 5(a) and 5(b), greater variation is seen in dimensional changes of flexible substrates subjected to a heat treatment by the heated air circulating oven that provides greatly varying temperature profiles, as compared with dimensional changes of flexible substrates subjected to a heat treatment by the single substrate transfer oven that provides temperature profiles that vary less.

Therefore, it can be seen from FIGS. 5(a) and 5(b) that by using the single substrate transfer oven in the operation of baking the SEG substrates 1 and the heat treatment applied to the COM substrates 2, dimensional change variation between flexible substrates and a magnitude of a dimensional change occurring to each flexible substrate, that is, dimensional change variation between the SEG substrate 1 and the COM substrate 2, dimensional change variation between the SEG substrates 1, dimensional change variation between the COM substrates 2, and a magnitude of a dimensional change occurring to each SEG substrate 1 and each COM substrate 2, can be suppressed as compared with the case where the heated air circulating oven is used in the operation of baking the SEG substrate 1 and the heat treatment applied to the COM substrate 2.

For instance, in the case where a heat treatment is conducted at 150° C. for 1 hour with respect to each flexible substrate, a difference between respective dimensional change ratios of the foregoing SEG and COM substrates 1 and 2 subjected to the same heat treatment is about 0.05% (equivalent to a dimensional error of about 150 μm in the case of 300 mm-square substrate) in the case where the heated air circulating oven is used, while a difference between the same of the SEG and COM substrates 1 and 2 subjected to the same heat treatment is about 0.015% (equivalent to a dimensional error of about 45 μm in the case of 300 mm-square substrate).

This is due to influence of temperature variation at the heat treatment, and variation of a total quantity of heat applied to the flexible substrates including temperature variation upon temperature rise and temperature drop causes substrate shrinkage variation. Therefore, to make an error in size between the both substrates as small as possible, or preferably eliminate the same, it is preferable to control heating so as to make heat histories of the two substrates substantially identical, or more preferably completely identical.

For this purpose, in heat treatments applied to the substrates, temperature profiles actually applied to the substrates are preferably conformed with each other. More concretely, the heating is carried out under the same set conditions, or more preferably by means of heating devices (heating device) of the same type or by means of the same heating device (heating device). To conform the heat histories of the substrates to each other, a heat treatment applied to one of the substrate is preferably applied to the other substrate, and the heat treatments are preferably applied to the both substrates at substantially the same time, preferably with a time difference of not more than 1 minute, or more preferably simultaneously. By thus controlling the heating of the substrates so as to conform the heat histories of the substrates with each other, it is possible to achieve pattern alignment accuracy of the substrates. Note that in the present embodiments the heat history indicates temperatures and durations of heat treatments applied to a substrate in a process of fabrication of the same.

In the case where one of the substrates in pair (only the SEG substrate 1 in the present embodiment) is subjected to a heat treatment at a temperature necessary for the baking of an insulating film 8, concretely about 150° C. in the foregoing insulating film 8 formation process, substrate shrinkage occurs to the SEG substrate 1 as the substrate subjected to the heat treatment, that is 300 μm to 450 μm with respect to an original size of 300 mm-square size (300 mm-square substrate), in the case where the heated air circulating oven is used, as well as in the case where the single substrate transfer oven is used, as shown in FIGS. 5(a) and 5(b). Consequently, transparent electrode pattern alignment cannot be achieved at all in the pair of substrates.

Figure 16:
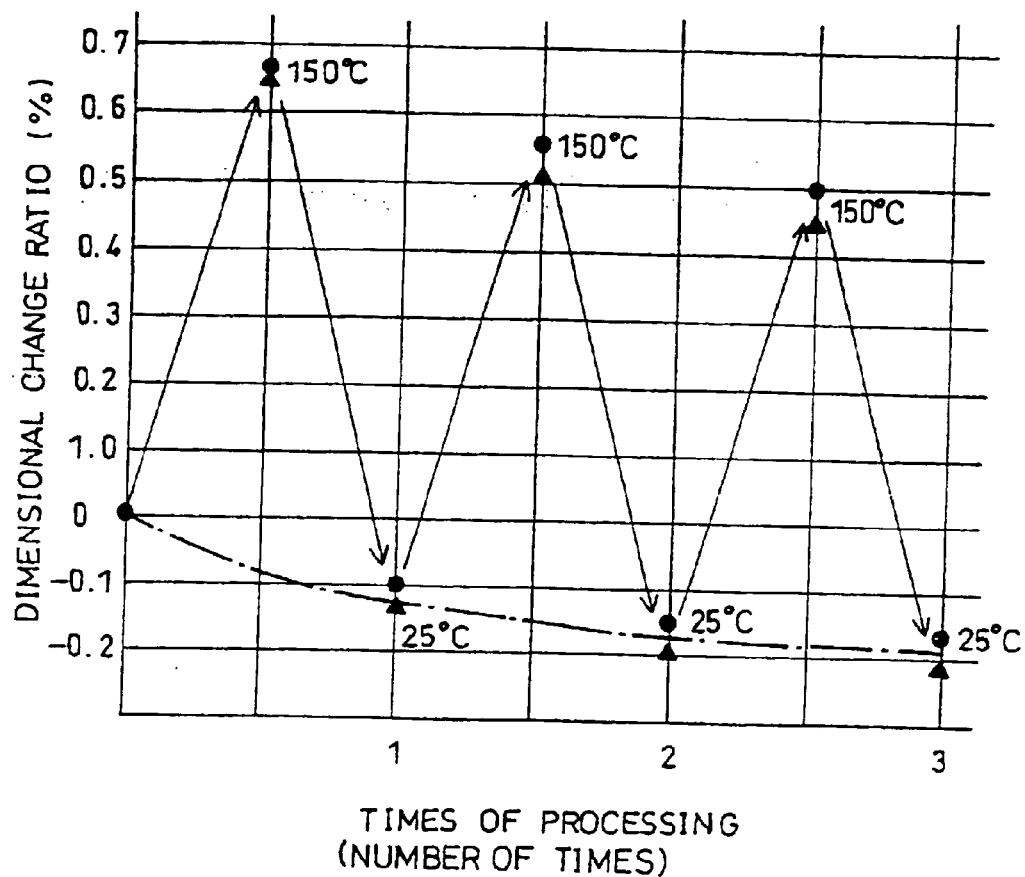
FIG. 16 is a graph illustrating a swelling/shrinkage behavior of a PES substrate used in the flexible LCD panel in the case where it is repeatedly subjected to a heat treatment under same temperature conditions.

On the contrary, in the case where a heat treatment applied to the SEG substrate 1 is also applied to the COM substrate 2 as in the present invention, a difference in size between the SEG and COM substrates 1 and 2 can be made smaller by the application of the heat treatment to the COM substrate 2. Further, by subjecting the COM substrate 2 to a heat treatment under identical conditions to those of the heat treatment applied to the SEG substrate 1, a difference in size between the SEG substrate 1 and the COM substrate 2 can be suppressed, when they are 300 mm-square substrates, to at most 150 μm in the case where the heated air circulating oven is used as the foregoing heating device, or to at most 45 μm in the case where the single substrate transfer oven is used. Actually, there are several times of heat treatment processes in the fabrication process, and degrees of substrate shrinkage due to heat tend to converge and to be equalized as the total quantity of heat increases as shown in FIG. 16. As a result, in the alignment process, differences in substrate sizes finally become at most 100 μm and at most 30 μm, respectively.

In the case where the foregoing flexible LCD panel is an LCD panel in which the transparent electrode pattern on the SEG substrate 1 and the transparent electrode pattern on the COM substrate 2 are stripe patterns crossing each other, pattern alignment accuracy of at least about 100 μm (±50 μm) may be secured. Therefore, it is preferable to use a single substrate transfer oven as the foregoing heating device, but use of the heated air circulating oven that has rough temperature distribution accuracy enables to secure the foregoing accuracy.

In the case where a screen is displayed being divided into upper and lower halves, however, superimposition of the SEG pattern and the COM pattern at the border of the upper and lower halves requires alignment accuracy of about 40 μm (±20 μm). Therefore, uniformity of temperature variation is required even upon temperature rise and temperature drop, and the uniformity of temperature profiles shown in the example of the single substrate transfer oven is a prerequisite for securing accuracy.

Thus, in the present embodiment, a range of an acceptable tolerance of the substrate size variation is appropriately set according to a purpose of use and a desired arrangement of an flexible LCD device aimed to provide, that is, a type of the flexible LCD device.

Figure 6:
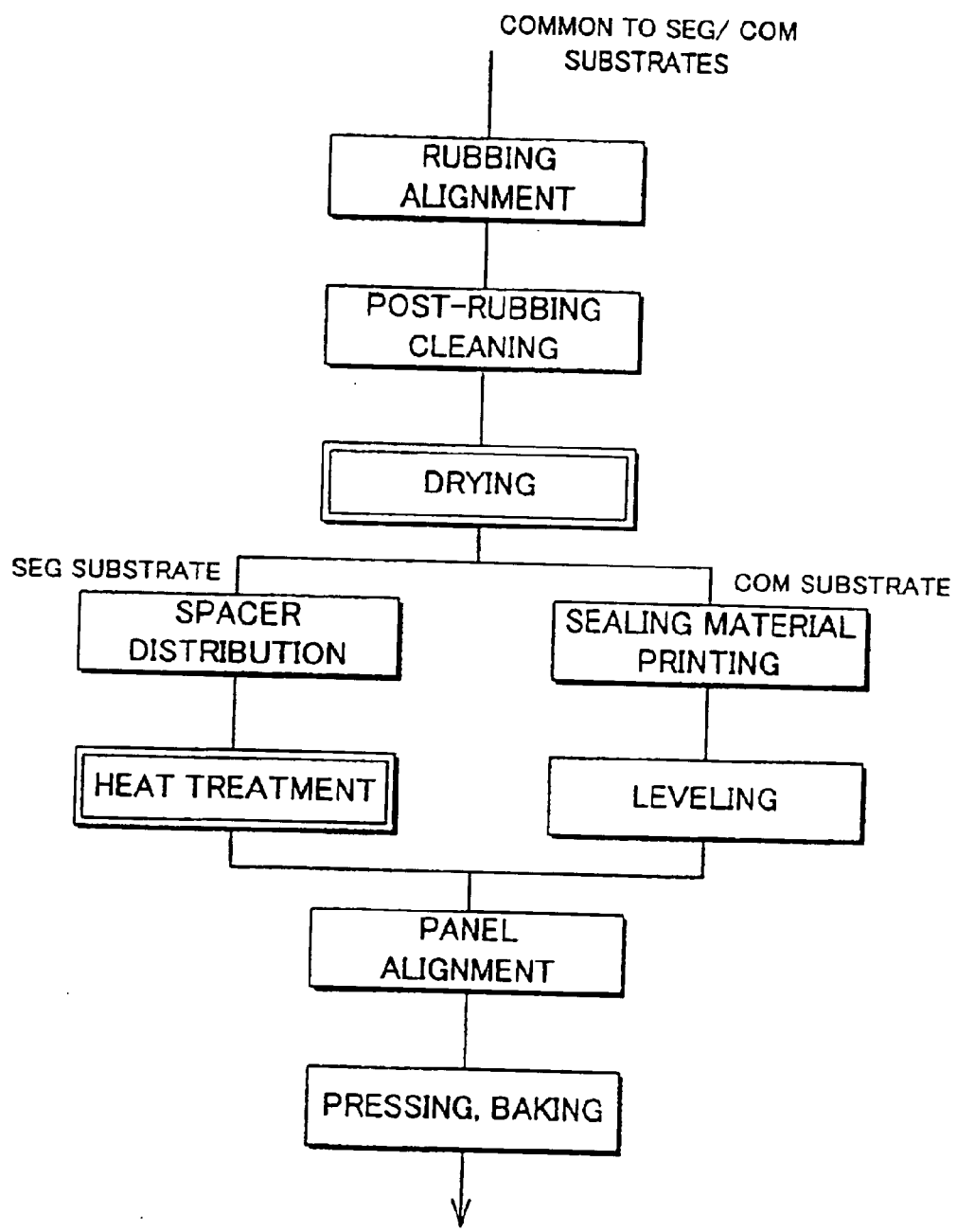
FIG. 6 is a flowchart showing a process from a rubbing alignment operation to panel alignment according to the foregoing flexible LCD panel fabrication method.

Next, the following description will, referring to FIG. 6, explain a process flow since the rubbing operation with respect to the SEG and COM substrates 1 and 2 until the operation of panel alignment of the SEG and COM substrates 1 and 2, in the process of fabrication of the flexible LCD panel in accordance with the present embodiment.

As shown in FIG. 6, in the present embodiment, a drying operation (indicated by a double-line frame in the Figure) is applied to the SEG and COM substrates 1 and 2 that have been subjected to post-rubbing cleaning following to the rubbing operation.

Thus, by applying the drying operation after the post-rubbing cleaning operation, the SEG and COM substrates 1 and 2 that have swollen by absorbing moisture in the post-rubbing cleaning operation can be made to have sizes close to, or equal to, the original sizes before the post-rubbing cleaning operation (during the rubbing operation).

It is possible to dry the COM substrate 2 that has swollen by absorbing moisture during the post-rubbing cleaning operation, by a heat treatment during a leveling process (COM substrate 2) that will be described later, but since the heat treatment in the leveling process is aimed to nothing other than the leveling, it is difficult to secure a sufficient time for the drying operation. Besides, if the COM substrate 2 is subjected to a heat treatment for a long time so as to dry the same, there arises a problem that a sealing material printed before the leveling operation becomes hardened. Therefore, only an insufficient dried level of the COM substrate 2 can be achieved by the leveling operation, and a difference in size between the SEG and COM substrate 1 and 2 become greater in this case as compared with the case where the substrates are subjected to the foregoing drying operation.

To solve the foregoing problem, as in the method in accordance with the present embodiment, a drying operation is applied to the substrates before the panel alignment, or more concretely before the post-rubbing cleaning operation, the sizes of the SEG and COM substrates 1 and 2 are returned to the original sizes thereof before the post-rubbing cleaning operation once. By so doing, the drying effect due to the heat treatment during the leveling operation in the subsequent process can be restricted to cancellation of the moisture absorption from the ambient environment during the stand-by time until the sealing material printing operation after the post-rubbing cleaning operation. In other words, the shrinking effect of the COM substrate 2 due to the heating during the leveling operation and the shrinking effect of the SEG substrate 1 due to the heat treatment applied to the SEG substrate 1 according to the conditions of the leveling operation are used limitedly for the purpose of causing the substrates to have the same size.

Used as a drying method may be a method in which the SEG and COM substrates 1 and 2 are heated and dried by a heating device such as the heated air circulating oven or the single substrate transfer oven, or a method in which the substrates are subjected to vacuum drying by means of a pressure reducing device such as a vacuum dryer.

Figure 7A:
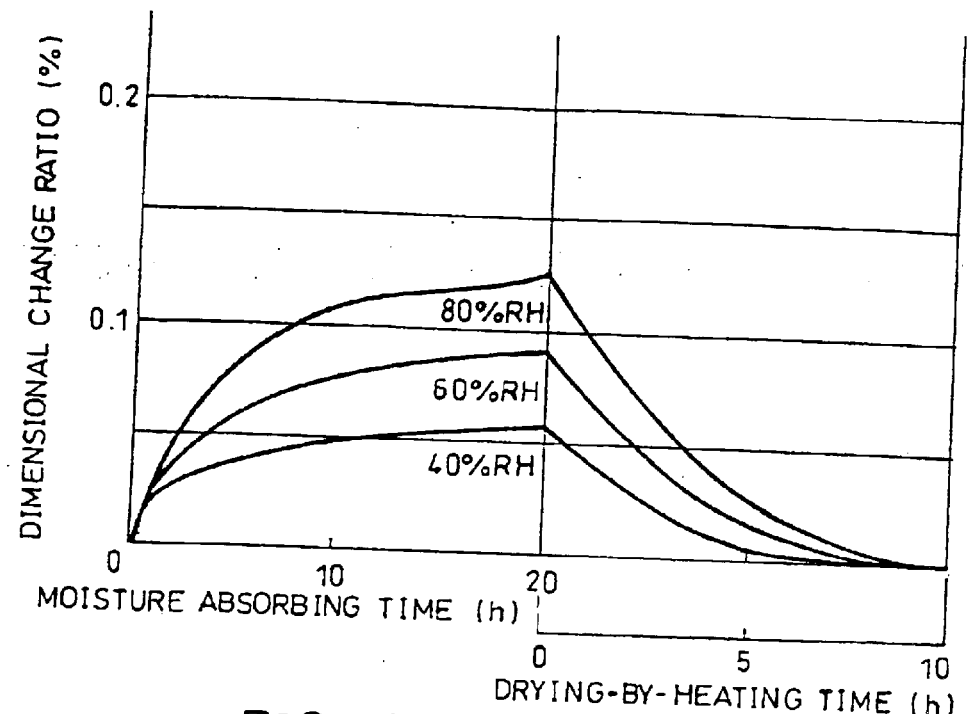
FIGS. 7(a) and 7(b) are graphs illustrating a swelling/shrinkage behavior of a PES substrate used in the foregoing flexible LCD panel in the case where, after the PES substrate is caused to absorb moisture in different environments, it is subjected to a drying operation under same conditions.
Figure 7B:
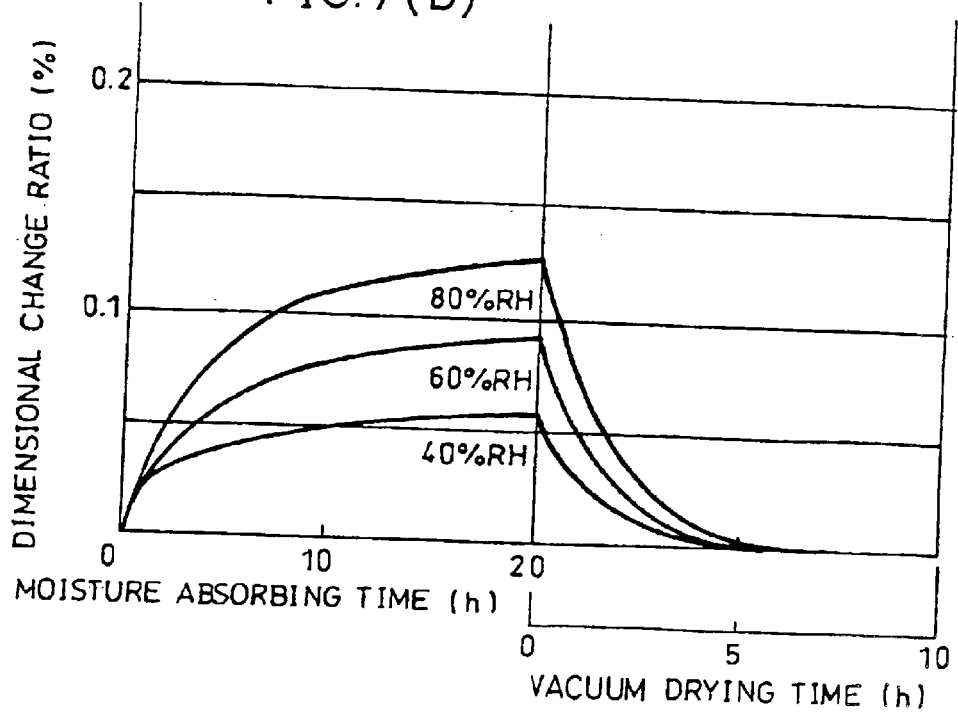

Here, the following description will explain swelling/shrinkage of a PES substrate used for the flexible LCD panel in the case where it is caused to absorb moisture under different conditions and thereafter it is subjected to drying operations under the same conditions, while referring to FIGS. 7(a) and 7(b).

FIG. 7(a) is a graph showing swelling/shrinkage in the case where a drying operation was carried out by a heating device, and FIG. 7(b) is a graph showing swelling/shrinkage in the case where a drying operation was carried out by a pressure reducing device. FIGS. 7(a) and 7(b) illustrate substrate dimensional changes in the case where a drying operation were carried out after the flexible substrate is left under different moisture conditions.

FIGS. 7(a) and 7(b) show dimensional changes that occurred to a substrate having been subjected to a heat treatment at 100° C. for 5 hours before being left to stand for moisture absorption: thus, a size resulting from the heat treatment at 100° C. for 5 hours before being left to stand for moisture absorption is a reference size, and dimensional changes referring to the reference size are shown in the figures.

Room temperature upon the foregoing moisture absorption is 22° C. to 24° C. (room temperature was uniformly set to 22° C. to 24° C. as an environmental condition under which the substrate was left, in the cases of the graphs of FIGS. 7(a) and 7(b)). FIG. 7(a) shows dimensional change ratios in the case where application of a heat treatment at 50° C. was adopted as a drying method, while FIG. 7(b) shows dimensional change ratios in the case where pressure reduction at $6.6661 \times 10^2$ Pa was carried out.

From FIGS. 7(a) and 7(b), it can be seen that as the humidity becomes higher, the flexible substrate swells since absorbing a greater quantity of moisture. Further, it can be seen that the substrate dimensional changes with time during the drying operations are different since quantities of moisture held in the substrates are different, and that a substrate having absorbed a greater quantity of moisture, having left in an environment with a high humidity requires a longer time to return to an original size. In the case of a drying operation by heating at 50° C., a substrate having been left under a relative humidity of 40% required about 7 hours, and a substrate having been left under a relative humidity of 80% required about 10 hours, to return to the respective original sizes. Further, in the case where a drying operation by pressure reduction at $6.6661 \times 10^2$ Pa is carried out, a substrate having been left under a relative humidity of 40% required about 5 hours, and a substrate having been left under a relative humidity of 80% required about 6.5 hours, to return to the respective original sizes. This shows that the drying time can be shortened by conducting pressure reduction as the drying operation.

The foregoing drying operation is preferably conducted under conditions such that the sizes of the SEG and COM substrates 1 and 2 are returned to the respective sizes before the post-rubbing cleaning operation. However, the sizes of the substrates are not necessarily returned to the sizes before the post-rubbing cleaning operation, as long as substantially identical heat histories can be applied to the substrates, respectively, and as long as the swelling states due to moisture absorption can be uniformly cancelled to a level such that pattern alignment accuracy upon alignment of the substrates can be ensured. In other words, the SEG and COM substrates 1 and 2 may be subjected to substantially identical drying operations, which are concretely drying operation such that when a raised substrate-holding temperature (steady temperature) at which one substrate is held is 50° C. to 80° C., for instance, the other substrate is subjected to a drying operation with a substrate-holding temperature that is ±5° C. to the foregoing substrate-holding temperature, during a processing time that is not more than 5% longer or shorter as compared with the foregoing processing time, in a range of 3 to 5 hours, or more preferably, the SEG and COM substrates 1 and 2 are subjected to the same drying operation, so that substantially identical heat histories are given to the substrates. By so doing, a difference in size between the SEG and COM substrates 1 and 2 can be made smaller, so that a flexible LCD panel can be fabricated with good pattern alignment accuracy at a lower cost.

Applied as a method for returning the sizes of the SEG and COM substrates 1 and 2 to the respective sizes before the post-rubbing operation is a method in which the SEG and COM substrates 1 and 2 are subjected to a drying operation for not less than a certain time at a specific temperature, for example, 50° C. to 80° C., that is set according to a type of an organic material used in the foregoing flexible substrate so that the substrates should not shrink smaller than the sizes before the swelling due to moisture absorption, or a method in which the SEG and COM substrates 1 and 2 are subjected to a drying operation under a specific vacuum condition, for instance, not more than $1.33322 \times 10^3$ Pa for a not less tan a certain time. In other words, by applying at least a heat treatment for a certain time set according to a type of an organic material used in the flexible substrate so that the size of the flexible substrate should return to the foregoing original size, it is possible to easily return the substrate to the original size.

Any one of the foregoing methods can be adapted for the drying operation, but the vacuum drying operation by means of a vacuum device is preferable since shrinkage (property modification) of the substrate per se due to heat does not occur, and hence, shrinkage of the substrate to a size smaller than the original size before the swelling due to absorption of moisture does not occur. As a result, this provides easier control of dimensional changes, and allows both the substrates to return to their respective original sizes before the swelling due to moisture absorption.

Incidentally, it is possible to return the sizes of the flexible substrates to their original sizes by carrying out a drying operation at a temperature higher than the foregoing temperature, for example, 100° C. or 150° C. as described above, for a time set beforehand such that the flexible substrates should come to have the original sizes. However, since an abrupt rise of temperature causes abrupt shrinkage, the aforementioned method is preferably adapted, from the viewpoint of controllability.

In the case where the SEG and COM substrates 1 and 2 are caused to return to their sizes before the post-rubbing cleaning operation, different drying operations may be applied to the substrates, respectively. However, considering controllability, it is preferable to apply substantially identical drying operations, or more preferably, the same drying operation, to the substrates.

Furthermore, for improvement of the pattern alignment accuracy of the substrates, the foregoing drying operation may be carried out at least before panel alignment of the SEG and COM substrates 1 and 2. However, to suppress time-factor-dependent variation of substrate shrinkage caused by the drying operation, and further, time-factor-dependent variation of substrate swelling caused by moisture absorption after drying, the foregoing drying operation is preferably applied to the other substrate when it is also applied to the other substrate: it is preferable to apply the same to both the substrates substantially simultaneously, or more preferably, with a time lag not more than 1 minute, or furthermore preferably, simultaneously. By applying the foregoing drying operation that functions to return the substrates before alignment to their original sizes with respect to the substrates at substantially the same time, or preferably, simultaneously, it is possible to conform the behaviors of swelling/shrinkage of the substrates with each other at the starting point of the behaviors, so that a difference in size of the substrates should fall in a desired range. This provides more precise panel alignment, and hence enables to fabricate a flexible LCD panel with enhanced pattern accuracy.

As shown in FIG. 6, processing operations applied to the SEG and COM substrates 1 and 2 after drying are different. The COM substrate 2 is subjected to a heat treatment at about 80° C. for leveling, after printing the sealing material. On the other hand, the SEG substrate 1 is subjected to a heat treatment under the same conditions as those for the heat treatment for leveling that is applied to the COM substrate 2 (indicated by a double-line frame in FIG. 6).

Thus, according to the method of the present embodiment, the heat treatment applied only to the COM substrate 2 in the conventional method is carried out with respect to the SEG substrate 1. This causes respective degrees of shrinkage occurring to the SEG and COM substrates 1 and 2 due to heat to become equal with each other, thereby enabling to prevent these substrates from having different sizes.

Furthermore, according to the method of the present embodiment, both the SEG and COM substrates 1 and 2 are subjected to a drying operation before panel alignment of the SEG and COM substrates 1 and 2. This enables to suppress an influence of swelling of the SEG and COM substrates 1 and 2 due to moisture absorption, as well as to prevent the substrates from having a difference in size.

In the case where, not the aforementioned fabrication method in accordance with the present embodiment, but a method in which the drying operation and the heating operation indicated by the double-line frames in FIG. 6 is applied as conventionally, the following problem arises.

By the conventional method, a substrate having swollen due to moisture absorption after the post-rubbing cleaning operation is used as one of the substrates to be aligned to each other (the SEG substrate 1 in the present embodiment). This is because the other substrate (the COM substrate 2 in the present embodiment) that has once swollen due to moisture absorption during the post-rubbing operation is dried, thereby shrinking, since being subjected to the sealing material printing and a heat treatment for leveling, and accordingly the substrate becomes no longer affected by an influence of the swelling due to moisture absorption after the post-rubbing operation. However, whether the other substrate completely returns into its original size in a dried state (its size during the rubbing alignment operation), or it shrinks due to heat to a size smaller than the original size, depends on conditions of a heat treatment.

Therefore, in the conventional method, a pair of substrates are aligned to each other, in a state in which one substrate remains in a swollen state due to moisture absorption, while the other substrate has become in a shrunken state to a smaller size or has returned to its original size. In the case where such two substrates in different swollen/shrunken states are aligned to each other, precise alignment cannot be achieved between the electrode patterns of the two substrates.

However, this problem of the conventional method can be solved by application of the flexible LCD panel fabrication method in accordance with the foregoing embodiment.

In the present embodiment, the SEG and COM substrates 1 and 2 are subjected to panel alignment, pressing and baking operations, after spacer distribution and a heat treatment with respect to the SEG substrate 1 and sealing material printing and leveling with respect to the COM substrate 2 are finished.

In the present embodiment, in the case where all the foregoing processing operations are successively conducted, the foregoing drying operation follows to a specific operation, concretely, the post-rubbing cleaning operation that affects a dimensional change of the substrate. However, in the case where stand-by times (STAND-BY) are provided between processing operations, it is preferable to conduct a drying operation at each stand-by time (STAND-BY).

Figure 8:
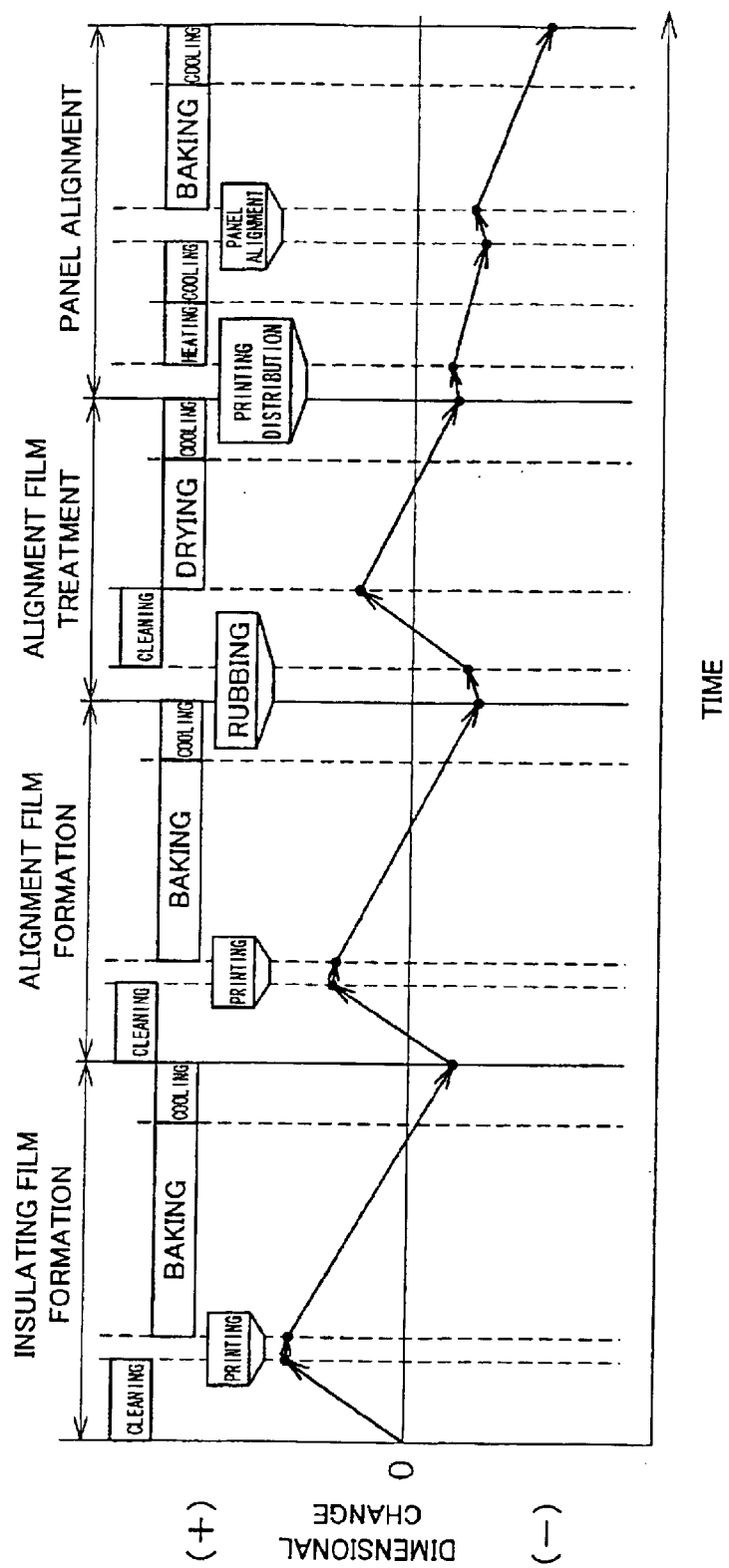
FIG. 8 is an explanatory view illustrating a swelling/shrinkage behavior of a flexible substrate in the case where all the processing operations from insulating film formation to panel alignment are continuously carried out.
Figure 9:
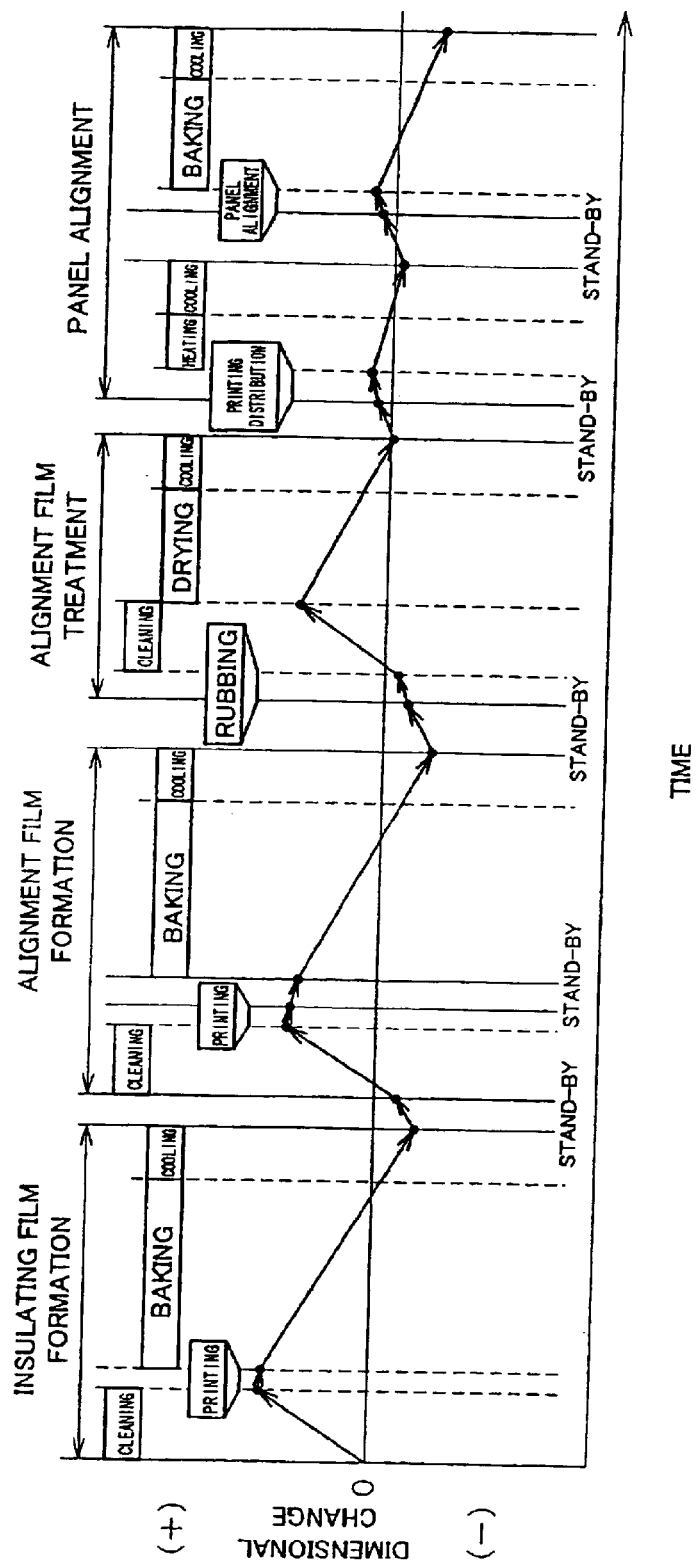
FIG. 9 is an explanatory view illustrating a swelling/shrinkage behavior of a flexible substrate in the case where stand-by times are provided between processes from the insulating film formation to the panel alignment.

FIGS. 8 and 9 illustrate a swelling/shrinking behavior (dimensional behavior) of a flexible substrate from the insulating film formation to the panel alignment in the LCD panel fabrication process. FIG. 8 is an explanatory view illustrating a swelling/shrinking behavior of a flexible substrate in the case where all the processing operations are successively carried out, and FIG. 9 is an explanatory view illustrating a swelling/shrinking behavior of a flexible substrate in the case where stand-by times are occasionally provided in the process, that is, a case close to a process in actual practice.

First of all, the following description will explain a dimensional behavior of a flexible substrate, referring to FIG. 8. Here, the flexible substrate before the insulating film formation is sufficiently dried, and has its original size.

In the case where the insulating film 8 is formed by printing, normally cleaning, printing, and baking operations are applied to the substrate. When the flexible substrate is subjected to cleaning with use of water-based cleaning liquid, the flexible substrate absorbs moisture and swells. A degree of swelling varies depending on cleaning time, temperature, etc. Subsequently, water is removed from a surface of the foregoing flexible substrate by air knife or the like, and a material of the insulating film 8 is printed on the flexible substrate surface by offset printing or the like. The ambient environment upon the printing is temperature of 23° C., and relative humidity of 60%. The flexible substrate having absorbed much moisture during the cleaning releases moisture in this environment, and shrinks with time. In other words, during the printing operation, the foregoing flexible substrate slightly shrinks. Then, upon the baking after the printing, the flexible substrate is dried as well as shrinks due to heat, and becomes in a size smaller than the original size, according to measurement of the substrate size after cooling. Incidentally, a degree of shrinkage greatly varies depending on baking conditions including baking temperature and time, a material of the flexible substrate, etc.

Generally, the insulating film 8 may be formed on one of flexible substrates in pair so as to achieve sufficient effects. Therefore, conventionally, only one of flexible substrates in pair is subjected to the baking for formation of the insulating film 8. A size of the substrate when the formation of the insulating film 8 is finished, however, is smaller than the size thereof before the baking, that is, before the formation of the insulating film 8, as shown in FIG. 8. Therefore, in the present embodiment, the other substrate, on which the insulating film 8 is not formed, is also subjected to baking.

During formation of alignment films 9a and 9b subsequently carried out, the substrates exhibit swelling/shrinking behaviors (dimensional behavior) identical to those during the foregoing formation of the insulating film 8, though sizes thereof at the start point are different.

During the aligning operation, the substrates are subjected cleaning, after a rubbing operation. The flexible substrates are in a dried state upon start of the rubbing operation, and then, they absorb moisture during the rubbing operation, thereby swelling. In the case where a cleaning liquid used in the cleaning operation after the rubbing operation is a water-based cleaning liquid, the flexible substrates also absorb moisture and swells.

A quantity of moisture absorbed in this case varies depending on processing conditions and a material of the substrates as the foregoing case, but variation between substrates is great since being swelling or shrinking, and hence, the substrates are subjected to a drying operation so as to have sizes closer to original sizes thereof, with smaller variation therebetween.

Ideally, the sizes of the foregoing flexible substrates at this point are returned to the original sizes by executing a sufficient drying operation, so as to minimize variation in size between the substrates.

In the panel alignment process, a panel alignment sealing material is printed on one of the foregoing flexible substrates in pair. On the other flexible substrate, generally, spacers for ensuring a cell gap are distributed. During the sealing material printing and the spacers distribution, the foregoing flexible substrates absorb moisture and swells. Subsequently, the flexible substrate having been subjected to the sealing material printing (the COM substrate 2 in the case of the flexible LCD panel shown in FIG. 1) is subjected to a heat treatment for leveling the printed film, and the flexible substrate is dried, thereby shrinking. In the present embodiment, the flexible substrate on which the spacers are distributed (the SEG substrate 1 in the case of the flexible LCD panel shown in FIG. 1) is also subjected to a heat treatment so that both the flexible substrates have the same size.

Thereafter the flexible substrates are aligned to adhere to each other, and are subjected to baking, so that the sealing material is hardened. In the panel alignment, the flexible substrates absorb moisture and swell, and during the baking operation for sealing material hardening, the substrates become dried as well as shrink due to heat. In the process from the insulating film formation to the panel alignment formation, the aforementioned dimensional behavior is exhibited by the flexible substrates.

FIG. 9 illustrates dimensional behaviors of the flexible substrates in the case where there are stand-by times at the following 5 periods: (1) since the insulating film formation process until the alignment film formation process; (2) since printing until baking during the alignment film formation process; (3) since the alignment film formation process until the aligning process; (4) since the aligning process to the panel alignment process; and (5) since heat treatment until panel alignment during the panel alignment process.

In the case where the flexible substrate in the stand-by time is in a dried state, the flexible substrate swells during the stand-by time, whereas in the case where it is in a moisture-absorbed state, the flexible substrate shrinks during the stand-by time. Therefore, in the case where stand-by times are inserted between the processes, dimensional changes of the substrates become different as compared with the case shown in FIG. 8, and consequently the sizes of the flexible substrates become different depending on their states during the stand-by times (an environment during stand-by and duration of the stand-by time).

Therefore, to control a difference between the sizes of the foregoing flexible substrates in pair, it is necessary, not only to make conditions of the processing operations match with each other as precisely as possible, but also to control the processing flows of both the substrates, including the stand-by times. For this purpose, to make the timings of carrying out the processing operations coincide between the flexible substrates in pair is very effective, and it is particularly effective to start the processing operations commonly applied to both the flexible substrates for the flexible LCD panel fabrication at substantially simultaneously, preferably with a time lag of not more than 1 minute, or more preferably, simultaneously.

Furthermore, in the case where a stand-by time is inevitable for a processing operation in the foregoing flexible LCD panel fabrication, it is very effective to hold both the flexible substrates in an environment kept in a desired constant dried state, preferably in a state in which the humidity is kept not more than 20%. Thus, a flexible substrate, retained in a stand-by state for a next operation, being piled up, in the fabrication process, is held in a desired constant dried state, and this prevents both the flexible substrates from absorbing moisture from ambient atmosphere during the stand-by time. Therefore, it is possible to suppress the swelling of the flexible substrates due to moisture absorption, and hence, to keep variation of size accuracy of the flexible substrates during the fabrication process within a tolerable range. Furthermore, in this case, it is possible to omit a drying operation that becomes unnecessary, for example.

As described above, according to the present embodiment, variation of sizes of the flexible substrates (i.e., sizes of transparent electrode patterns) can be suppressed to at most 30 $\mu$m. Therefore, since the present embodiment enables to make dimensional changes due to moisture absorption equal between the flexible substrates by simultaneously starting processing operations applied to the substrates, it is possible to obtain a flexible LCD panel that satisfies pattern alignment accuracy of 40 $\mu$m ($\pm$20 $\mu$m), including accuracy in panel alignment.

Figure 10:
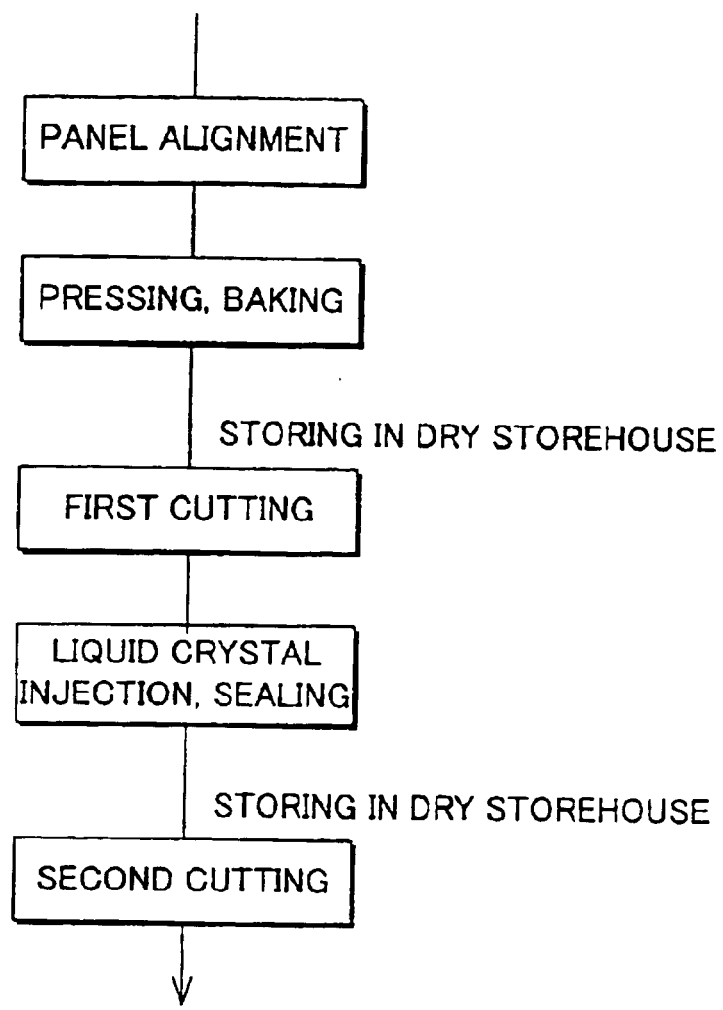
FIG. 10 is a flowchart of a panel cutting process according to the foregoing flexible LCD panel fabrication method.

The following description will explain a panel cutting process in the flexible LCD panel fabrication process shown in FIG. 1 in accordance with the present embodiment. FIG. 10 illustrates the panel cutting process flow.

In the panel cutting process, the SEG substrate 1 and the COM substrate 2 are first aligned with pattern positions aligned, and then, pressed and heated so that the sealing material 4 is sintered. By so doing, the panel alignment of the SEG and COM substrates 1 and 2 is completed.

Thereafter, the SEG and COM substrates 1 and 2 aligned as above are cut into desired panel sizes (first cutting), while kept in the above-described aligned state. Then, liquid crystal is injected into a space between the substrates. Further, after the injection of liquid crystal, second cutting is carried out upon necessity. According the method in the present embodiment, during stand-by times before the first cutting and before the second cutting, moisture absorption is prevented by storing the SEG and COM substrates 1 and 2 (hereinafter referred to as panel substrate, for conveniences' sake) in a dry warehouse, so that dimensional changes due to moisture absorption can be suppressed.

In the case where, unlike in the present embodiment, the panel substrate before cutting is not stored in a dry storehouse, the substrate swells due to absorption of moisture in the ambient environment, before the cutting process starts. Such swelling of the substrate varies depending on a state of moisture absorption determined by ambient temperature and duration of the stand-by time. Cutting positions of the panel substrate are determined by measuring the pattern dimensions, and if degrees of swelling of panel substrates are different from each other, the panel dimensions have to be measured for each panel substrate. This causes the lowering of productivity.

On the contrary, according to the method of the present embodiment, since the panel substrate is stored in a dry storehouse before cutting, it is possible to prevent the panel substrate before cutting from absorbing moisture, thereby suppressing dimensional changes. This causes all the panel substrates to be, preferably, in the same dried state, and therefore, makes it unnecessary to measure panel dimensions for each panel substrate to be cut. In other words, by applying the present fabrication method, the cutting positions of the panel substrate can be easily determined, and this causes the productivity to be enhanced.

Incidentally, apart from the method of storing each panel substrate in a dry storehouse, applicable as a method for preventing the substrate before cutting from swelling is a method in which a drying operation is applied to each panel substrate.

Figure 11:
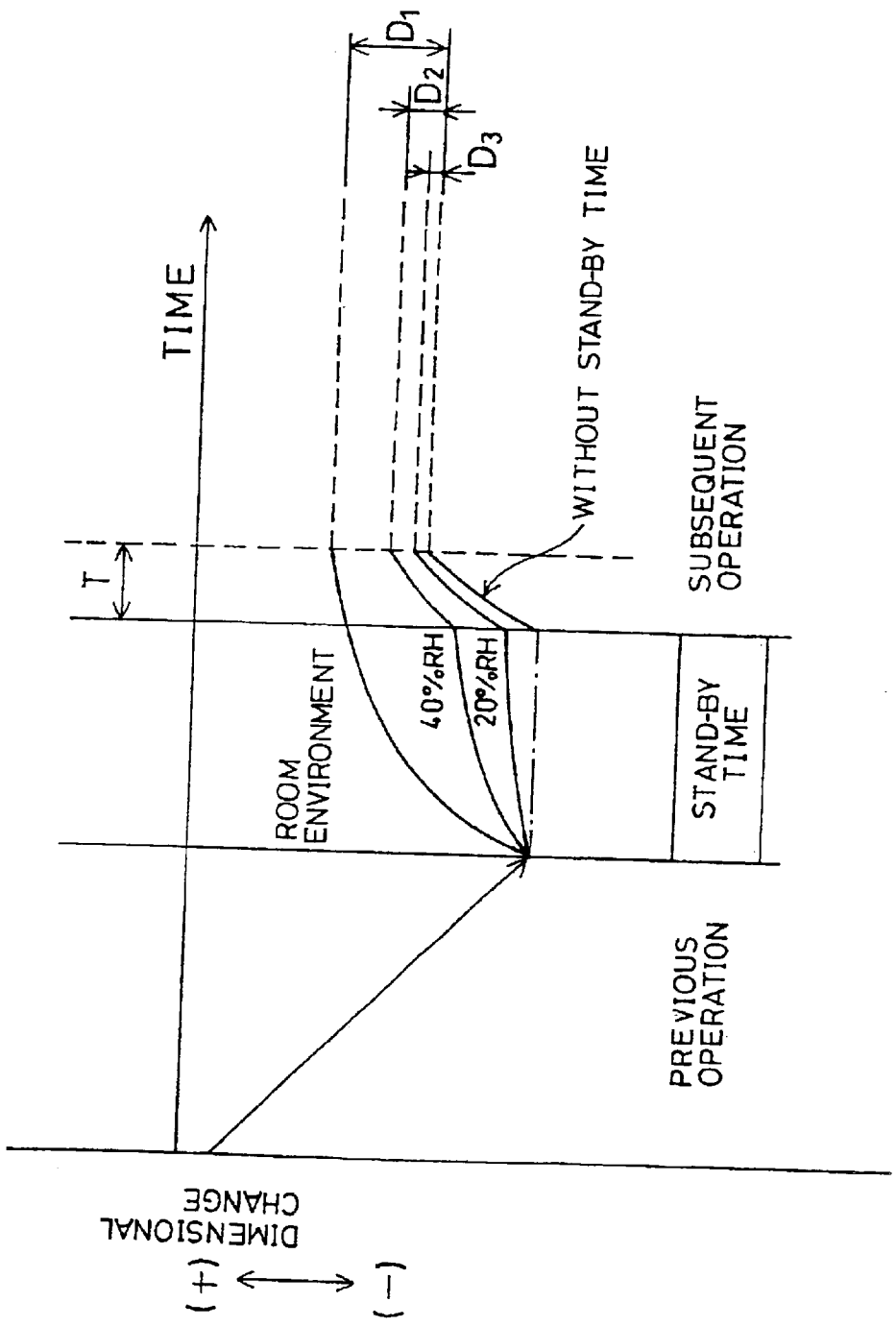
FIG. 11 is an explanatory view illustrating a swelling/shrinkage behavior of a flexible substrate depending on an environment during a stand-by time.

Here, a swelling/shrinking behavior (dimensional behavior) of the flexible substrate due to the environment during the stand-by time is shown in FIG. 11.

For instance, in the case where the flexible substrate is in a dried state due to the previous processing operation, the flexible substrate absorbs moisture and swells during the stand-by state. The degree of swelling is determined according to the ambient environment during the stand-by time.

FIG. 11 illustrates a dimensional behavior of a flexible substrate in a room environment with a temperature of 23° C. and a relative humidity of 60%, as well as, for comparison, models under a relative humidity of 40%, 20%, and a model without moisture absorption (in the case where it is stored in a dry state in which moisture absorption does not occur, or in the case where stand-by time is zero).

In the case where a processing operation following to the stand-by time is carried out in a room environment, it follows that dimensional changes of a flexible substrate having been left in a room environment are dimensional changes of the same when it continuously remained under the same conditions. On the other hand, dimensional changes of flexible substrates stored under different environments are dimensional changes that occurred under a room environment in which the humidity shifted respective values to 60% upon start of the subsequent.

In FIG. 11, assuming that size accuracy of the flexible substrate in the processing operation is determined during a time T since the subsequent processing operation, indicated with a broken line, a size of the flexible substrate stored in a room environment during the stand-by time is different, by a dimension $D_1$, from a size of the flexible substrate processed without a stand-by time. Likewise, a size of the substrate stored at the relative humidity of 40% is different by a dimension $D_2$, and a size of the substrate stared at the relative humidity of 20% is different by a dimension $D_3$. By storing substrates in a dry environment during the stand-by time, the differences between the dimensions $D_1$, $D_2$, and $D_3$ can be decreased.

Consequently, as to the swelling/shrinking behaviors shown in FIG. 9, the swelling due to moisture absorption during the stand-by time can be suppressed, thereby becoming closer to a dimensional behavior in the case where there is no stand-by time. Thus, an influence of variation of the stand-by times can be reduced. In the cutting and liquid crystal injection processes shown in FIG. 10, the flexible substrates are completely dried, having been subjected to the baking operation in the panel alignment process before the first cutting process, as well as a liquid crystal injecting operation by vacuum injection before the second cutting process. By placing the flexible substrate in a dry environment during these stand-by times before the cutting operations, the swelling of the flexible substrates can be suppressed, while the substrates can be cut into desired sizes.

As general cutting accuracy, accuracy of about ±150 μm is required, but according to the present embodiment, it is possible to sufficiently satisfy the foregoing cutting accuracy, as described above.

Incidentally, applicable as a general method for making the sizes of the flexible substrates equal to each other is, for instance, a method in which both the flexible substrates are left until they become adjusted to the ambient environment so that the dimensional behaviors of the substrates should become completely stabilized. In this case, however, a stand-by time for several days is needed before each processing operation, and hence, it is impractical.

According to the present embodiment, as described above, by applying substantially identical, or preferably, the same heat treatment or drying operation to both the flexible substrates, and more preferably, by making the timings of carrying out the processing operations coincide between the flexible substrates, it is possible to carry out the fabrication by easier humidity and temperature control, with use of the conventional fabrication process, device, production means, with good pattern accuracy, at lower costs.

As described above, it is particularly preferable to conform the heat histories of the plastic substrates 6a and 6b provided on the SEG and COM substrates 1 and 2, respectively, to each other, and to maintain dried states of the plastic substrates 6a and 6b, for good accuracy in pattern alignment between the SEG and COM substrates 1 and 2.

Furthermore, by carrying out the temperature-controlled processing operation and the drying operation substantially simultaneously, or preferably, simultaneously, it is possible to actively control the size accuracy of the substrates.

Incidentally, in the foregoing explanation, processes after the insulating film formation are mainly taken as examples, but application of the present flexible LCD panel fabrication method is not limited to the processes after the insulating film formation. It may be applied to processes before that, for instance, formation of color filters, and transparent electrode formation.

For instance, in the simple-matrix-type LCD panel in accordance with the present embodiment shown in FIG. 1, color filters 11 are formed only on the COM substrate 2. Each color filter 11 is composed of a color filter section corresponding to each color of RGB, and a light-blocking black matrix section provided between the patterns of these colors of the color filter sections. In this case, for instance, color filter sections that absorb or block ultra-violet rays are patterned on the plastic substrate 6b, and a photosensitive resin material containing photosensitive resin composition, for example, photosensitive black ink is provided, so as to constitute black matrix sections, by screen printing or the like on the plastic substrate 6b on which color filter sections are formed. Then, the foregoing plastic substrate 6b is subjected to prebaking (heat treatment). By so doing, a black ink layer is formed.

In this case, since the color filters 11 are provided only on the COM substrate 2, the foregoing prebaking operation is unnecessary for the SEG substrate 1. As described above, however, application only to one substrate of a treatment that would cause substrate shrinkage leads to a difference between the substrates in pair, thereby causing the pattern alignment accuracy to lower. Therefore, in the case where one of substrates in pair is subjected to a treatment that causes swelling or shrinkage of the substrate, a treatment of an identical type is applied to the other substrate irrespective of necessity of application of the treatment to the other substrate, in processes before the insulating film formation as well as in the processes after the insulating film formation. This is important for enhancing pattern alignment accuracy, and fabrication of a flexible LCD panel at a good non-defective ratio.

Incidentally, a part of formation of black matrix sections in the color filters 11 is explained in the foregoing explanation, but identical problems arise in the case where the color filter sections are formed by photosensitive-resin-using pigment dispersion, pigment-dispersed-film transfer, or printing, etc. Furthermore, identical problems arise, for instance, in the case where wall-like spacers are formed, in the place of the foregoing spacers 5, with a photo-cured resin. Therefore, in the case where upon formation of patterns it is required, for the pattern formation, to subject one of substrates in pair to a processing operation that causes the substrate to swell or shrink, the other substrate is subjected to an operation of the same type as that for the foregoing processing operation.

Incidentally, examples of the foregoing patterns, apart from the foregoing transparent electrodes 7a and 7b, the color filters 11, the insulating film 8, the alignment films 9a and 9b, include various patterns desirable for purposes, such as dummy color filters, level different adjusting films, photoresist films, transparent conductive films, semiconductor films, absorbing filters, metal conductive films, metal reflection films, multilaminar reflection films, metal masks, mirrors, visible light blocking films, coloring films, transparent films, white diffuse reflection films, undercoat films, gas barrier films, topcoat films, diffuse reflection films, wall-like spacers, etc.

Furthermore, the flexible LCD panel shown in FIG. 1 that is fabricated by the flexible LCD panel fabrication method in accordance with the present embodiment is arranged so that the insulating film 8 is provided on the SEG substrate 1, but it is possible to arrange the same so that the insulating film 8 is provided on the COM substrate 2. In the latter case, in the insulating film formation process, operations applied to the SEG substrate 1 and the COM substrate 2 in the former case are reversely applied thereto, respectively.

Furthermore, in the flexible LCD panel fabrication process in accordance with the present embodiment, spacers are distributed over the SEG substrate 1, while a sealing material is printed on the COM substrate 2. It is, however, possible that conversely a sealing material is printed on the SEG substrate 1 while spacers are distributed over the COM substrate 2. In the latter case, the processes for the SEG and COM substrates 1 and 2 upon panel alignment in the former case are reversely applied to the SEG and COM substrates 1 and 2, respectively.

Furthermore, in the present embodiment, patterns provided on the substrates (SEG substrate 1 and COM substrate 2) are transparent electrodes 7a and 7b, but a combination of patterns provided on the SEG and COM substrates 1 and 2 may be transparent electrode pattern/color filter pattern, or active element pattern (TFT, etc.)/color pattern, etc.

Furthermore, in the foregoing explanation, an arrangement of a simple-matrix-type LCD panel is mainly explained, but the flexible LCD panel in accordance with the present embodiment is not limited to the simple-matrix-type LCD panel. The present invention is generally applicable to all types of flexible LCD panels employing flexible substrates made of organic materials, that is, flexible LCD panels in which a difference in size between the substrates in pair occurs in the case where one of the substrates is, upon formation of patterns, subjected to a processing operation that causes swelling or shrinkage of the substrate.

Furthermore, in the flexible LCD panel fabrication method in accordance with the present embodiment, the present invention is applied to a method in which pattern-provided large-size substrates are aligned and thereafter cut into a panel size. The present invention, however, is applicable to a method in which one large-size panel is produced by aligning pattern-provided large-size substrates. In the latter case as well, an identical effect of producing the panel with good accuracy in size can be achieved.

The following will discuss, as examples, fabrication systems of a flexible liquid crystal display panel in accordance with the present embodiment.

Figure 12:
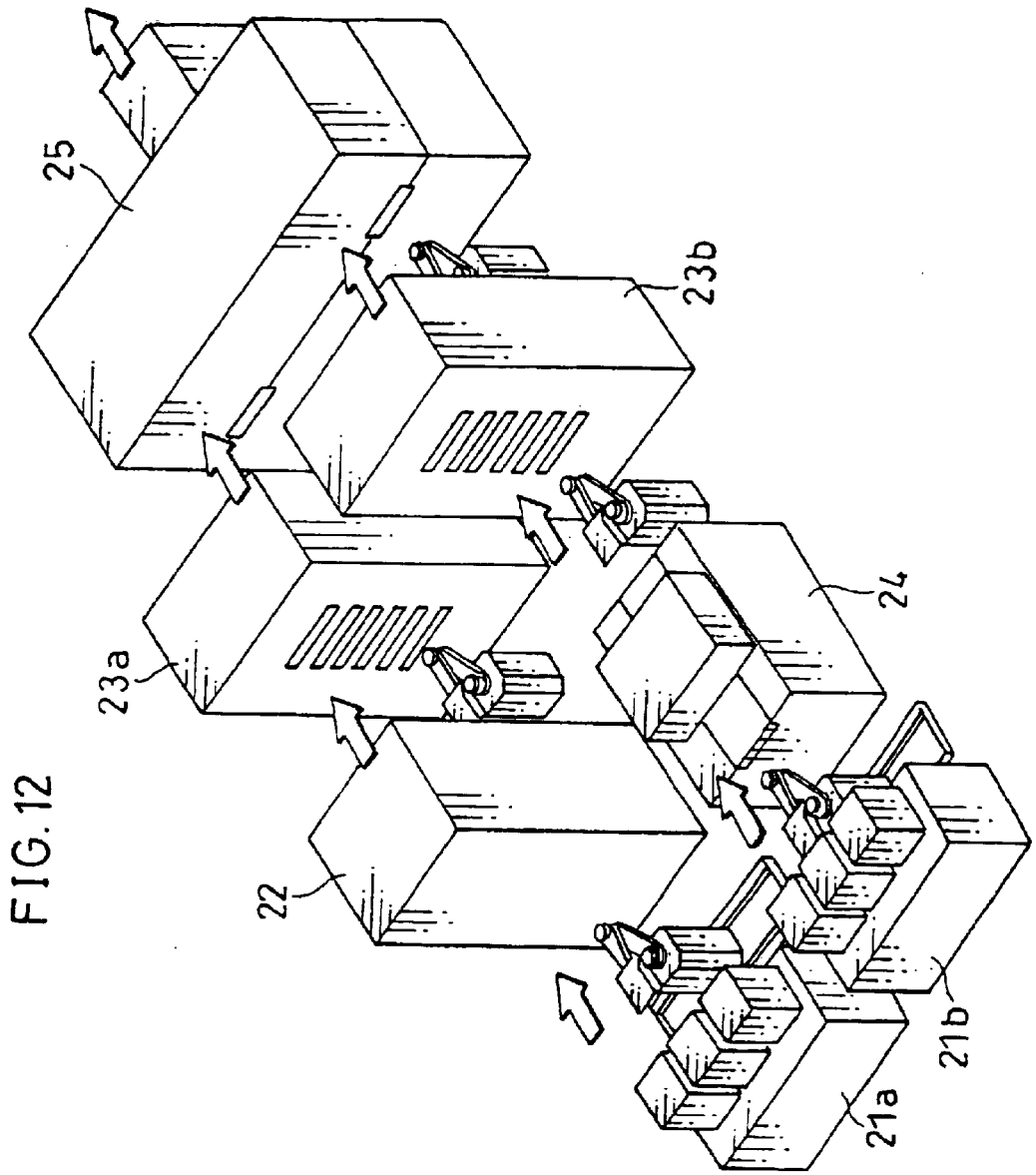
FIG. 12 is a perspective view illustrating an arrangement of a fabrication system of a flexible LCD panel in accordance with an embodiment of the present invention.

FIG. 12 shows an arrangement of a fabrication system (production line) of a flexible liquid crystal display panel for use in an alignment process. The production line includes two branch lines (substrate transport sections) extending parallel to each other, one for SEG substrates 1 and the other for COM substrates 2. The line for SEG substrates 1 is equipped with a mounting device 21a, a spacer distribution device (processing means) 22, and a heating device (heat processing means (processing means)) 23a. The line for COM substrates 2 is equipped with a mounting device 21b, a sealing material printing device (processing means) 24, and a heating device (heat treatment means (processing means)) 23b. In this production line, the mounting device 21a and the mounting device 21b are disposed side by side. So are the spacer distribution device 22 and the sealing material printing device 24. Again, so are the heating device 23a and the heating device 23b. Subsequent to processing in the heating device 23a and the heating device 23b, the SEG substrate 1 and the COM substrate 2 are aligned by an alignment device (processing means) 25.

To fabricate a flexible liquid crystal display panel with the fabrication system, the SEG substrate 1 and the COM substrate 2 are introduced to the production line after being subjected to post-rubbing cleaning and subsequent sufficient drying so that they no longer grow larger in size. Following the introduction to the production line, the SEG substrate 1 and the COM substrate 2 move in the two branch lines disposed side by side, thereby entering associated devices at the same timing. This way, the SEG substrate 1 and the COM substrate 2 are subjected to respective processes at the same humidity and simultaneously undergo identical heat treatments before being aligned. This restrains the SEG substrate 1 and the COM substrate 2 expanding and shrinking differently due to temporal factors and thus makes the two substrates analogous in their dimensions with increased precision. The patterns formed on the substrates are also aligned with better precision.

Figure 13:
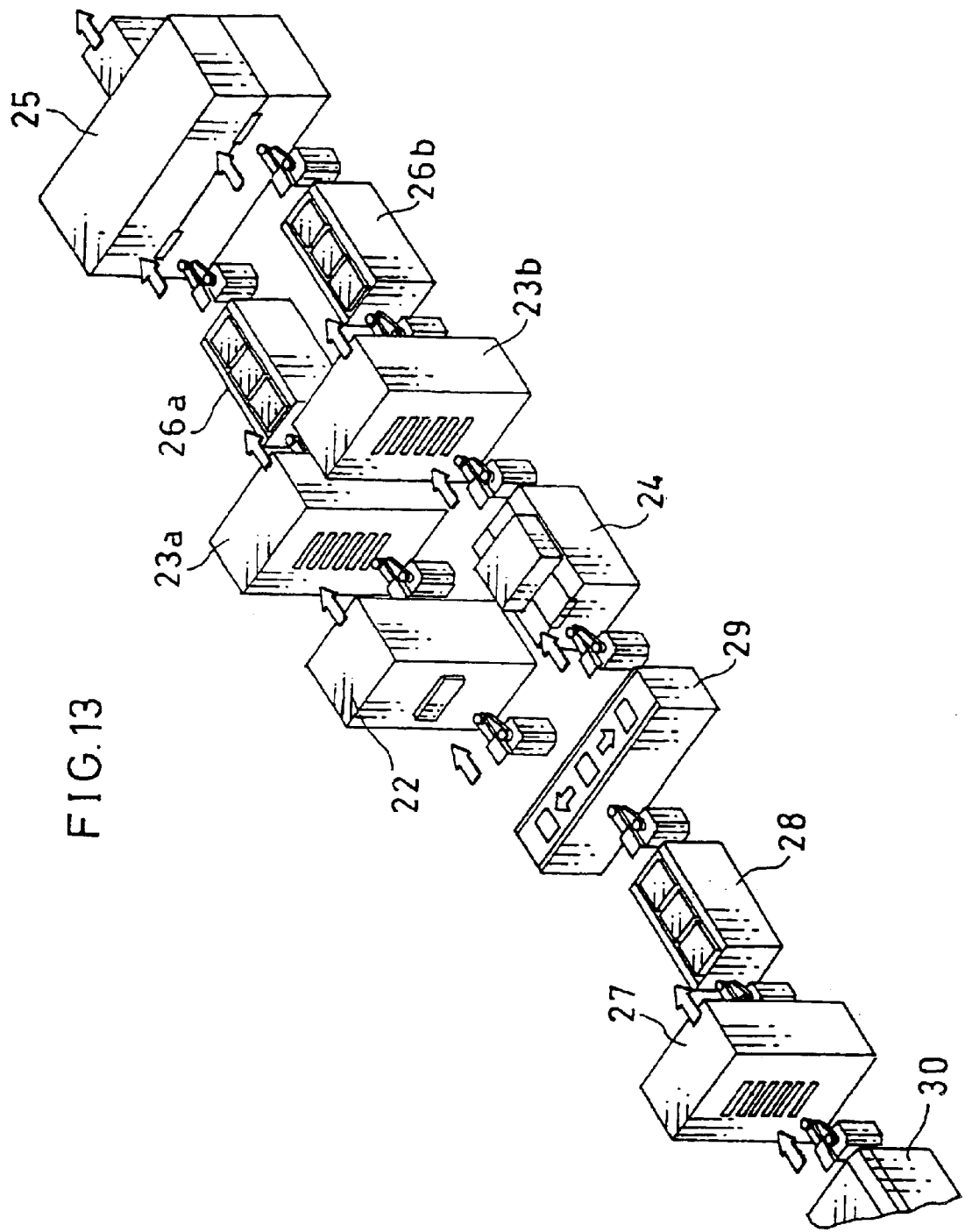
FIG. 13 is a perspective view illustrating another arrangement of a flexible LCD panel fabrication system in accordance with an embodiment of the present invention.

FIG. 13 shows another arrangement of a fabrication system (production line) of a flexible liquid crystal display panel in accordance with the present embodiment.

In the fabrication system of FIG. 13, the drying process (heating and cooling) following a heat treatment is also automated and incorporated in the production line. To implement this, the mounting devices 21a and 21b, which are, in FIG. 12, located before the spacer distribution device 22 and the sealing material printing device 24, are now removed from the production line. In their places, a post-rubbing cleaning device (processing means) 30, a heating device (drying means (heat treatment means, processing means)) 27, a cooling device (drying means (heat treatment means, processing means)) 28, and a sorting device 29 are installed in this order when viewed from the upper side of the production line. In addition, cooling devices (heat treatment means, processing means)) 26a and 26b are installed between the heating devices 23a and 23b and the alignment device 25.

In this production line, the heating device 27 and the cooling device 28 constitute drying means (means to dry a target object by heating) used in a process to dry a post-rubbing cleaning liquid. The sorting device 29 is used to directly connect a previous process to a subsequent process. The heating devices 23a and 23b and the cooling devices 26a and 26b constitute heat treatment means used in leveling of the COM substrate 2 and in a heat treatment carried out on the SEG substrate 1 in an alignment process.

After rubbing and subsequent completion of cleaning, the SEG substrate 1 and the COM substrate 2 are heat-dried by the heating device 27. The substrates are then cooled by the cooling device 28 to a predetermined temperature and sorted out into the SEG substrate 1 and the COM substrate 2. Subsequent to the sorting, the SEG substrate 1 and the COM substrate 2 are fed to the spacer distribution device 22 and the sealing material printing device 24 respectively. After being processed separately, the SEG substrate 1 and the COM substrate 2 are subjected to a common heat treatment in the heating devices 23a and 23b respectively. The two substrates are then cooled by the cooling devices 26a and 26b to a predetermined temperature and simultaneously fed to the alignment device 25.

With the use of the fabrication system of FIG. 13, timings are matched for the heating and drying of a pair of substrates, and more importantly, the two substrates are treated in separate, but completely identical environments throughout the processes from the post-rubbing cleaning to the alignment. Thus, patterns can be more actively controlled in terms of dimensional precision.

Note in FIG. 13 that for convenience in description, the post-rubbing cleaning and the post-cleaning drying were assigned to a single production line, and the SEG substrate 1 and the COM substrate 2 are sorted after the drying, which corresponds to the flow chart of FIG. 6. Alternatively, two separate production lines may be provided to treat the SEG substrate 1 and the COM substrate 2 individually throughout the spacer distribution and sealing material printing processes, as well as an additional rubbing alignment process (not shown). This way, the environments, including standby time, in which the SEG substrate 1 and the COM substrate 2 are fabricated, become readily controllable.

When the tact times differ for spacer distribution and for sealing material printing, there is another alternative whereby a buffer device (not shown) is installed after each processing device to temporarily hold a substrate. With this alternative, the transport of the substrates become controllable so that the substrates are simultaneously fed to the heating devices 23a and 23b. This allows for more versatility in the production line without compromising on the dimensional precision of the patterns.

Note in FIG. 13 again that the heating device 27 and the cooling device 28 constitute drying means used in a process to dry a post-rubbing cleaning liquid. Instead, a drying device which dries a target object through depressurization, such as a vacuum drier or a depressurization device of another kind (not shown), may be provided as noted previously, to replace the heating device 27 and the cooling device 28. When this is the case, the sorting device 29 may be used as the drying device, and sort out the SEG substrate 1 and the COM substrate 2 which have been cooled down to a predetermined temperature to feed them separately to the spacer distribution device 22 and the sealing material printing device 24. Otherwise, two drying devices may be provided side by side, one in the production line of the SEG substrate 1 and the other in the production line of the COM substrate 2.

In the forgoing description, some fabrication systems of a flexible liquid crystal panel in accordance with the present embodiment were discussed solely for illustrative purposes in reference to FIG. 12 and FIG. 13 showing a production line from the post-rubbing cleaning through the alignment. The description is never intended to restrict the present embodiment only to these examples.

There is a further alternative in which only a single heating device is provided instead of two. In such a case, a sorting device and two buffer devices to temporarily hold substrates should be interposed between the heating device and subsequent processing devices to feed substrates to the latter at the same timings. Accordingly, the heating devices 23a and 23b may be replaced by a single heating device with an increased performance to heat the two substrates simultaneously.

Figure 14:
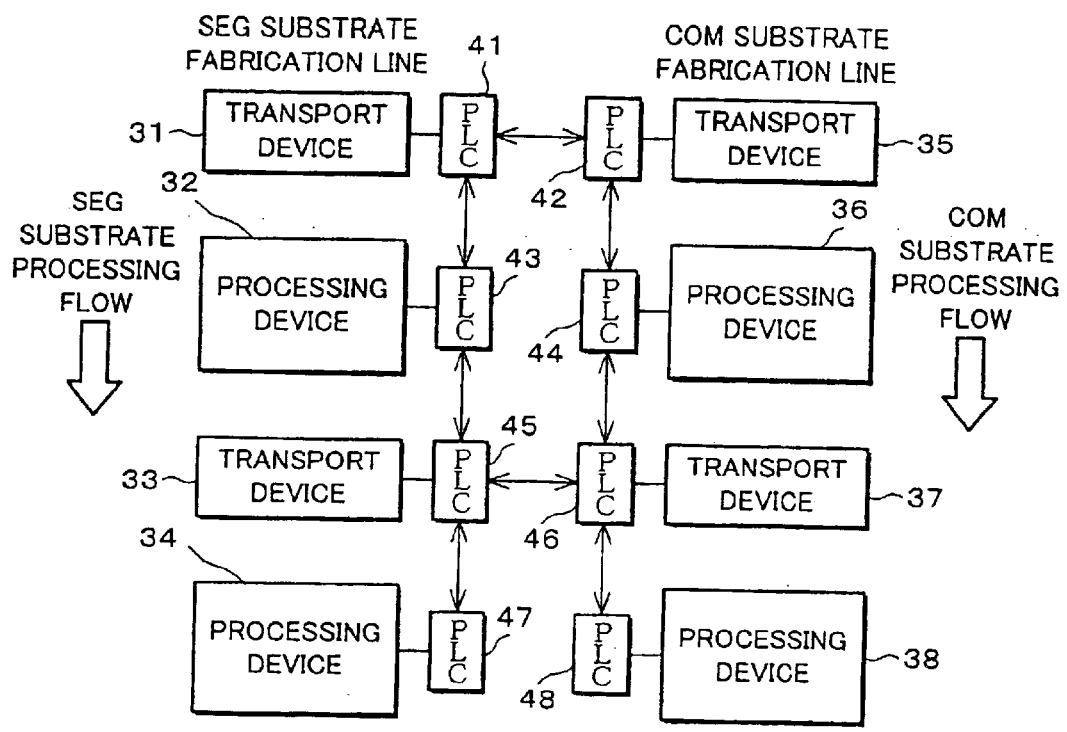
FIG. 14 is a block diagram of a flexible LCD panel fabrication system for substrate transport control in accordance with an embodiment of the present invention.
Figure 15:
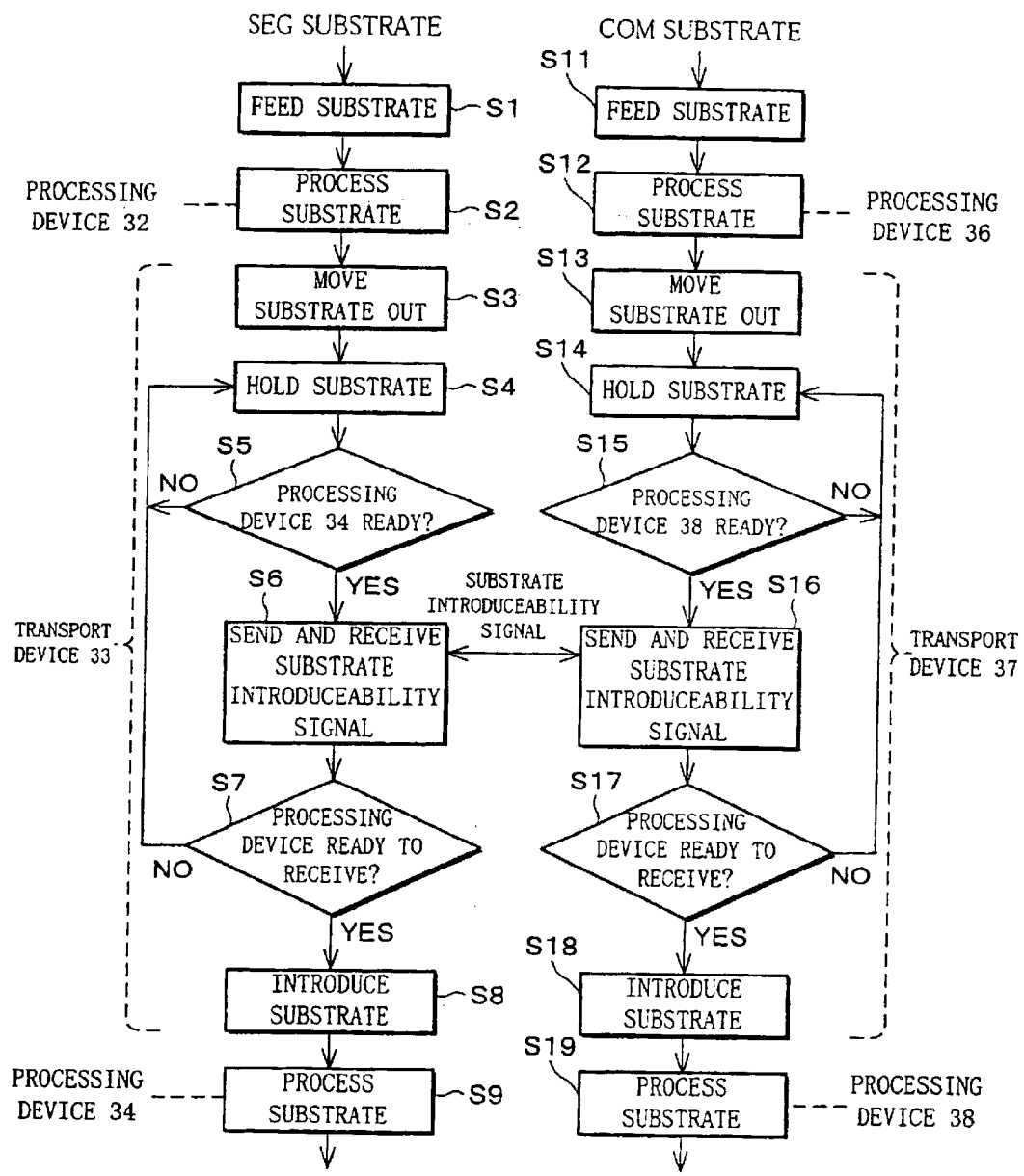
FIG. 15 is an explanatory view illustrating an example of substrate transport control in the foregoing flexible LCD panel fabrication system.

Now, referring to FIG. 14 and FIG. 15, the following will discuss, as an example, the control of the transport of the SEG substrate 1 and the COM substrate 2 in the fabrication system of a flexible liquid crystal display panel in accordance with the present embodiment.

FIG. 14 is a block diagram showing the fabrication system controlling the transport of a substrate.

The fabrication line for the SEG substrate 1 is constituted by transport devices (substrate transport means, a first substrate transport section) 31 and 33 each of which includes a substrate mounting device or a substrate transport path, and processing devices 32 and 34 which are incorporated in the production line. The processing devices 32 and 34 are connected by the transport devices 31 and 33. The transport device 31 transports the SEG substrate 1 to the processing device 32. The transport device 33 receives the SEG substrate 1 from the processing device 32 to transport to the processing device 34.

Meanwhile, the fabrication line for the COM substrate 2 is constituted by transport devices (substrate transport means, a second substrate transport section) 35 and 37 each of which includes a substrate mounting device or a substrate transport path, and processing devices 36 and 38 which are incorporated in the fabrication line. The processing devices 36 and 38 are connected by the transport devices 35 and 37. The transport device 35 transports the COM substrate 2 to the processing device 36. The transport device 37 receives the COM substrate 2 from the processing device 36 to transport to the processing device 38. Each processing device 32, 34, 36, and 38 represents any given processing device used in fabrication processes of the flexible liquid crystal display panel, such as a mechanical processing device, heating device, cooling device, or a depressurization.

The processing devices 32, 34, 36, and 38 and the transport devices 31, 33, 35, and 37 each include a controller composed of a sequencer and other components, for example, a PLC (programmable logic controller) 41 to 48. The PLCs send and receive between them a signal (a substrate introduceability signal) according to which the sending and receiving devices in the processing devices 32, 34, 36, and 38 and the transport devices 31, 33, 35, and 37 are controlled in the SEG substrate manufacturing line and the COM substrate manufacturing line.

Therefore, in the above manufacturing system, a signal line is provided to connect the transport device 31 to the transport device 35, and another to connect the transport device 33 to the transport device 37 so as to allow transmission of a substrate introduceability signal, which is representative of the readiness for the processing device to receive the substrate, between the transport devices 31 and 35 and also between the transport devices 33 and 37. The provision of these signal lines allows the SEG substrate 1 and the COM substrate 2 to simultaneously enter the respective processing devices that are disposed side by side, for example, the processing device 32 and the processing device 36 or the processing device 34 and the processing device 38.

In this manner, under the control by the PLC 41 to 48, timings are matched for the transport devices 31, 33, 35, and 37 to introduce the SEG substrate 1 and the COM substrate 2 to the processing devices 32, 34, 36, and 38.

FIG. 15 is a flow chart showing a flow of the substrate transport control in the fabrication system. The figure is drawn based on such an example that a mechanical process was assigned to the processing devices 32, 34, 36, and 38 in FIG. 14, so as to illustrate the relation between the movement of the SEG substrate 1 along the SEG substrate fabrication line from the processing device 32 to the processing device 34 and the movement of the COM substrate 2 along the COM substrate fabrication line from the processing device 36 to the processing device 38.

The SEG substrate 1 is introduced to the processing device 32 in step 1 (hereinafter, S1). After being subjected to a mechanical process in the processing device 32 in S2, the SEG substrate 1 is moved to the processing device 34 for a subsequent process. The COM substrate 2 is introduced to the processing device 36 in S11 at the same timing as S1. After being subjected to a mechanical process in the processing device 36 in S12, the COM substrate 2 is moved to the processing device 38 for a subsequent process.

Having undergone a predetermined mechanical process in S2, the SEG substrate 1 is moved out of the processing device 32 by the transport device 33 (S3) and then temporarily held in the transport device 33 (S4). Having undergone a predetermined mechanical process in S12, the COM substrate 2 is moved out of the processing device 36 by the transport device 37 (S13) and then temporarily held in the transport device 37 (S14).

Upon reception of a acceptability signal from the processing device 34 to which the SEG substrate 1 is going to be transported, the transport device 33, which is holding the SEG substrate 1 in it, determines that the processing device 34 is ready to receive the SEG substrate 1 (S5), and sends a substrate introduceability signal representative of the readiness for the processing device 34 to receive the substrate to the transport device 37 which constitutes a part of the COM substrate fabrication line (S6). In contrast, if in S5, the transport device 33 is holding the SEG substrate 1, but fails to confirm (does not receive) an acceptability signal from the processing device 34 to which the SEG substrate 1 is going to be transported, the operation returns to S4 in which the transport device 33 continues to hold the SEG substrate 1 until it can confirm that the transport device 33 is holding the SEG substrate 1 and has received an acceptability signal from the processing device 34.

Similarly, upon reception of an acceptability signal from the processing device 38 to which the COM substrate 2 is going to be transported, the transport device 37, which is holding the COM substrate 2 in it, determines that the processing device 38 is ready to receive the COM substrate 2 (S15), and sends a substrate introduceability signal representative of the readiness for the processing device 38 to receive the substrate to the transport device 33 which constitutes a part of the SEG substrate fabrication line (S16). In contrast, if, in S15, the transport device 37 is holding the COM substrate 2, but fails to confirm (does not receive) an acceptability signal from the processing device 38 to which the COM substrate 2 is going to be transported, the operation returns to S14 in which the transport device 37 continues to hold the COM substrate 2 until it can confirm that the transport device 37 is holding the COM substrate 2 and has received an acceptability signal from the processing device 38.

If, in S6, the transport device 33 sends a substrate introduceability signal representative of the readiness for the processing device 34 to receive the substrate and receives from the transport device 37 a substrate introduceability signal representative of the readiness for the processing device 38 to receive the substrate, the transport device 33 determines that both the processing devices 34 and 38 are ready to receive the substrates (S7) and feeds the SEG substrate 1 to the processing device 34 (S8). The SEG substrate 1 then is subjected to a mechanical process in the processing device 34 (S9).

In contrast, if in S6, the transport device 33 either fails to send a substrate introduceability signal representative of the readiness for the processing device 34 to receive the substrate or fails to receive from the transport device 37 a substrate introduceability signal representative of the readiness for the processing device 38 to receive the substrate, or fails both, the operation returns to S4 in which the transport device 33 continues to hold the SEG substrate 1 until the processing devices 34 and 38 are both ready to receive the substrates.

In short, the transport device 33 moves the SEG substrate 1 to the processing device 34 only if the transport device 33 receives both an acceptability signal representative of the readiness of the processing device 34 and a substrate introduceability signal representative of the readiness of the processing device 38.

Similarly, if in S16, the transport device 37 sends a substrate introduceability signal representative of the readiness for the processing device 38 to receive the substrate and receives from the transport device 33 a substrate introduceability signal representative of the readiness for the processing device 34 to receive the substrate, the transport device 37 determines that both the processing devices 34 are 38 ready to receive the substrates (S17) and feeds the COM substrate 2 to the processing device 38 (S18). The COM substrate 2 is then subjected to a mechanical process in the processing device 38 (S19).

In contrast, if in S16, the transport device 37 either fails to send a substrate introduceability signal representative of the readiness for the processing device 38 to receive the substrate or fails to receive from the transport device 33 a substrate introduceability signal representative of the readiness for the processing device 34 to receive the substrate, or fails both, the operation returns to S14 in which the transport device 37 continues to hold the COM substrate 2 until the processing devices 34 and 38 are both ready to receive the substrates.

In short, the transport device 37 moves the COM substrate 2 to the processing device 38 only if the transport device 37 receives both an acceptability signal representative of the readiness of the processing device 38 and a substrate introduceability signal representative of the readiness of the processing device 34. The control enables the SEG substrate 1 and the COM substrate 2 to simultaneously enter the processing device 34 and the processing device 38 respectively.

As detailed above, the fabrication system of a flexible liquid crystal display panel includes an SEG substrate fabrication line in which the transport devices 31 and 33 are used for transport and a separate COM substrate fabrication line in which the transport devices 35 and 37 are used for transport. The fabrication lines are controllable independently by the PLCs 41, 43, 45, and 47 and the PLCs 42, 44, 46, and 48. Timings are controlled separately for the SEG substrate 1 to move along the SEG substrate fabrication line to the processing devices 32 and 34 and for the COM substrate to move along the COM substrate fabrication line to the processing devices 36 and 38, so that associated processes, for example, identical processes, are started at substantially identical timings, or preferably, at exactly identical timings. Thus, irregularities in dimensions of the SEG substrate 1 and the COM substrate 2 are readily confined in a desired range.

The processing devices 32, 34, 36, and 38 may be the spacer distribution device 22, the sealing material printing device 24, the heating device 23a, the heating device 23b, the cooling device 26a, the cooling device 26b, or any other processing device, as long as they are arranged to form fabrication processes for a flexible liquid crystal display panel like that in FIG. 12 and FIG. 13. For example, when the processing device 32 is a spacer distribution device 22, the processing device 34 corresponds to a heating device 23a, the processing device 36 corresponds to a sealing material printing device 24, and the processing device 38 corresponds to a heating device 23b.

The processing devices 32, 34, 36, and 38 may also be processing devices located in the upper side of the production line shown in FIG. 12 and FIG. 13. The processing devices 32, 34, 36, and 38 may be, among others, a device to form color filters, a device to form transparent electrodes, a device to form insulating films, a device to form alignment films, a device to align liquid crystal molecules, and various other processing devices (processing means).

Note that in the above production line, the processing devices and the transport devices are controlled by the respective controllers transmitting and receiving signals. Alternatively, the processing devices and the transport devices may be all brought under sole control of a CPU (central processing unit) or another controller.

In the fabrication system of a flexible liquid crystal display panel shown in FIG. 12 and FIG. 13, as far as heating and cooling processes which would seriously affect expansion and shrinkage of the substrates are concerned, both the substrates are simultaneously subjected to an identical process. In addition, when the substrates are subjected to a process that does not involve heating, the substrates are simultaneously subjected to mutually associated processes. Alternatively, when only one of the substrates is subjected to a particular process, the other substrate may be transported or caused to stand by in the environment as the target substrate is being processed, so as to place both the substrates in identical environments. Specifically, when this is the case, the system may include: a processing chamber and a standby chamber, the processing chamber being partly separated from the standby chamber so that the non-target substrate is not subjected to the process which is intended only for the target substrate; a processing device with a passage section which allows a heat flow between the processing chamber and the standby chamber; and an arrangement whereby the substrates can substantially simultaneously, preferable completely simultaneously, enter the post-processing devices, i.e., the processing chamber and the standby chamber. What matters here is to place both the substrates in identical environments, and thereby cause the substrates to expand or shrink in substantially the same manner. To implement this quickly, the substrates are simultaneously subjected to a necessary process as shown in FIGS. 12 and 13.

As described above, a flexible LCD panel fabrication method in accordance with the present embodiment is a method for fabricating a flexible liquid crystal display panel by aligning a pair of flexible substrates made of an organic material on which predetermined patterns are formed, and is characterized in that, in forming the patterns, in the case where a processing operation that causes swelling or shrinkage of the substrate is applied to one of the substrates in pair, the processing operation is applied to the other substrate, irrespective of whether or not the other substrate requires the processing operation.

Incidentally, an operation that causes swelling or shrinkage of a substrate is defined as an operation that itself causes swelling or shrinkage of the substrate, that is, an operation that itself causes moisture absorption or discharge of the substrate, or property modification of the substrate. More specifically, it is, for example, a heating, drying, or cleaning operation, and more particularly, a heating or drying operation. The foregoing method is preferably applicable to a case of, among heat treatments, a heat treatment for pattern formation that causes irreversible shrinkage to a flexible substrate. In the case where a substrate is subjected to a heat treatment for pattern formation, for example, a baking operation, that causes irreversible shrinkage to the substrate, the other substrate is also subjected to a heat treatment as a baking operation that causes irreversible shrinkage to the substrate, that is, a heat treatment at a higher temperature than that of a heat treatment for drying. Thus by causing irreversible shrinkage to the other substrate, a problem that only one substrate shrinks can be prevented. Consequently, a difference between the sizes between the substrates in pair is suppressed, whereby the pattern alignment accuracy can be enhanced.

Therefore, a flexible LCD panel fabrication method in accordance with the present embodiment is more concretely characterized in that, in forming the patterns, in the case where a heat treatment is applied to one of the substrates in pair, a heat treatment is applied to the other substrate, irrespective of whether or not the other substrate requires the heat treatment.

Furthermore, a flexible LCD panel fabrication method in accordance with the present embodiment is more concretely characterized in that a drying operation is applied to the one substrate and the other substrate in pair before a specific processing operation that requires size accuracy. The specific processing operation that requires size accuracy is concretely an aligning operation. In other words, a flexible LCD panel fabrication method in accordance with the present embodiment is characterized in that, in fabrication of a LCD panel using substrates made of an organic material such as plastic, two substrates are aligned after subjected to same drying operations, respectively.

Examples of the foregoing heat treatment include operations that require heating, such as baking, leveling operations as well as a heating operation for drying, and the present invention is particularly effective in the case where conducted is a heat treatment for pattern formation, that is usually required for only one of the substrates and that causes irreversible shrinkage, such as the baking operation in the process for forming an insulating film in a simple-matrix-type LCD panel, and the leveling operation after sealing material printing in the panel alignment process.

Furthermore, the foregoing drying operation may be, for example, a drying operation by heating, or may be a drying operation by pressure reduction, such as vacuum drying. Incidentally, the description of the present embodiment explains the method in which the foregoing drying operation before the sealing material printing process before panel alignment or before the spacer distribution process, considering restrictions due to conditions of the production process, but without such restrictions on the production process, it is possible to eliminate influence of absorption of moisture from the ambient environment after drying by carrying out the drying operation as immediately before panel alignment as possible, which ensures further enhancement of pattern alignment accuracy.

By the foregoing method, it is possible to conform the swelling/shrinkage behaviors of the substrates themselves to each other. As a result, the substrates are caused to have equal dimensional change ratios of the whole substrate to each other, and the dimensional alignment accuracy of the substrates can be enhanced, irrespective of whether it is a case where a plurality of flexible LCD panels are produced from a large-size substrates, or a case where a few or one large-size LCD panel is produced from large-size substrates.

Furthermore, according to the foregoing method, it is unnecessary to change arrangement of the foregoing substrates and the method is based on transport and processing of only a flexible substrate made of an organic material. In other words, the method is not arranged so that after forming a plastic film or the like on a substrate that is capable of maintaining accuracy, the substrate is transported and processed. Therefore, the settings and devices prepared for glass substrate fabrication are applicable for the basic processing flow and individual processing operations, and conventional fabrication devices for glass substrates are applicable as processing devices composing the fabrication line. Thus, it is unnecessary to anew develop processes and devices.

Therefore, it is possible to fabricate flexible LCD panels with satisfactory pattern accuracy, as well as it is possible to fabricate flexible LCD panels using flexible substrates made of organic materials at lower costs.

A flexible LCD panel fabrication method in accordance with the present embodiment is preferably arranged so that conditions of the heat treatments or the drying operations applied to the one substrate and the other substrate are set so that a difference in size between the substrates due to shrinkage of the substrates caused by the heat treatments should fall in a desired range. By so doing, variation of size accuracy between the substrates can be suppressed, whereby the predetermined patterns formed on the substrates, respectively, can be easily aligned to each other.

A swelling/shrinkage ratio of a flexible substrate made of an organic material is determined depending on a quantity of heat given to the flexible substrate. In other words, a time factor and a temperature factor give a great influence to the substrate size. Therefore, the foregoing heat treatment is preferably arranged so that heat applied to the substrates in pair is substantially equal in total quantity to each other.

For this purpose, a flexible LCD panel fabrication method in accordance with the present embodiment is a method for fabricating a flexible liquid crystal display panel by aligning a pair of flexible substrates made of an organic material on which predetermined patterns are formed, and the method is preferably arranged so that substantially identical, or more preferably, identical, heat treatments are applied to both of the substrates so that a heat history of one of the substrates preferably becomes substantially equal, or more preferably, equal, to a heat history of the other substrate.

Since the foregoing substrates in pair include flexible substrates made of an organic material, in the case where they are subjected to a heat treatment, particularly for pattern formation such as a baking operation in a color filter forming process, an insulating film forming process, or a panel aligning process, the substrates would shrink depending on a state of heat applied in the foregoing heat treatment process. However, by applying substantially identical heat treatments, or preferably identical heat treatments, to the substrates in pair, they come to have equal heat histories. As a result, degrees of shrinkage of the substrates in the heat treatment process, and hence, there is no difference in size accuracy between the substrates, whereby the predetermined patterns formed on the substrates are aligned to each other easily. Besides, in the case where the pair of substrates are large-size substrates and they are cut into LCD panels after aligned to each other, the following effect, like the aforementioned effect, can be achieved easily: namely, the predetermined patterns formed on the substrates are aligned to each other easily.

In other words, in the flexible LCD panel fabrication method in accordance with the present embodiment, the heat treatments applied to the substrates are preferably controlled so that heat histories of the substrates become substantially identical, or more preferably, identical, and furthermore, it is preferable that heat treatments that cause a swelling/shrinkage behavior of the one substrate and that of the other substrate to become substantially identical, or more preferably, identical, are applied to the substrates in pair.

Furthermore, a flexible LCD panel fabrication method in accordance with the present embodiment is a method for fabricating a flexible liquid crystal display panel by aligning a pair of flexible substrates made of an organic material on which predetermined patterns are formed, and method is preferably arranged so that the heat treatments applied to the one substrate and the other substrate are carried out under substantially same temperature profiles, or more preferably, under the same temperature profiles.

For instance, in the insulating film formation process, the panel alignment process, etc., alignment accuracy of the substrates can be maintained by conforming their temperature profiles to each other so as to make total heat quantities applied to the substrates in pair in the foregoing heat treatment equal to each other.

An example of simple means for making the temperature profiles for the substrates substantially identical, or preferably, identical, so as to apply substantially identical heat treatments, or preferably, identical heat treatments to the substrates is a method in which heat treatments are applied to the one substrate and the other substrate under same set conditions. In this case, by carrying out heat treatments using processing devices of substantially identical types, or preferably, identical types, under same set conditions, the temperature profile of the one substrate and the temperature profile of the other substrate can be more strictly controlled. As a result, the heat histories of the one substrate and the other substrate can be made to substantially conform to each other, and besides, the total quantities of heat applied to the substrates, or further, the dimensional shrinkage degrees of the substrates can be made equal to each other easily. Therefore, a difference in size accuracy between the substrates can be reduced, while the predetermined patterns formed on the substrates can be easily aligned to each other.

Furthermore, the flexible LCD panel fabrication method in accordance with the present embodiment is preferably arranged so that, while one of the substrates is being subjected to a heat treatment, the other substrate is also subjected to a heat treatment. This enables to suppress variation due to a time factor of the substrate shrinkage due to heat. Consequently, the substrates can be aligned to each other with satisfactory accuracy, whereby a flexible LCD panel can be produced with satisfactory pattern accuracy. By starting the heat treatments that cause irreversible shrinkage of the substrates substantially simultaneously, or preferably, simultaneously, behaviors such as swelling of the substrates due to moisture absorption or the like after a heat treatment can be started simultaneously each other, and a difference in size between the substrates can be easily made to fall in a desired range.

For this purpose, a flexible LCD panel fabrication method in accordance with the present embodiment is more desirably arranged so that the heat treatments applied to the substrates in pair are carried out substantially simultaneously, or preferably, simultaneously.

By applying the heat treatments to the substrates in pair simultaneously, in particular, variation due to a time factor of the substrate shrinkage due to heat can be suppressed more strictly. Therefore, this enables more strict control of histories of dimensional changes, and the substrates can be aligned to each other with improved accuracy. Consequently, a flexible LCD panel can be produced with improved pattern accuracy.

Furthermore, a flexible LCD panel fabrication method in accordance with the present embodiment is a method for fabricating a flexible liquid crystal display panel by aligning a pair of flexible substrates made of an organic material on which predetermined patterns are formed, and the method is arranged so that substantially identical, or preferably, identical drying operations are applied to the one substrate and the other substrate, respectively, before panel alignment of the pair of substrates, or more specifically, before the sealing material printing process before the panel alignment, or before the spacer distribution process before the panel alignment.

Furthermore, a flexible LCD panel fabrication method in accordance with the present embodiment is a method for fabricating a flexible liquid crystal display panel by aligning a pair of flexible substrates made of an organic material on which predetermined patterns are formed, and the method is more preferably arranged so that substantially identical, or preferably, completely identical drying operations are applied to both of the substrates in pair, before each processing operation applied to each substrate such as, concretely the transparent electrode formation process, the insulating film formation process, the alignment film formation process, and the panel alignment process.

By applying a drying operations to both the substrates before the panel alignment operation of aligning the pair of substrates, in particular, it is possible to prevent swelling of the flexible substrates that is caused by the organic material absorbing moisture. Therefore, the substrates can be aligned to each other with dry states of the flexible substrates maintained, that is, without a difference in size therebetween. This enables panel alignment by aligning predetermined patterns formed on the substrates with satisfactory accuracy. Furthermore, in the case where the pair of substrates are large-size substrates and they are cut into LCD panels after aligned to each other, the following effect, like the effect described above, can be achieved: namely, the substrates can be aligned with the predetermined patterns formed on the substrates being aligned to each other with satisfactory accuracy.

To apply substantially identical, or preferably, identical drying operations to the substrates, the drying operations may be carried out under same set conditions, or preferably, by using devices of the same kind, or particularly, the same type under the same set conditions. In the case where the processing environments for the pair of substrates are substantially identical, the degrees of dry states of the substrates can be made substantially equal, or preferably, equal. This enables to reduce an influence of swelling of the substrates due to moisture absorption, thereby ensuring panel alignment of the substrates in a state in which a difference in size accuracy between the substrates being decreased.

To reduce the difference in size between the substrates due to shrinkage of substrates that is caused by the foregoing drying operations into a desired range, for instance, the foregoing drying operations may be carried out with respect to the one substrate and the other substrate under processing conditions such that the substrates should be returned to their original sizes before the swelling due to moisture absorption.

More specifically, the flexible LCD panel fabrication method in accordance with the present embodiment may be arranged so that the drying operations are carried out under processing conditions such that the one substrate and the other substrate are returned to their original sizes before swelling due to moisture absorption. This enables to make the dimensional accuracies of the substrates to substantially coincide, or preferably, coincide to each other.

It is possible to easily return the substrate to the original size, by applying at least a heat treatment, at a temperature set according to a type of an organic material used in the flexible substrate so that the flexible substrate used in the foregoing substrates in pair should not shrink to a size smaller than the original size before the swelling due to moisture absorption, for not less than a certain time, that is, for a time set according to a type of an organic material used in the flexible substrate so that the size of the flexible substrate should return to the foregoing original size. The flexible substrate easily dries and shrinks in the case where placed in a vacuum state for not less than a certain time, thereby returning to its original size.

More specifically, the flexible LCD panel fabrication method in accordance with the present invention may be arranged so that the drying operation applied to the one substrate and the other substrate in pair is carried out by heating, and that the substrates are subjected to drying by heating under specific temperature conditions for not less than a certain time. In other words, the foregoing method may be arranged so that drying operations are carried out by continuously heating the one substrate and the other substrate until the one substrate and the other substrate are returned to their original sizes before swelling due to moisture absorption, under temperature conditions such that irreversible shrinkage should not occur to the pair of substrates.

Furthermore, the flexible LCD panel fabrication method in accordance with the present embodiment may be arranged so that the drying operation applied to the one substrate and the other substrate in pair is carried out by vacuuming, and that the substrates are subjected to vacuum drying under specific pressure conditions for not less than a certain time. In other words, the foregoing method may be arranged so that drying operations are carried out by continuously placing (storing) the one substrate and the other substrate in a vacuum environment until the one substrate and the other substrate are returned to their original sizes before swelling due to moisture absorption.

By any one of the foregoing methods, the sizes of the foregoing substrates whose sizes change due to moisture absorption or drying are returned to the original sizes thereof in the current stage by executing a sufficient drying operation, whereby variation in size between the substrates can be minimized. Incidentally, the processing time is set depending on processing conditions, such as temperature and pressure.

Furthermore, since the drying operation is carried out by vacuum drying, shrinkage (property modification) of the substrates themselves due to heat does not occur, there does not arise a problems such that the substrates shrink to sizes smaller than the original sizes before the swelling due to moisture absorption. Therefore, control of dimensional changes of the substrates is easy, and the foregoing substrates can be easily returned to their originals sizes before the swelling due to moisture absorption. Consequently, a difference in size between the substrates can be easily eliminated.

Furthermore, the flexible LCD panel fabrication method in accordance with the present embodiment is preferably arranged so that, while one of the substrates is being subjected to a drying operation, the other substrate is also subjected to a drying operation.

This ensures suppression of variation due to a time factor of the substrate shrinkage caused by a drying operation, and further, suppression of variation due to a time factor of the substrate swelling due to moisture absorption after the drying operation, whereby panel alignment with satisfactory accuracy can be realized. Particularly, by simultaneously starting the drying operations that cause the substrates to return to their original sizes, the behavior of the two substrates can be started simultaneously in each process, so that a difference in size between the substrates can be reduced to a desired range. This enables panel alignment with satisfactory accuracy, and fabrication of a flexible LCD panel with improved pattern accuracy.

Therefore, the flexible LCD panel fabrication method in accordance with the present embodiment is desirably arranged so that the drying operations applied to the pair of substrates are carried out substantially simultaneously, or preferably, simultaneously.

By applying the drying operations to the substrates in pair simultaneously, in particular, variation due to a time factor of the substrate swelling due to moisture absorption can be suppressed more strictly. Therefore, this enables more strict control of histories of dimensional changes, and the substrates can be aligned to each other with improved accuracy. Consequently, a flexible LCD panel can be produced with improved pattern accuracy.

Furthermore, in the present embodiment, to maintain pattern alignment accuracy of the pair of substrates to be aligned, in response to dimensional changes of the substrates due to heat and moisture absorption applied in the fabrication process of an LCD panel including substrates made of an organic material such as plastic, heat treatments applied to the substrates in pair are made identical, while identical drying operations are introduced into the fabrication process.

More specifically, in the flexible LCD panel fabrication method shown in FIG. 1, as described above, identical heat treatments and drying operations are applied to the SEG and COM substrates 1 and 2 so that dimensional changes of the plastic substrates 6a and 6b as flexible substrates due to shrinkage caused by the heating process and swelling caused by moisture absorption become equal between the SEG and COM substrates 1 and 2. This enables fabrication of a plurality of flexible LCD panels from large-size substrates, as well as a large-size flexible LCD panel, with satisfactory accuracy.

In this case, the flexible LCD panel fabrication method in accordance with the present embodiment is desirably arranged so that the heat treatment, the drying operation, and other processing operations (for instance, the rubbing operation, panel alignment) for LCD panel fabrication are carried out on time.

According to the foregoing method, by carrying out on time as programmed a heat treatment, a drying operation, and processing operations for LCD panel fabrication that are applied to the pair of substrates of the production flow, it is possible to always control changes of substrate shrinkage with time caused by cooling after heating, as well as changes of substrate swelling with time due to absorption of moisture from the ambient environment, whereby time-factor-dependent substrate size variation can be solved. Therefore, by always strictly controlling the size accuracy of the pair of substrates, panel alignment of the substrates can be achieved with satisfactory accuracy. This enables to easily fabricate a flexible LCD panel at a good non-defective ratio.

Furthermore, the flexible LCD panel fabrication method in accordance with the present embodiment is arranged so that, in the case where a stand-by time is provided when processing operations for the flexible liquid crystal display panel fabrication are carried out, the one substrate and the other substrate are stored in an environment maintained in a constant dry state, or in an environment that is capable of maintaining a constant dry state, during the stand-by time, or more desirably, the substrates are stored in an environment maintained in a constant dry state at all times during the stand-by time.

Thus, the substrates that are in a stand-by state for a next process, being piled up, such as the color filter formation process, the transparent electrode formation process, the insulating film formation process, the alignment film formation process, the aligning process, the panel alignment process, the first cutting process, the liquid crystal injection/sealing process, the second cutting process, etc. are stored in an environment maintained in a constant dry state, so that swelling of the substrates due to moisture absorption should be prevented. By so doing, it is possible to reduce a difference in size between the substrates into a desired range.

According to the foregoing method, it is possible to prevent the substrates in a stand-by state for the next processing, being piled up, in the fabrication process from absorbing moisture from the ambient atmosphere during a stand-by time by storing the substrates in an environment maintained in a constant dry state, or more concretely, in an environment with a humidity of not more than 20%. Therefore, it is possible to suppress swelling of the substrates due to moisture absorption, thereby keeping variation in size accuracy of the substrates within a desired range during the fabrication process. This, for instance, enables to omit extra drying operations.

Furthermore, even in the case where, for instance, the foregoing substrates are large-size substrates and they are aligned and then cut into LCD panels, it is unnecessary to measure pattern sizes for each pair of combined substrates in the cutting operation, to determine cutting positions with differences in moisture absorption taken into consideration as conventionally. This enables to fabricate a flexible LCD panel with further improved pattern accuracy at higher productivity.

By storing the substrates in an environment in a dry state at all times during a stand-by time, in particular, it is possible to prevent the substrates from absorbing moisture from the ambient environment during the stand-by time. Therefore, since it is possible to keep variation in size accuracy of the substrates in the fabrication process always in a tolerable range, it is possible to omit extra drying operations. Furthermore, even in the case where, for instance, the foregoing substrates are large-size substrates and they are aligned and then cut into LCD panels, it is unnecessary to prevent differences in size between the substrates in pair, or to measure pattern sizes for each pair of combined substrates in the cutting operation, to determine cutting positions with differences in moisture absorption taken into consideration as conventionally. This enables to fabricate a flexible LCD panel with further improved pattern accuracy at higher productivity.

Furthermore, the flexible LCD panel fabrication method in accordance with the present embodiment is preferably arranged so that each of processing operations applied commonly to the one substrate and the other substrate for the flexible liquid crystal display panel fabrication is started substantially simultaneously, or more preferably, simultaneously, with respect to both of the substrates.

According to the foregoing method, a series of operations commonly applied to the one substrate and the other substrate for the flexible LCD panel fabrication, for instance, apart from the heat treatment and the drying operation, the processing operations such as the cleaning operation and the alignment film formation, particularly a series of operations commonly applied to the one substrate and the other substrate that cause dimensional changes of the substrates in the flexible LCD panel fabrication process, is started substantially simultaneously, or more preferably, with a time lag not more than 1 minute, or preferably simultaneously. By so doing, it is possible to start the behaviors of the two substrates simultaneously in each processing operation, while changes of the substrates with time after a heat treatment, such as shrinkage of substrates with time due to cooling after a heat treatment, and swelling of substrates with time due to absorption of moisture from the ambient environment after drying can be controlled always. This allows a problem of variation in a substrate size according to a time factor to be solved. Therefore, this facilitates management and control of swelling/shrinkage behaviors of the substrates in the fabrication process, thereby ensuring panel alignment with satisfactory accuracy by strictly controlling the size accuracy at all times. This enables to facilitate flexible LCD panels easily at a good non-defective ratio.

A fabrication system of a flexible liquid crystal display panel in accordance with the present embodiment, in order to subject a non-target one of the two substrates to a heat process, regardless of the need of doing so, when a target substrate is to be subjected to a heat process in the formation of the aforementioned patterns, is a fabrication system to fabricate a flexible liquid crystal display panel by aligning two substrates in each of which a predetermined pattern is formed on a flexible substrate made of organic material, and is arranged so as to include:

substrate transport means for transporting the two substrates thereon;

heat processing means for carrying out heat processes on the two substrates; and means (e.g., a device to form color filters, a device to form transparent electrodes, a device to form insulating films, a device to form alignment films, a device to align liquid crystal molecules, a device to align substrates, and various other processing devices) for carrying out other processes that are required to form the predetermined patterns on the two substrates, wherein:

the processing means are arranged in a direction in which the two substrates are transported in accordance with fabrication processes of the flexible liquid crystal display panel.

The processing means are arranged in a direction in which the two substrates are transported in accordance with fabrication processes of the flexible liquid crystal display panel; therefore, various processes are sequentially carried out in accordance with the fabrication processes of the flexible liquid crystal display panel. This facilitates the process control, as well as the checking and controlling of temporal changes which occur in the expansion of the two substrates between different processing means, restrains the substrates varying in their dimensions due to temporal factors, and thus enables mechanical processing to be carried out on the two substrates without compromising on desired dimensional precision.

Besides, the fabrication system of the flexible liquid crystal display panel includes heat processing means for carrying out heat processes on the two substrates; therefore, the two substrates can be subjected to a heat process. This restrains only one of the substrates shrinking and thus rendering the dimensional precision irregular. Besides, with the arrangement, the substrates come to have matched heat histories per se, and hence matched dimensional change ratios in view of entire substrates. This improves the precision in aligning the substrates regardless of the number of flexible liquid crystal panels that are made from a single large substrate. The number can be, for example, one, and the precision still improves. Thus, the flexible liquid crystal display panel can be fabricated easily with a high acceptable product ratio.

Further, by fabricating the flexible liquid crystal display panel using the fabrication system arranged as in the foregoing, the arrangement of the two substrates does not need to be changed, and the flexible substrate made of organic material can be transported and processed alone. Therefore, those well tried and trusted settings and devices that are originally intended for use with the glass substrate can be applied for use with the organic substrate in its basic process flow and individual processes.

Thus, the flexible liquid crystal display panel can be fabricated with a good pattern precision. Also, the flexible liquid crystal display panel can be fabricated from a flexible substrate made of organic material at lower costs than conventional techniques.

It is preferable if the fabrication system of a flexible liquid crystal panel further includes control means for controlling timings for the substrates to be transported to the processing means. The control means controls timings for the substrates to be transported to the processing means according to a process time which is specified for each process and also controls so that timings substantially, preferably completely, match for the substrates to be transported to the processing means.

For example, the control means controls so that identical processes are carried out on the two substrates at identical timings. Further, in the fabrication system of a flexible liquid crystal panel, for example, timings are matched for the two substrates to be transported from the heat processing means, so that a substrate processing is started for the two substrates when substantially identical periods, or preferably, exactly identical periods, have elapsed after start of heat processes.

By the fabrication system of a flexible liquid crystal display panel further including control means for controlling timings for the substrates to be transported to the processing means and also by the control means controlling timings for the substrates to be transported to the processing means, mechanical processes to fabricate the liquid crystal panel can be carried out according to a preprogrammed time table. This facilitates the process control, as well as the checking and controlling of temporal changes which occur in the expansion of the two substrates between different processing means, restrains the substrates varying in their dimensions due to temporal factors, and thus enables mechanical processing to be carried out on the two substrates without compromising on desired dimensional precision. Especially, by the inclusion of the control means in the fabrication system of a flexible liquid crystal display panel, in fabrication processes of the flexible liquid crystal display element, each in a series of processes which are carried out commonly on both substrates and entail a dimensional variation of the substrate can be started substantially, preferably completely, simultaneously for the two substrates, and the behavior of the two substrates can be started simultaneously in each process. Further, temporal changes in the expansion of the substrates become permanently controllable, which otherwise would be caused by temporal changes in the shrinkage of the substrate due to cooling down after heating and the absorption of moisture from the surrounding atmosphere after drying, and irregularities in dimensions of the substrates caused by temporal factors can be eliminated. Therefore, the expansion and shrinkage behavior of the substrates is readily checked and controlled in fabrication processes, and the dimensional precision is always controlled strictly. Thus, the substrates are aligned with a higher precision. Consequently, the flexible liquid crystal display panel can be fabricated easily with a high acceptable product ratio.

Note that the processing means, especially, the heat processing means, may be two devices disposed side by side, one in each of the transport directions of the two substrates. Alternatively, the processing means may be a device with an increased performance to carry out identical processes on the two substrates simultaneously. Or, the processing means may be a device, with stand-by storage means, which sorts out substrates for sequential processes. The substrate transport means may include two transport sections and moves the two substrates separately, but in parallel. Alternatively, the substrate transport means may include an arrangement which is capable of transporting the two substrates together.

Among these examples, the heat processing means is preferably made of two parts which are responsible for carrying out a heat process on the respective substrates. When this is the case, there is no need to develop a dedicated heat processing device with an increased performance. In addition, the two substrates can be subjected to heating using conventional heat processing devices without sorting devices or the like.

Further, the fabrication system of a flexible liquid crystal display panel preferably includes:

at least a pair of heat processing means for carrying out heat processes on the two substrates;

means for carrying out processes, other than the heat processes, that are required to form the predetermined pattern on one of the two substrates; and means for carrying out processes, other than the heat processes, that are required to form the predetermined pattern on the other substrate, wherein:

associated processing means, that is, means carrying out parallel processes or means carrying out identical processes on the two substrates, are lined side by side, so that one of the associated means is located in a transport direction of one of the two substrates and the other means is located in a transport direction of the other substrate, in accordance with fabrication processes of the flexible liquid crystal display panel. Hence, each process which is performed commonly on the two substrates in the fabrication of the flexible liquid crystal display panel can be easily started substantially simultaneously, or preferably, exactly simultaneously, for the two substrates.

Further, when this is the case, the fabrication system of a flexible liquid crystal panel may be such that:

the substrate transport means includes a pair of substrate transport sections (e.g., substrate transport paths or substrate mounting devices) disposed parallel to each other; and the processing means, especially the heat processing means, are disposed side by side on the pair of substrate transport sections. When this is the case, the two substrate transport sections are separately controllable. Even if the two substrates are subjected to different processes, timings to feed them to subsequent processing devices, i.e., timings to start subsequent processes, can be readily matched.

In other words, a fabrication system of a flexible liquid crystal display panel in accordance with the present embodiment is preferably such that:

the substrate transport means includes a first substrate transport section for transporting one of the two substrates and a second substrate transport section for transporting the other substrate; and the first substrate transport section and the second substrate transport section are separately controllable. In other words, the fabrication system of a flexible liquid crystal display panel preferably includes control means for controlling timings for the substrates to be transported to the processing means, wherein:

the control means controls timings for a substrate to be transported to the processing means which are arranged in a substrate transport direction in the first substrate transport section separately from timings for a substrate to be transported to the processing means which are arranged in a substrate transport direction in the second substrate transport section. When this is the case, the control means preferably controls timings for the two substrates to be transported to the processing means so that identical processes, at least heat processes, are started for the two substrates at substantially identical timings, or preferably, at exactly identical timings. Further, the control means preferably controls timings for the two substrates to be transported to the processing means so that a substrate processing is started for the two substrates when substantially identical periods, or preferably, exactly identical periods, have elapsed after start of heat processes.

The heat processing means preferably carries out heat processes on the two substrates transported by the two substrate transport sections in substantially identical conditions, preferably in exactly identical conditions. This restrains irregularities in the dimensions of the substrates and improves pattern alignment precision.

A fabrication system of a flexible liquid crystal display panel in accordance with the present embodiment, in order to subject the two substrates to drying processes before they are aligned, is a fabrication system to fabricate a flexible liquid crystal display panel by aligning two substrates in each of which a predetermined pattern is formed on a flexible substrate made of organic material, and is arranged so as to include:

substrate transport means for transporting the two substrates thereon;

drying means for carrying out drying processes on the two substrates; and means (e.g., a device to form color filters, a device to form transparent electrodes, a device to form insulating films, a device to form alignment films, a device to align liquid crystal molecules, a device to align substrates, and various other processing devices, including a heating device to form the patterns) for carrying out other processes that are required to form the predetermined patterns on the two substrates, wherein:

the processing means are arranged in a direction in which the two substrates are transported in accordance with fabrication processes of the flexible liquid crystal display panel.

The processing means are arranged in a direction in which the two substrates are transported in accordance with fabrication processes of the flexible liquid crystal display panel; therefore, various processes are sequentially carried out in accordance with the fabrication processes of the flexible liquid crystal display panel. This facilitates the process control, as well as the checking and controlling of temporal changes which occur in the expansion of the two substrates between different processing means, restrains the substrates varying in their dimensions due to temporal factors, and thus enables mechanical processing to be carried out on the two substrates without compromising on desired dimensional precision.

Besides, the fabrication system of the flexible liquid crystal display panel includes drying means for carrying out drying processes on the two substrates; therefore, the two substrates can be subjected to a drying process. This restrains the substrates expanding due to absorption of moisture and thus rendering the dimensional precision irregular. Besides, with the arrangement, the substrates are subjected a drying process, and hence dimensional change ratios can be matched in view of entire substrates. This improves the precision in aligning the substrates regardless of the number of flexible liquid crystal panels that are made from a single large substrate. The number can be, for example, one, and the precision still improves. Thus, the flexible liquid crystal display panel can be fabricated easily with a high acceptable product ratio.

Further, by fabricating the flexible liquid crystal display panel using the fabrication system arranged as in the foregoing, the arrangement of the two substrates does not need to be changed, and the flexible substrate made of organic material can be transported and processed alone. Therefore, those well tried and trusted settings and devices that are originally intended for use with the glass substrate can be applied for use with the organic substrate in its basic process flow and individual processes.

Thus, the flexible liquid crystal display panel can be fabricated with a good pattern precision. Also, the flexible liquid crystal display panel can be fabricated from a flexible substrate made of organic material at lower costs than conventional techniques.

It is preferable if the fabrication system of a flexible liquid crystal panel further includes control means for controlling timings for the substrates to be transported to the processing means. The control means controls timings for the substrates to be transported to the processing means according to a process time which is specified for each process and also controls so that timings substantially, preferably completely, match for the substrates to be transported to the processing means.

For example, the control means controls so that identical processes are carried out on the two substrates at identical timings. As a result, in the fabrication system of a flexible liquid crystal panel, for example, timings are matched for the two substrates to be transported to the drying means, so that drying processes are started for the two substrates when substantially identical periods, or preferably, exactly identical periods, have elapsed after start of substrate processing.

By the fabrication system of a flexible liquid crystal display panel further including control means for controlling timings for the substrates to be transported to the processing means and also by the control means controlling timings for the substrates to be transported to the processing means, mechanical processes to fabricate the liquid crystal panel can be carried out according to a preprogrammed time table. This facilitates the process control, as well as the checking and controlling of temporal changes which occur in the expansion of the two substrates between different processing means, restrains the substrates varying in their dimensions due to temporal factors, and thus enables mechanical processing to be carried out on the two substrates without compromising on desired dimensional precision. Especially, by the inclusion of the control means in the fabrication system of a flexible liquid crystal display panel, in fabrication processes of the flexible liquid crystal display element, each in a series of processes which are carried out commonly on both substrates and entail a dimensional variation of the substrate can be started substantially, preferably completely, simultaneously for the two substrates, and the behavior of the two substrates can be started simultaneously in each process. Further, temporal changes in the expansion of the substrates become permanently controllable, which otherwise would be caused by the absorption of moisture from the surrounding atmosphere after drying, and irregularities in dimensions of the substrates caused by temporal factors can be eliminated. Therefore, the expansion and shrinkage behavior of the substrates is readily checked and controlled in fabrication processes, and the dimensional precision is always controlled strictly. Thus, the substrates are aligned with a higher precision. Consequently, the flexible liquid crystal display panel can be fabricated easily with a high acceptable product ratio.

Note that the processing means, especially, the drying means, may be two devices disposed side by side, one in each of the transport directions of the two substrates.

Alternatively, the processing means may be a device with an increased performance to carry out identical processes on the two substrates simultaneously. Or, the processing means may be a device, with stand-by storage means, which sorts out substrates for sequential processes. The substrate transport means may include two transport sections and moves the two substrates separately, but in parallel. Alternatively, the substrate transport means may include an arrangement which is capable of transporting the two substrates together.

Among these examples, the drying means is preferably made of two parts which are responsible for carrying out a drying process on the respective substrates. When this is the case, there is no need to develop a dedicated drying device with an increased performance. In addition, the two substrates can be subjected to drying without sorting devices or the like.

Further, the fabrication system of a flexible liquid crystal display panel preferably includes:

at least a pair of drying means for carrying out drying processes on the two substrates;

means for carrying out processes, other than the drying processes, that are required to form the predetermined pattern on one of the two substrates; and means for carrying out processes, other than the drying processes, that are required to form the predetermined pattern on the other substrate, wherein:

associated processing means, that is, means carrying out parallel processes or means carrying out identical processes on the two substrates, are lined side by side, so that one of the associated means is located in a transport direction of one of the two substrates and the other means is located in a transport direction of the other substrate, in accordance with fabrication processes of the flexible liquid crystal display panel. Hence, each process which is performed commonly on the two substrates in the fabrication of the flexible liquid crystal display panel can be easily started substantially simultaneously, or preferably, exactly simultaneously, for the two substrates.

Further, when this is the case, the fabrication system of a flexible liquid crystal panel may be such that:

the substrate transport means includes a pair of substrate transport sections (e.g., substrate transport paths or substrate mounting devices) disposed parallel to each other; and the processing means, especially the heat processing means, are disposed side by side on the pair of substrate transport sections. When this is the case, the two substrate transport sections are separately controllable. Even if the two substrates are subjected to different processes, timings to feed them to subsequent processing devices, i.e., timings to start subsequent processes, can be readily matched.

In other words, a fabrication system of a flexible liquid crystal display panel in accordance with the present embodiment is preferably such that:

the substrate transport means includes a first substrate transport section for transporting one of the two substrates and a second substrate transport section for transporting the other substrate; and the first substrate transport section and the second substrate transport section are separately controllable. In other words, the fabrication system of a flexible liquid crystal display panel preferably includes control means for controlling timings for the substrates to be transported to the processing means, wherein:

the control means controls timings for a substrate to be transported to the processing means which are arranged in a substrate transport direction in the first substrate transport section separately from timings for a substrate to be transported to the processing means which are arranged in a substrate transport direction in the second substrate transport section. When this is the case, the control means preferably controls timings for the two substrates to be transported to the processing means so that identical processes, at least drying processes, are started for the two substrates at substantially identical timings, or preferably at exactly identical timings.

The drying means preferably carries out drying processes on the two substrates transported by the two substrate transport sections in substantially identical conditions, or preferably, in exactly identical conditions. This restrains irregularities in the dimensions of the substrates and improves pattern alignment precision.

A fabrication system of a flexible liquid crystal display panel in accordance with the present embodiment is preferably such that:

the drying means dries through depressurization.

Since the drying process is done through depressurization, the substrate per se does not shrink (does not denature) due to heating, and the substrate does not shrink compared to the dimensions before the substrate expands due to absorption of moisture. It is therefore easy to control the substrates in terms of their dimensions and also to restore the substrates to their original dimensions that they had before they expanded due to absorption of moisture. Consequently, with the arrangement, a fabrication system of a flexible liquid crystal display panel can be offered which is capable of readily control the variations in the dimensions of the substrates and thus eliminate differences in dimension between the substrates.

The fabrication system of a flexible liquid crystal display panel, as described in the present embodiment, may be a fabrication system to fabricate a flexible liquid crystal display panel by aligning two substrates in each of which a predetermined pattern is formed on a flexible substrate made of organic material, and be arranged so as to include:

heating means for heating the two substrates in substantially identical conditions, or preferably, in exactly identical conditions;

drying means for carrying out drying processes on the two substrates; and mechanical processing means for fabricating the liquid crystal panel.

In the present embodiment, various processes are sequentially carried out in accordance with predetermined processes, so as to mechanically process a pair of flexible substrates while keeping the precision within desired allowable range.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for fabricating a flexible liquid crystal display panel by aligning a pair of flexible substrates made of an organic material on which predetermined patterns are formed, said pair of substrates having different arrangements from each other, one of said substrates having gone through processing that causes swelling and shrinkage, said processing not being applied to the other of said substrates, said method comprising the step of:

before said pair of substrates are aligned with each other, applying said processing operation to said other substrate to allow a high degree of precision in the alignment of the predetermined patterns on the pair of substrates to be maintained.

2. The method as set forth in claim 1, wherein said processing operation is applied to said one substrate and said other substrate under identical conditions.

3. The method as set forth in claim 1, wherein said other substrate is subjected to said processing operation while said one substrate is being subjected to said processing operation.

4. The method as set forth in claim 3, wherein said processing operation is started substantially simultaneously with respect to said one substrate and said other substrates.

5. The method as set forth in claim 1, wherein each of processing operations applied commonly to said one substrate and said other substrate for said flexible liquid crystal display panel fabrication is started substantially simultaneously with respect to both of said substrates.

6. The method as set forth in claim 1, further comprising the step of:

in the case where a stand-by time is provided between execution of processing operations for said flexible liquid crystal display panel fabrication, storing said one substrate and said other substrate in an environment maintained in a constant dry state during said stand-by time.

7. The method as set forth in claim 1, further comprising the step of:

in the case where a stand-by time is provided between execution of processing operations for said flexible liquid crystal display panel fabrication, storing said one substrate and said other substrate in an environment in a dry state at all times during said stand-by time.

8. A method for fabricating a flexible liquid crystal display panel by aligning a pair of flexible substrates made of an organic material on which predetermined patterns are formed, said pair of substrates having different arrangements from each other, one of said substrates having gone through heat treatment; said heat treatment not being applied to the other of said substrates, said method comprising the step of, before said pair of substrates are aligned with each other, applying said heat treatment to said other substrate to allow a high degree of precision in the alignment of the predetermined patterns on the pair of substrates to be maintained.

9. The method as set forth in claim 8, wherein conditions of the heat treatments applied to said one substrate and said other substrate are set so that a difference in size between said substrates due to shrinkage of said substrates caused by the heat treatments should fall in a desired range.

10. The method as set forth in claim 8, wherein the heat treatments applied to said one substrate and said other substrate are carried out under substantially identical temperature profiles.

11. The method as set forth in claim 8, wherein substantially identical heat treatments are applied to said one substrate and said other substrate, respectively.

12. The method as set forth in claim 8, wherein the heat treatments applied to said one substrate and said other substrate are carried out under identical conditions.

13. The method as set forth in claim 12, wherein the heat treatments applied to said one substrate and said other substrate are carried out using an identical type of devices under identical conditions.

14. The method as set forth in claim 13, wherein said device is a single substrate transfer oven.

15. The method as set forth in claim 8, wherein the heat treatment is a heat treatment that is for forming a pattern and that causes irreversible shrinkage of said substrates.

16. The method as set forth in claim 8, wherein said other substrate is subjected to said heat treatment while said one substrate is being subjected to said heat treatment.

17. The method as set forth in claim 16, wherein said heat treatments are started substantially simultaneously with respect to said one substrate and said other substrates.

18. The method as set forth in claim 8, wherein each of processing operations applied commonly to said one substrate and said other substrate for said flexible liquid crystal display panel fabrication is started substantially simultaneously with respect to both of said substrates.

19. The method as set forth in claim 8, further comprising the step of: in the case where a stand-by time is provided between execution of processing operations for said flexible liquid crystal display panel fabrication, storing said one substrate and said other substrate in an environment maintained in a constant dry state during said stand-by time.

20. The method as set forth in claim 8, further comprising the step of:

in the case where a stand-by time is provided between execution of processing operations for said flexible liquid crystal display panel fabrication, storing said one substrate and said other substrate in an environment in a dry state at all times during said stand-by time.

21. A method for fabricating a flexible liquid crystal display panel by aligning a pair of flexible substrates made of an organic material on which predetermined patterns are formed, said pair of substrates having different arrangements from each other, said method comprising the step of:

applying drying operations to said one substrate and said other substrate, respectively, after the predetermined patterns are formed on said pair of substrates, before panel alignment of said pair of substrates.

22. The method as set forth in claim 21, wherein conditions of the drying operations applied to said one substrate and said other substrate are set so that a difference in size between said substrates due to shrinkage of said substrates caused by the heat treatments should fall in a desired range.

23. The method as set forth in claim 21, wherein substantially identical drying operations are applied to said one substrate and said other substrate, respectively.

24. The method as set forth in claim 21, wherein drying operations applied to said one substrate and said other substrate are carried our under identical conditions.

25. The method as set forth in claim 24, wherein drying operations applied to said one substrate and said other substrate are carried out using devices of an identical type under identical conditions.

26. The method as set forth in claim 21, wherein said drying operations are vacuum drying operations.

27. The method as set forth in claim 21, wherein said drying operations are carried out under processing conditions such that said one substrate and said other substrate are returned to their original sizes before swelling due to moisture absorption.

28. The method as set forth in claim 27, wherein said drying operations are carried out by continuously heating said one substrate and said other substrate until said one substrate and said other substrate are returned to their original sizes before swelling due to moisture absorption, under temperature conditions such that irreversible shrinkage should not occur to said pair of substrates.

29. The method as set forth in claim 28, wherein: said organic material is polyether sulfone; and said drying operations are carried out by heating to said one substrate and said other substrate at a temperature in a range from 50° C. to 80° C.

30. The method as set forth in claim 28, wherein said drying operations are carried out by placing said one substrate and said other substrate in a vacuum environment until said one substrate and said other substrate are returned to their original sizes before swelling due to moisture absorption.

31. The method as set forth in claim 30, wherein:

said organic material is polyether sulfone; and said drying operations are carried out at a specific vacuum condition of not more than 1.33322×103 Pa.

32. The method as set forth in claim 21, wherein said other substrate is subjected to said drying operation while said one substrate is being subjected to said drying operation.

33. The method as set forth in claim 32, wherein said drying operations are started substantially simultaneously with respect to said one substrate and said other substrates.

34. The method as set forth in claim 21, wherein each of processing operations applied commonly to said one substrate and said other substrate for said flexible liquid crystal display panel fabrication is started substantially simultaneously with respect to both of said substrates.

35. The method as set forth in claim 21, further comprising the step of:

in the case where a stand-by time is provided between execution of processing operations for said flexible liquid crystal display panel fabrication, storing said one substrate and said other substrate in an environment maintained in a constant dry state during said stand-by time.

36. The method as set forth in claim 21, further comprising the step of:

in the case where a stand-by time is provided between execution of processing operations for said flexible liquid crystal display panel fabrication, storing said one substrate and said other substrate in an environment in a dry state at all times during said stand-by time.

37. A method for fabricating a flexible liquid crystal display panel by aligning a pair of flexible substrates made of an organic material on which predetermined patterns are formed, said pair of substrates having different arrangements from each other, said method comprising the step of before said pair of substrates are aligned with each other, applying identical heat treatments to both of said substrates so that a heat history of one of said substrates becomes substantially equal to a heat history of the other substrate.

38. The method as set forth in claim 37, wherein heat treatments are applied to said pair of substrates simultaneously.

39. The method as set forth in claim 37, further comprising the step of:

in the case where a stand-by time is provided between execution of processing operations for said flexible liquid crystal display panel fabrication, storing said one substrate and said other substrate in an environment maintained in a constant dry state during said stand-by time.

40. The method as set forth in claim 37, further comprising the step of:

storing said pair of substrates in an environment in a dry state at all times during said stand-by time.

41. A method for fabricating a flexible liquid crystal display panel by aligning a pair of flexible substrates made of an organic material on which predetermined patterns are formed, said pair of substrates having different arrangements from each other, said method comprising the step of:

applying identical drying operations to both of said substrates in pair, before each processing operation applied to each substrate before said pair of substrates are aligned with each other.

42. The method as set forth in claim 41, wherein said drying operations applied to said pair of substrates are carried out simultaneously.

43. The method as set forth in claim 41, further comprising the step of:

in the case where a stand-by time is provided between execution of processing operations for said flexible liquid crystal display panel fabrication, storing said one substrate and said other substrate in an environment maintained in a constant dry state during said stand-by time.

44. The method as set forth in claim 41, further comprising the step of:

storing said pair of substrates in an environment in a dry state at all times during said stand-by time.

45. The method as set forth in claim 1, wherein, said processing operation is any one of heat treatments, drying operations, and cleaning operations and in forming the patterns, in the case where said processing operation is applied to one of said substrates in pair and said other substrate does not require said processing operation, said processing operation is applied to said one substrate and said other substrate under substantially identical conditions.

46. The method as set forth in claim 8, wherein, in forming the patterns, in the case where said processing operation is applied to one of said substrates in pair and said other substrate does not require said processing operation, said one substrate and said other substrate are subjected to substantially identical heat treatments.

47. The method as set forth in claim 21, wherein, before panel alignment of said pair of substrates, said drying operations are applied to said one substrate and said other substrate under substantially identical conditions.

48. The method as set forth in claim 37, wherein, to cause a heat history of one of said substrates to be equal to a heat history of the other substrate, identical heat treatments are applied to both of said substrates.

* * * * *